(12) United States Patent
Chakravarthy

(10) Patent No.: US 12,293,675 B2
(45) Date of Patent: May 6, 2025

(54) INTERCEPTING OR SURROUNDING A GROUP OF HOSTILE UAVS WITH A NET

(71) Applicant: Board of Regents, The University of Texas System, Austin, TX (US)

(72) Inventor: Animesh Chakravarthy, Arlington, TX (US)

(73) Assignee: Board of Regents, The University of Texas System, Austin, TX (US)

(*) Notice: Subject to any disclaimer, the term of this patent is extended or adjusted under 35 U.S.C. 154(b) by 448 days.

(21) Appl. No.: 17/313,410

(22) Filed: May 6, 2021

(65) Prior Publication Data

US 2022/0380042 A1 Dec. 1, 2022

(51) Int. Cl.
*G08G 5/55* (2025.01)
*B64U 70/30* (2023.01)
*B64U 101/16* (2023.01)
*G05D 1/00* (2024.01)
*G08G 5/57* (2025.01)

(52) U.S. Cl.
CPC ............ *G08G 5/55* (2025.01); *G05D 1/0022* (2013.01); *G05D 1/0027* (2013.01); *G08G 5/57* (2025.01); *B64U 70/30* (2023.01); *B64U 2101/16* (2023.01)

(58) Field of Classification Search
CPC .. B64C 39/024; G05D 1/0022; G05D 1/0027; B64U 70/30; B64U 2101/00
See application file for complete search history.

(56) References Cited

U.S. PATENT DOCUMENTS

| | | | |
|---|---|---|---|
| 2019/0218902 A1* | 7/2019 | Demick | E21B 19/084 |
| 2020/0108922 A1* | 4/2020 | Smith | B64C 39/024 |
| 2020/0108926 A1* | 4/2020 | Smith | B64F 1/007 |
| 2020/0201332 A1* | 6/2020 | Pedersen | A01M 29/10 |
| 2021/0003412 A1* | 1/2021 | Xu | G06F 18/23213 |
| 2021/0253241 A1* | 8/2021 | Haran | B64C 39/022 |

OTHER PUBLICATIONS

Obstacle Avoidance in a Dynamic Environment: A Collision Cone Approach, IEEE Transactions on Systems, Man, and Cybernetics—Part A: Systems and Humans, vol. 28, No. 5, Sep. 1998 (Year: 1998).*

(Continued)

*Primary Examiner* — Anne Marie Antonucci
*Assistant Examiner* — Jingli Wang
(74) *Attorney, Agent, or Firm* — Meunier Carlin & Curfman LLC

(57) ABSTRACT

The present disclosure addresses the problem of UAVs pursuing a swarm of target UAVs. The target UAVs are flying together as a flock that are initially modeled as a circle having a time-varying radius or an arbitrarily-shaped swarm that may change in size. Guidance of the pursuing UAVs is developed based on a collision cone framework, wherein the pursuing UAVs cooperatively steer the velocity vector of any point in their convex hull, to intercept the target. Also, the problem of capturing a swarm of intruder UAVs using a net manipulated by a team of defense UAVs is disclosed. The intruder UAV swarm may be stationary, in motion, and even maneuver. Collision cones in 3-dimensional space are used to determine the strategy used by the net carrying UAVs to maneuver or manipulate the net in space in order to capture the intruders.

16 Claims, 15 Drawing Sheets

(56) References Cited

OTHER PUBLICATIONS

Animesh Chakravarthy and Debasish Ghose. "Cooperative Pursuit using Collision Cones," AIAA 2019-0385. AIAA Scitech 2019 Forum. Jan. 2019 (Year: 2019).*
Anderson, G. M., "Comparison of Optimal Control and Differential Game Intercept Missile Guidance Laws," Journal of Guidance and Control, vol. 4, No. 2, 1981, pp. 109-115.
Ando, H., et al., "Distributed Memoryless Point Convergence for Mobile Robots with Limited Visibility," IEEE Transactions on Robotics and Automation, vol. 15, No. 5, Oct. 1999, pp. 818-828.
Basar, T., et al., "Dynamic Noncooperative Game Theory," Society for Industrial and Applied Mathematics, 1999, pp. 448-451.
Bhattacharya, S., et al., "On the Existence of a Nash Equilibrium for a Two Player Pursuit-Evasion Game with Visibility Constraints," Algorithmic Foundations of Robotics VIII, Springer Tracts in Advanced Robotics, vol. 57, 2009, pp. 251-265.
Bhattacharya, S., et al., "Approximation Schemes for Two-Player Pursuit Evasion Games with Visibility Constraints", Robotics Science and Systems, 2008.
Biswas, B., et al., "Three-Dimensional Nonlinear Impact Angle Guidance for Maneuvering Targets," IFAC-PapersOnLine, vol. 51, Issue 1, 2018, pp. 47-52.
Blazovics, L., et al., "Target surrounding solution for swarm robots," Information and Communication Technologies, 2012, pp. 251-262.
Bopardikar, S. D., et al., "Cooperative Pursuit with Sensing Limitations," Proceedings of American Control Conference, 2007, 6 pages.
Botelho, W. T., et al., "Multi-robot system for tracking and surrounding a stationary target: A decentralized and cooperative approach," IEEE International Conference on Robotics and Biomimetics (ROBIO), 2017, pp. 793-798.
Boyd, S., et al., "Convex Optimization," Cambridge University Press, 2004, 348 pages.
Brace, N. L., et al., "Using collision cones to assess biological deconfliction methods", Journal of the Royal Society Interface, vol. 13, Issue 122, 2016, 8 pages.
Chakravarthy, A. et al., "Collision cones for quadric surfaces", IEEE Transactions on Robotics, vol. 27, No. 6, Dec. 2011, pp. 1159-1166, doi 10.1109/TRO.2011.2159413.
Chakravarthy, A., et al., "Collision Cones for Quadric Surfaces in $\eta$-Dimensions," IEEE Robotics & Automation Letters, vol. 3, No. 1, Jan. 2018, pp. 604-611.
Chakravarthy, A., et al., "Cooperative Pursuit using Collision Cones", AIAA Scitech, San Diego, CA, Jan. 2019, doi 10.2514/6.2019-0385.
Chakravarthy, A., et al., "Generalization of the collision cone approach for motion safety in 3-D environments", Autonomous Robots, vol. 32, No. 3, Apr. 2012, pp. 243-266, doi 10.1007/s10514-011-9270-z.
Chakravarthy, A., et al., "Guidance for Precision 3-Dimensional Maneuvers through Orifices using Safe-Passage Cones", AIAA Journal of Guidance, Control, and Dynamics, vol. 39, No. 6, Jun. 2016, pp. 1325-1341, doi 10.2514/1.G001546.
Chakravarthy, A., et al., "Obstacle avoidance in a dynamic environment: A collision cone approach", IEEE Transactions on Systems Man and Cybernetics Part A Systems and Humans, vol. 28, No. 5, Sep. 1998, pp. 562-574, doi 10.1109/3468.709600.
Chung, T. H., et al., "50 Vs. 50 by 2015: Swarm Vs. Swarm UAV Live-Fly Competition at the Naval Postgraduate School", AUVSI North America, Washington, D.C., 2013, pp. 1792-1811.
Chung, T. H., et al., "Search and Pursuit Evasion in Mobile Robotics", Autonomous Robots, vol. 31, 2011, pp. 299-316, doi 10.1007/s10514-011-9241-4.
Damas, B., et al., "Avoiding moving obstacles: the forbidden velocity map", IEEE/RSJ International Conference on Intelligent Robots and Systems (IROS), Oct. 10-15, 2009, St. Louis, Missouri, pp. 4393-4398, doi 10.1109/IROS.2009.5354210.
Das, K., et al., "Multi-Agent Rendezvous Algorithm with Rectilinear Decision Domain", P. Vadakkepat et al. (Eds.): FIRA 2010, CCIS 103, 2010, pp. 162-169, doi 10.1007/978-3-642-15810-0-21.
Diehl, M., et al., "Conceptual design of an interceptor UAV", 17th AIAA Aviation Technology, Integration, and Operations Conference, AIAA 2017-3587, Jun. 2017, Denver, Colorado, doi 10.2514/6.2017-3587.
"Drone-catchers emerge on a new aerial frontier," Technology News, retreived on Aug. 22, 2022 from https://www.reuters.com/article/us-usa-drone-hunter-idUSKBN16S1IT, Mar. 21, 2017, 6 pages.
Ferrara, A., et al., "Collision avoidance strategies and coordinated control of passenger vehicles", Nonlinear Dynamics, vol. 49, No. 4, Sep. 2007, pp. 475-492, doi 10.1007/s11071-006-9110-4.
Ferrara, A., et al., "Second order sliding mode control of vehicles with distributed collision avoidance capabilities", Mechatronics, vol. 19, No. 4, Jun. 2009, pp. 471-477, doi 10.1016/j.mechatronics.2008.11.002.
Fiorini, P., et al., "Motion planning in dynamic environments using velocity obstacles", The International Journal of Robotics Research, vol. 17, No. 7, Sep. 1998, pp. 760-772, doi 10.1177/027836499801700706.
"Five Reasons to Choose a Long-Endurance Fixed Wing VTOL UAV," sUAS News, retreived on Aug. 22, 2022 from https://www.suasnews.com/2018/09/five-reasons-to-choose-a-long-endurance-fixed-wing-vtol-uav, 2018, 2 pages.
Gartner, G., "A subexponential algorithm for abstract optimization problems", SIAM Journal Computers, vol. 24, No. 5, 1995, 1018-1035, doi 10.1137/S0097539793250287.
"Gatwick Airport drone incident," retreived on Aug. 22, 2022 from https://en.wikipedia.org/wiki/Gatwick_Airport.drone_incident, 2018, 9 pages.
Gautam, A., et al., "A survey of autonomous landing techniques for UAVs", 2014 International Conference on Unmanned Aircraft Systems (ICUAS), Orlando, FL, 2014, pp. 1210-1218, doi 10.1109/ICUAS.2014.6842377.
Geng, J., et al., "Cooperative Transport of a Slung Load Using Load-Leading Control", Journal of Guidance, Control, and Dynamics, 2020, pp. 1-19, doi 10.2514/1.G004680.
Gopalakrishnan, B., et al., "Time-scaled collision cone based trajectory optimization approach for reactive planning in dynamic environments", 2014 IEEE/RSJ International Conference on Intelligent Robots and Systems, Chicago, IL, 2014, pp. 4169-4176, doi 10.1109/IROS.2014.6943150.
Goss, J., et al., "Aircraft conflict detection and resolution using mixed geometric and collision cone approaches", AIAA Guidance, Navigation, and Control Conference and Exhibit, Aug. 16-19, 2004, Providence, Rhode Island, AIAA 2004-4879.
Guelman, M., "A qualitative study of Proportional Navigation", IEEE Transactions on Aerospace and Electronic Systems, vol. 7, No. 4, Jul. 1971, pp. 637-643, doi 10.1109/TAES.1971.310406.
Guelman, M., "Proportional Navigation with a Maneuvering Target", IEEE Transactions on Aerospace and Electronic Systems, vol. 8, No. 3, May 1972, pp. 364-371, doi 10.1109/TAES.1972.309520.
Hamza, H. C., et al., "Target tracking using multiple robots", International Conference on Control Communication and Computing, Dec. 2013, doi 10.1109/ICCC.2013.6731696.
Huang, H., et al., "Safe-Reachable Area Cooperative Pursuit", IEEE Transactions on Robotics, vol. 10, No. 5, 2012.
Jha, B., et al., "Cooperative Guidance and Collision Avoidance for Multiple Pursuers", Journal of Guidance, Control, and Dynamics, Feb. 2019, doi 10.2514/1.G004139.
Jin, S., et al., "Pursuit-evasion games with multi-pursuer vs. one fast evader", 8th World Congress on Intelligent Control and Automation, Jinan, China, Jul. 2010, pp. 3184-3189, doi 10.1109/WCICA.2010.5553770.
Kim, T-H., et al., "Cooperative control for target-capturing task based on a cyclic pursuit strategy", Automatica, vol. 43, No. 8, Aug. 2007, pp. 1426-1431, doi 10.1016/j.automatica.2007.01.018.
Kim, H. J., et al., "Fully Autonomous Vision-Based Net-Recovery Landing System for a Fixed-Wing UAV", IEEE/ASME Transactions on Mechatronics, vol. 18, No. 4, pp. 1320-1333, Aug. 2013, doi 10.1109/TMECH.2013.2247411.
Klausen, K., et al., "Coordinated Control Concept for Recovery of a Fixed-Wing UAV on a Ship using a Net Carried by Multirotor

(56) References Cited

OTHER PUBLICATIONS

UAVs", Proceedings of the International Conference on Unmanned Aircraft Systems, Arlington, VA, Jun. 7-10, 2016, doi 10.1109/ICUAS.2016.7502640.

Klausen, K., "Coordinated Control of Multirotors for Suspended Load Transportation and Fixed-Wing Net Recovery", Ph.D. Thesis, Norwegian University of Science and Technology, Jun. 2017.

Klein, K., et al., "Complete Information Pursuit Evasion in Polygonal Environments", Proceedings of the Twenty-Fifth AAAI Conference on Artificial Intelligence, 2011, pp. 1120-1125, doi 10.5555/2900423.2900601.

Lechevin, N., et al., "Lyapunov-based Nonlinear Missile Guidance", Journal of Guidance, Control and Dynamics, vol. 27, No. 6, Nov.-Dec. 2004, doi 10.2514/1.8629.

Li, W., "Escape Analysis on the Confinement-Escape Problem of a Defender Against an Evader Escaping From a Circular Region", IEEE Transactions on Cybernetics, vol. 46, No. 9, Sep. 2016, pp. 2166-2172, doi 10.1109/TCYB.2016.2541158.

Li, W., "The Confinement-Escape Problem of a Defender against an Evader Escaping from a Circular Region", IEEE Transactions on Cybernetics, vol. 46, No. 4, Apr. 2016, pp. 1028-1039, doi 10.1109/TCYB.2015.2503285.

Lin, J., et al., "The Multi-Agent Rendezvous problem", Conference on Decision & Control, Maui, Hawaii, USA, 2003, pp. 1508-1513, doi 10.1109/CDC.2003.1272825.

Martinez, S., "Practical Multi-agent rendezvous through modified circumcenter algorithms", Automatica, vol. 45, No. 9, Sep. 2009, pp. 2010-2017, doi 10.1016/j.automatica.2009.05.013.

Merz, A., "The Game of Two Identical Cars", Journal of Optimization Theory and Applications, vol. 9, No. 5, 1972, pp. 325-343.

Moe, J. B., "Autonomous landing of Fixed-Wing UAV in net suspended by Multirotor UAVs—A Multirotor recovery system", M.S Thesis, Norwegian Institute of Science and Technology, Jun. 2016. 163 pages.

Muskardin, T., et al., "Landing of a fixed-wing UAV on a mobile ground vehicle", 2016 IEEE International Conference on Robotics and Automation (ICRA), Stockholm, Sweden, 2016, pp. 1237-1242, doi 10.1109/ICRA.2016.7487254.

Pachter, M., et al., "Two-on-One Pursuit", Journal of Guidance, Control, and Dynamics, Feb. 2019, pp. 1-7, doi 10.2514/1.G004068.

Palunko, I., et al., "Agile Load Transportation: Safe and Efficient Load Manipulation with Aerial Robots", IEEE Robotics and Automation Magazine, vol. 19, No. 3, Sep. 2012, doi 10.1109/MRA.2012.2205617.

Patsko, V. S., et al., "Homicidal Chauffer Game: History and Modern Studies", Scientific Report, Russia URAL Branch of RAS, 2009.

Pierson, A., et al., "Intercepting Rogue Robots: An Algorithm for Capturing Multiple Evaders with Multiple Pursuers", IEEE Robotics and Automation Letters, vol. 2, No. 2, Apr. 2017.

Ratnoo, A., et al., "Impact Angle Constrained Guidance Against Nonstationary Nonmaneuvering Targets", Journal of Guidance, Control, and Dynamics, vol. 33, No. 1, Jan.-Feb. 2010, pp. 269-275, doi 10.2514/1.45026.

Rogers, J., "The dark side of our drone future", Bulletin of the Atomic Scientists, Oct. 4, 2019, https://thebulletin.org/2019/10/the-dark-side-of-our-drone-future, downloaded on Mar. 18, 2020.

Ryoo, C.-K., et al., "Optimal Guidance Laws with Terminal Impact Angle Constraint", Journal of Guidance, Control, and Dynamics, vol. 28, No. 4, Jul.- Aug. 2005, pp. 724-732, doi 10.2514/1.8392.

Saleem, A., et al., "Lyapunov-based Guidance Law for Impact Time Control and Simultaneous Arrival", Journal of Guidance, Control and Dynamics, vol. 39, No. 1, Jan. 2016, doi 10.2514/1.G001349.

Sreenath, K., et al., "Dynamics, Control and Planning for Cooperative Manipulation of Payloads Suspended by Cables from Multiple Quadrotor Robots", Robotics Science and Systems, 2013.

Tagliabue, A., et al., "Robust collaborative object transportation using multiple MAVs", International Journal of Robotics Research, vol. 38, No. 9, 2019, pp. 1020-1044, doi 10.1177/0278364919854131.

Tholen, K., et al., "Achieving Overlap of Multiple, Arbitrarily Shaped Footprints using Rendezvous Cones", Journal of Guidance, Control and Dynamics, vol. 41, No. 6, 2018, pp. 1290-1307, doi 10.2514/1.G002932.

Tognon, M., et al., "Dynamics, control, and estimation for aerial robots tethered by cables or bars", IEEE Transactions on Robotics, vol. 33, No. 4, 2017, pp. 834-845, doi 10.1109/TRO.2017.2677915.

Tognon, M., et al., "Aerial co-manipulation with cables: The role of internal force for equilibria, stability, and passivity", IEEE Robotics and Automation Letters, vol. 3, No. 3, 2018, pp. 2577-2583, doi 10.1109/LRA.2018.2803811.

Tolman, S., et al., "Counter UAS Using a Formation Controlled Dragnet", International Conference on Unmanned Aircraft Systems (ICUAS), Jun. 2017, Miami, FL, USA, pp. 1665-1672, doi 10.1109/ICUAS.2017.7991391.

"Two Major Saudi Oil Installations Hit by Drone Strike, and U.S. Blames Iran," The New York Times, retreived on Aug. 22, 2022 from https://www.nytimes.com/2019/09/14/world/middleeast/saudi-arabia-refineries-drone- attack.html, Sep. 14, 2019, 4 pages.

Tychonievich, L. P., et al., "A maneuvering-board approach to path planning with moving obstacles", International Joint conference on Artificial Intelligence (IJCAI), August 20-25, Detroit, Michigan, 1989, pp. 1017-1021.

"Unmanned Systems Integrated Roadmap 2017-2042," Technical Report, Defense Technical Information Center, U.S. Department of Defense, 2017, 58 pages.

Von Moll, A., et al., "Pursuit-evasion of an evader by multiple pursuers", International Conference on Unmanned Aircraft Systems (ICUAS), Jun. 2018, pp. 133-142, doi 10.1109/ICUAS.2018.8453470.

Watanabe, Y., et al., "Minimum-effort guidance for vision-based collision avoidance", AIAA Atmospheric Flight Mechanics Conference and Exhibit, Aug. 21-24, 2006, Keystone, Colorado, AIAA 2006-6641.

Wei, M., et al., "Multi-Pursuer Multi-Evader Pursuit-Evasion Games with Jamming Confrontation", Journal of Aerospace Computing, Information and Communication, vol. 4, No. 3, Mar. 2007, pp. 693-706, doi 10.2514/1.25329.

Yanushevsky, R. T., "Concerning Lyapunov-based Guidance", Journal of Guidance, Control and Dynamics, vol. 29, No. 2, Mar.-Apr. 2006, doi 10.2514/1.16422.

Yoon, S., et al., "Pursuit Guidance Law and Adaptive Backstepping Controller Design for Vision-Based Net-Recovery UAV", AIAA GNC Conference and Exhibit, AIAA 2008-7254, Aug. 2008, Honolulu, Hawaii, doi 10.2514/6.2008-7254.

Yoon, S., et al., "Spiral Landing Trajectory and Pursuit Guidance Law Design for Vision-Based Net-Recovery UAV", AIAA GNC Conference, AIAA 2009-5682, Aug. 2009, Chicago, Illinois, doi 10.2514/6.2009-5682.

Zhou, Z., et al., "Cooperative Pursuit with Voronoi Partitions", Automatica, vol. 72, Oct. 2016, pp. 64-72, doi 10.1016/j.automatica.2016.05.007.

\* cited by examiner

INTERCEPTING OR SURROUNDING A GROUP OF HOSTILE UAVS WITH A NET

STATEMENT OF GOVERNMENT SUPPORT

This invention was made with government support under grant number U.S. Pat. No. 1,851,817 awarded by the National Science Foundation. The government has certain rights in the invention.

BACKGROUND

Given the rapid pace of advance in UAV technologies, it appears that UAV swarms will soon become common in many applications [and may sometimes pose a threat for other vehicles in their airspace. In this paper, we consider an interception problem in which three UAVs carrying a net actively attempt to trap a swarm of intruder UAVs. The capturing UAVs are assumed to be capable of flying at speeds higher than the intruder UAVs which, in turn, may maneuver in space. The problem is to decide how the UAVs need to manipulate, as well as orient the net in order to ensure that the net intercepts the intruder UAVs. In the guidance literature, interception problems have been addressed in the context of a missile intercepting an intruder aircraft. However, the problem there is formulated as an interceptor (modeled as a point), trying to intercept a target (which is also a point). In fact much of the guidance laws in the literature (PN being one of them) are based on the idea of guiding a point to intercept a target which may or not maneuver.

SUMMARY

The present disclosure is directed to a classes of problems associated with requirements to capture UAV(s) intruding into a guarded airspace, so as to protect the airspace from a proliferation of unauthorized drones. Toward this end, the present disclosure considers the problem of a team of n UAVs on a 2-D plane, pursuing a swarm of intruder UAVs (assumed to fly in a flock), with the objective of eventually surrounding the intruder swarm. There can be several reasons for which a group of UAVs might need to surround a target. By doing so, the UAVs can observe the target from multiple directions and perform a risk assessment of the target, to determine whether it poses a threat to the area that the UAVs are protecting. The act of surrounding the target also prevents it from escaping, and allows the UAVs to escort it to a landing zone without actually destroying it.

The present disclosure also addresses the problem of capturing a swarm of intruder UAVs, using a net manipulated by a team of defense UAVs. The intruder UAV swarm may be stationary, in motion, and even maneuver. The concept of collision cones in 3-dimensional space is used to determine the strategy used by the net carrying UAVs to maneuver or manipulate the net in space in order to capture the intruders. The manipulation of the net involves guiding the net to pursue the intruders and orienting it in space appropriately so as to maximize the effectiveness of capture. The net manipulation strategy is derived from the concept of collision cones defined in a relative velocity framework, and analytical expressions of nonlinear guidance laws are obtained. Simulations are presented to demonstrate the efficacy of these guidance laws.

This summary is provided to introduce a selection of concepts in a simplified form that are further described below in the detailed description. This summary is not intended to identify key features or essential features of the claimed subject matter, nor is it intended to be used to limit the scope of the claimed subject matter.

BRIEF DESCRIPTION OF THE DRAWINGS

The components in the drawings are not necessarily to scale relative to each other. Like reference numerals designate corresponding parts throughout the several views.

The APPENDIX, comprising 25 pages and incorporated herein by reference as part of the disclosure of this application, shows simulation results based on the principles disclosed herein.

DETAILED DESCRIPTION

Cooperative Pursuit Guidance to Surround Intruder Swarms Using Collision Cones

Figure 1A:
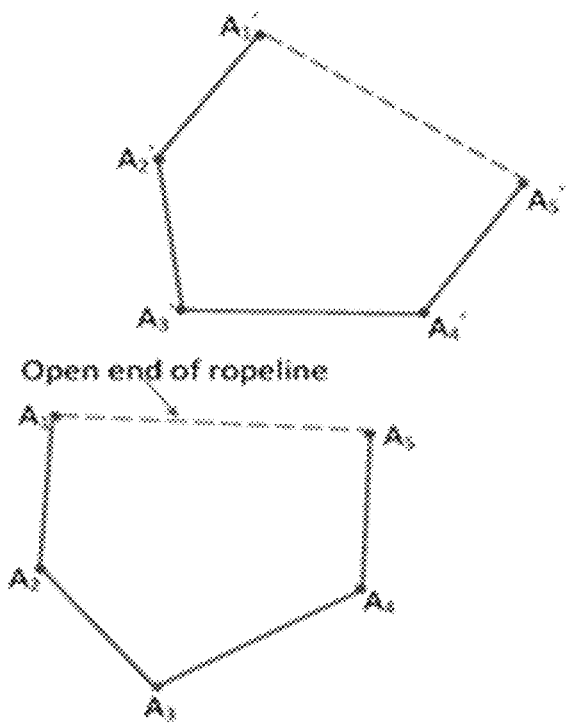
FIGS. 1A and 1B illustrate time snapshots of engagement between 5 pursuing UAVs carrying a ropeline, and a target swarm B.
Figure 1B:
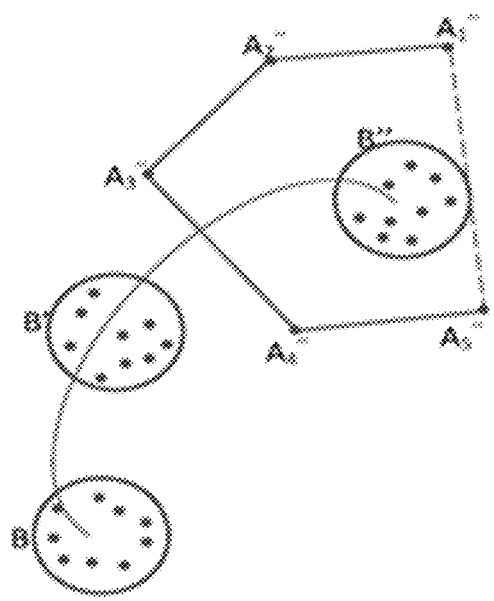

With reference to FIGS. 1A and 1B, three example classes of problems are considered. In the first problem, capture is said to occur when the n pursuing UAVs have succeeded in enclosing the target within their convex hull. In the second problem, the pursuing UAVs are assumed to be carrying a ropeline (or a suspended net). This ropeline (or suspended net) is considered to be an open chain, and the n UAVs need to surround the intruder UAV, while rotating their formation appropriately such that they approach the intruder from the direction of the open end of the chain. This is schematically represented in FIGS. 1A and 1B, which show five pursuing UAVs $A_1$, $A_2$, $A_3$, $A_4$, $A_5$ carrying a ropeline, whose open end is $A_1A_5$. The pursuing UAVs need to rotate their formation appropriately such that they eventually approach the target swarm B from the direction corresponding to $A_1A_5$ and enclose the swarm. In both of the above problems, the size of the intruder swarm is assumed to be constant. In the third problem, the intruder swarm is assumed to spread out or contract and thus the size of the target may change with time. Therefore, in this case, the UAVs need to perform the additional task of adjusting their inter-vehicle distances (in correspondence with the changing size of the target) so that they successfully surround the intruder swarm at the time of capture. In all three problems, we consider that the intruder swarm may either move with constant velocity or may maneuver. The target swarm is initially modeled as a circle (of possibly time-varying radius), and this is subsequently generalized to arbitrarily-shaped swarms.

To address the three problems, a collision cone approach is disclosed herein. Collision cones represent a collection of velocity vectors of an object which leads to collision with another moving object. Guidance laws to avoid collision are then designed to pull the current velocity vector of the object outside the collision cone. As described herein, collision cones can be used to develop analytical guidance laws for cooperative pursuit being performed by a group of UAVs. Differently from the collision avoidance problem, these guidance laws specify accelerations, which when applied by the pursuing UAVs, enable them to cooperatively drive the velocity vector of any chosen point (that lies in the convex hull of the pursuing UAVs) into the collision cone to the target, thereby facilitating subsequent capture of the target.

Collision Cone Preliminaries

Figure 2:
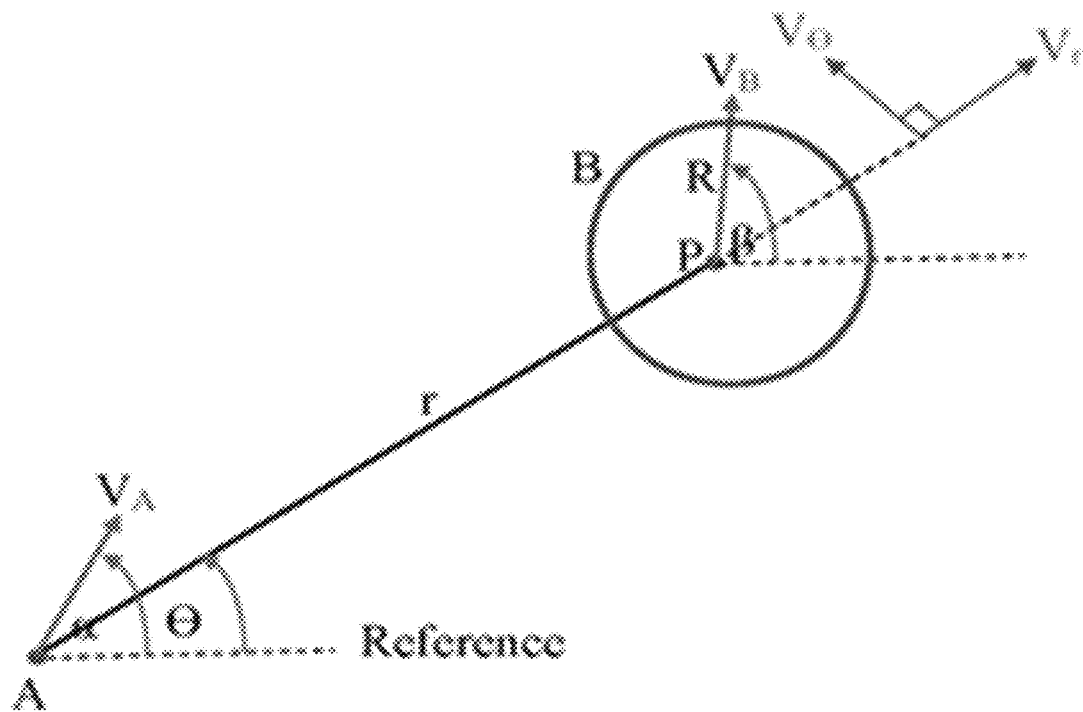
FIG. 2 illustrates an engagement geometry between a point and a circle.

The present disclosure details how the concepts from collision cones can be used to design the cooperative pursuit guidance laws. FIG. 2 illustrates a point object A and a circle B of radius R, moving with speeds $V_A$ and $V_B$, and heading angles $\alpha$ and $\beta$, respectively. Let P represent the center of the circle. Let r represent the distance AP, and $\theta$ represent the bearing angle of AP. Then, $V_\theta$ represents the component of the relative velocity (of B with respect to A) normal to AP, while $V_r$ represents the component along AP. These are defined as follows:

$$V_\theta = r\dot{\theta} = V_B \sin(\beta-\theta) - V_A \sin(\alpha-\theta)$$

$$V_r = \dot{r} = V_B \cos(\beta-\theta) - V_A \cos(\alpha-\theta) \quad (1)$$

When A and B move with constant velocities, the miss-distance $r_m$ (which is the predicted distance between the point A and the center P of the circle at the instant of closest approach), is given by the following equation:

$$r_m^2 = \frac{r^2 V_\theta^2}{(V_\theta^2 + V_r^2)} \quad (2)$$

and the time at which the two objects are at their point of closest approach is given by:

$$t_m = \frac{-rV_r}{V_\theta^2 + V_r^2} \quad (3)$$

When $V_r<0$, the above expression leads to a positive value of $t_m$. When $V_r>0$, it leads to a negative value of $t_m$, and this is to be interpreted as the time of closest approach if the trajectories of both the objects are projected backwards in time. Since the objects are moving with constant velocities, projection backwards implies that the trajectories of the objects before time t, are also straight lines.

One can see that if the miss distance $r_m$ is less than R, then the point object A is on a collision course with the circle B. Based on the above, one may define a miss-distance function y as follows:

$$y = \frac{r^2 V_\theta^2}{V_\theta^2 + V_r^2} - R^2 \quad (4)$$

If the two objects continue to move with constant velocities for all future time, then the predicted miss distance $r_m$ is equal to the actual miss distance, and therefore, the conditions $y<0$ and $V_r<0$ are both necessary and sufficient conditions for one object to intercept the other object. When the two objects move with varying velocities, then the condition $y<0$, $V_r \leq 0$ for all future time is a sufficient condition for interception.

The condition $y<0$, $V_r<0$ can be represented by a cone in the relative velocity space, as follows:

$$R=(V_\theta, V_r):y<0 \cap V_r<0 \quad (5)$$

Figure 3A:
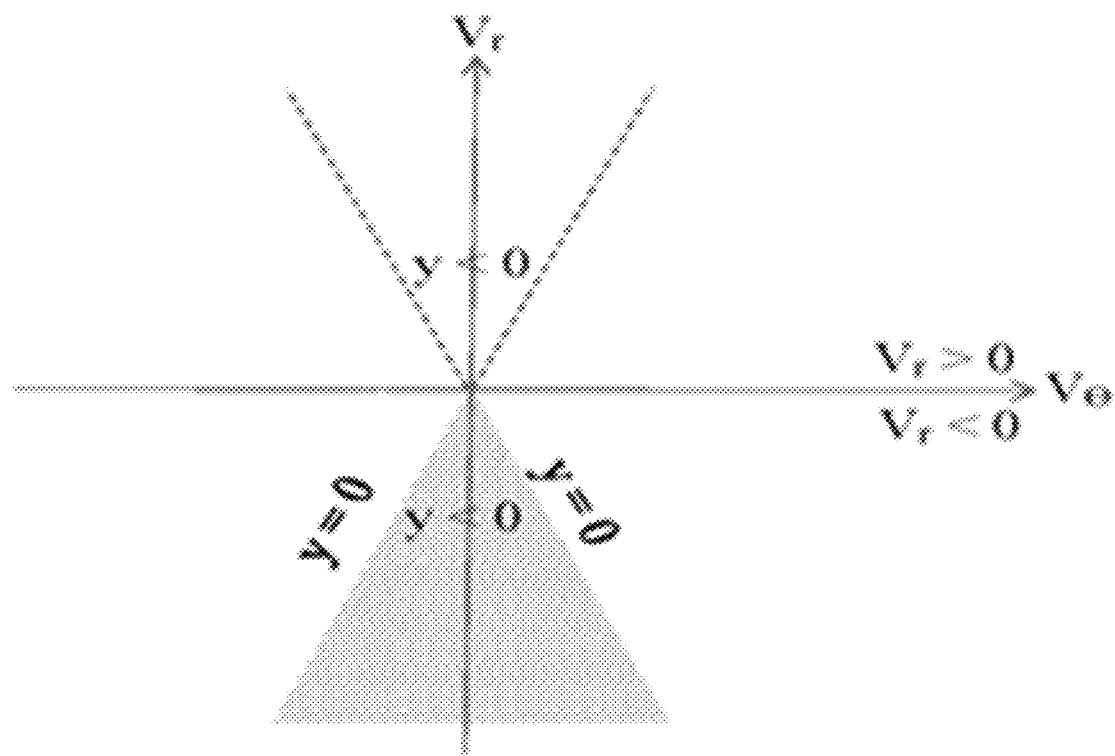
FIG. 3A illustrates a representation of the cone in relative velocity space.

This cone R is schematically depicted in FIG. 3A. If the instantaneous value of $(V_\theta, V_r)$ lies inside this cone, then the two objects are on a collision course with one another. When the speeds $V_A$ and $V_B$ of the objects are constant, the cone can equivalently be represented in physical space by the set of heading angles of A that lead to collision, that is, $$R_\alpha = \alpha : y<0 \cap V_r<0 \quad (6)$$

Figure 3B:
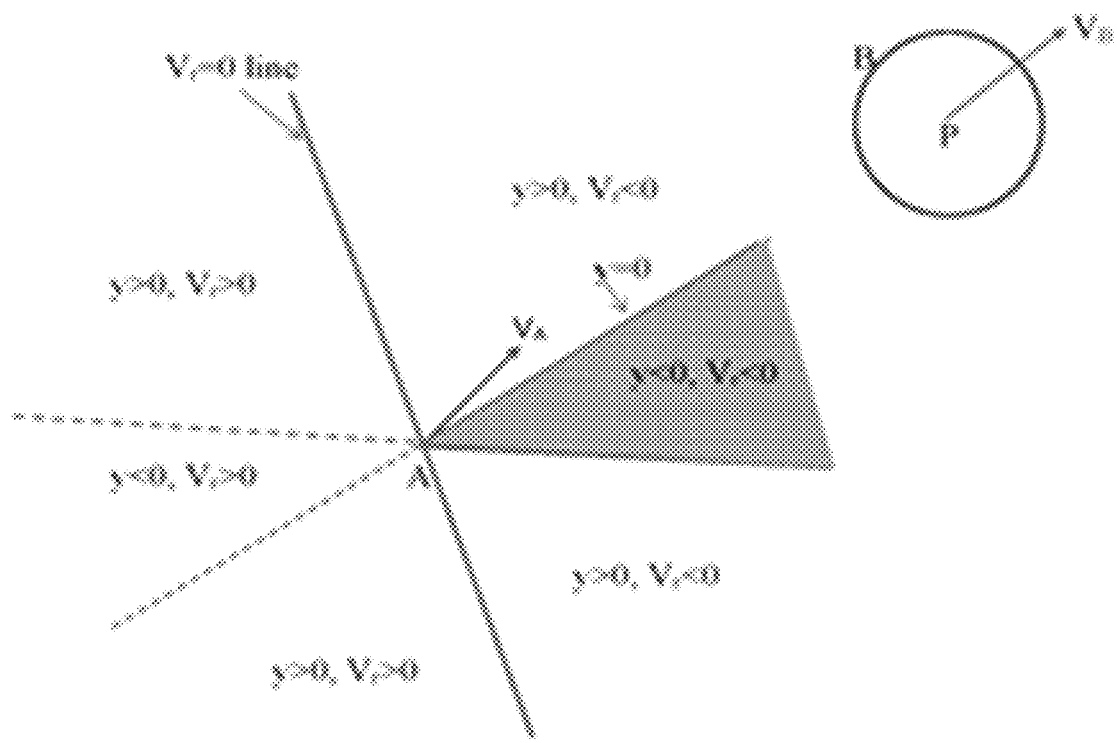
FIG. 3B illustrates a representation of the cone in physical space.

The cone $R_\alpha$ in physical space is shown in FIG. 3B. Cones R and $R_\alpha$ are different representations of the collision cone.

Cooperative Pursuit Guidance Laws

Figure 4:
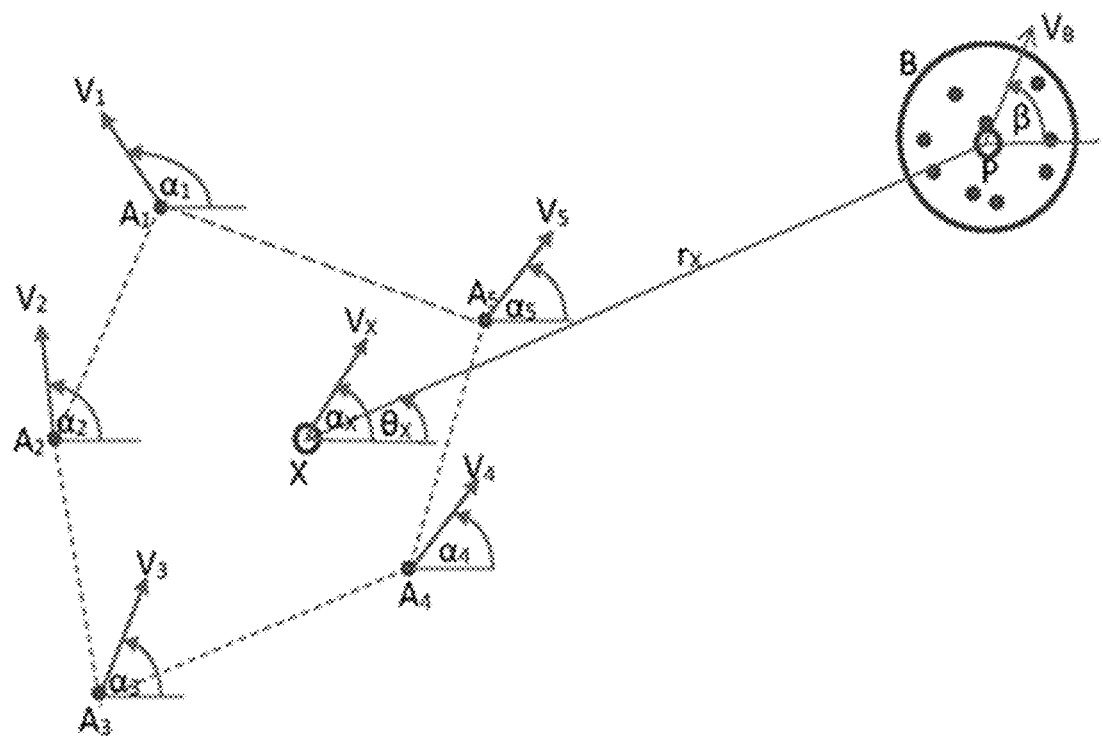
FIG. 4 illustrates a schematic of 5 UAVs $A_1, \ldots, A_5$ pursuing an intruder UAV swarm.

Below is described details cooperative pursuit by a group of UAVs. Consider n UAVs $A_1, \ldots, A_n$ that are pursuing an intruder UAV swarm. The UAVs are all moving on a plane. We assume that the vehicles in the intruder swarm need to stay reasonably close together. The reason for this could be, for example, that the intruders seek to perform a coordinated attack on a protected area, or because the intruder UAVs are flying in a leader-follower configuration and the followers need to be close to the leader. Because of their need to stay close together, the intruder UAVs are moving as a flock. We furthermore assume that this flock of intruder UAVs lies within a circle of radius R. A scenario comprising five UAVs performing a cooperative pursuit of an intruder swarm bounded within a circle is illustrated in FIG. 4.

Engagement Geometry Kinematics

Let $\vec{r}_1, \ldots, \vec{r}_n$ represent the position vectors of the pursuing UAVs, and $V_1, V_n$ represent their respective velocity vectors. Let $V_B$ represent the velocity vector of the circle encompassing the intruder UAV swarm. Consider a virtual point X that lies in the convex hull of $A_1, \ldots, A_n$, defined by:

$$\vec{X} = \Sigma_{i=1}^n \lambda_i \vec{r}_i, \Sigma_{i=1}^n \lambda_i = 1, \lambda_i > 0, i=1, \ldots, n \tag{7}$$

An algorithm to compute $(\lambda_1, \ldots, \lambda_n)$ is discussed in Section D. The chosen $(\lambda_1, \ldots, \lambda_n)$ combination is then used to compute the velocity vector $\vec{V}_X$ of point X as follows:

$$\vec{V}_X = \lambda_1 \vec{V}_1 + \ldots + \lambda_n \vec{V}_n \tag{8}$$

Let $V_1, \ldots, V_n$ represent the speeds of $A_1, \ldots, A_n$, and let the angles of the associated velocity vectors (with respect to a reference line) be $\alpha_1, \ldots, \alpha_n$, respectively. Then, $$\vec{V}_X = \begin{bmatrix} \lambda_1 V_1 \cos\alpha_1 + \ldots + \lambda_n V_n \cos\alpha_n \\ \lambda_1 V_1 \sin\alpha_1 + \ldots + \lambda_n V_n \sin\alpha_n \end{bmatrix} \tag{9}$$

The magnitude of $\vec{V}_X$ is then given by:

$$V_X = (\lambda_1 V_1 \cos\alpha_1 + \ldots + \lambda_n V_n \cos\alpha_n)^2 + (\lambda_1 V_1 \sin\alpha_1 + \ldots + \lambda_n V_n \sin\alpha_n)^2 \tag{10}$$

The angle made by $\vec{V}_X$ with respect to the reference line is denoted by $\alpha_X$ and is given by:

$$\alpha_X = \tan^{-1}\left(\frac{\lambda_1 V_1 \sin\alpha_1 + \ldots + \lambda_n V_n \sin\alpha_n}{\lambda_1 V_1 \cos\alpha_1 + \ldots + \lambda_n V_n \cos\alpha_n}\right) \tag{11}$$

Let $V_B$ represent the speed of B, and let $\beta$ denote the angle made by $\vec{V}_B$ with respect to the horizontal. Defining $r_X = XP$, and $\theta_X$ as the angular bearing of the line XP, the relative velocity components of B with respect to X are given by:

$$V_{\theta,X} = V_B \sin(\beta - \theta_X) - V_X \sin(\alpha_X - \theta_X)$$

$$V_{r,X} = V_B \cos(\beta - \theta_X) - V_X \cos(\alpha_X - \theta_X) \tag{12}$$

Let $\alpha_1, \ldots, \alpha_n$ represent the magnitudes of the applied accelerations of $A_1, \ldots A_n$, and these are applied at angles $\delta_i, \ldots, \delta_n$, respectively, with these angles measured with respect to a reference line. Then, the nonlinear state equations governing the kinematics between the point X and center P of the circle, represented in a polar coordinate frame, are as follows:

$$\dot{r}_X = V_{r,X} \tag{13}$$

$$\dot{\theta}_X = \frac{V_{\theta,X}}{r_X} \tag{14}$$

$$\dot{V}_{\theta,X} = -\frac{V_{\theta,X} V_{r,X}}{r_X} - \dot{V}_X \sin(\alpha_X - \theta_X) - \dot{\alpha}_X V_X \cos(\alpha_X - \theta_X) \tag{15}$$

$$\dot{V}_{r,X} = \frac{V_{\theta,X}^2}{r_X} - \dot{V}_X \cos(\alpha_X - \theta_X) + \dot{\alpha}_X V_X \sin(\alpha_X - \theta_X) \tag{16}$$

$$\dot{V}_X = \frac{1}{V_X}\left[(-\lambda_X \sin\alpha_1 + \lambda_Y \cos\alpha_1)\lambda_1 V_1 \dot{\alpha}_1 + \ldots + (-\lambda_X \sin\alpha_n + \lambda_Y \cos\alpha_n)\lambda_n V_n \dot{\alpha}_n + \right.$$
$$\left. (\lambda_X \cos\alpha_1 + \lambda_Y \sin\alpha_1)\lambda_1 \dot{V}_1 + \ldots + (\lambda_X \cos\alpha_n + \lambda_Y \sin\alpha_n)\lambda_n \dot{V}_n\right] \tag{17}$$

$$\dot{\alpha}_X = \frac{1}{\lambda_X^2 + \lambda_Y^2}\left[(\lambda_X \cos\alpha_1 + \lambda_Y \sin\alpha_1)\lambda_1 V_1 \dot{\alpha}_1 + \ldots + (\lambda_X \cos\alpha_n + \lambda_Y \sin\alpha_n)\lambda_n V_n \dot{\alpha}_n + \right.$$
$$\left. (\lambda_X \sin\alpha_1 - \lambda_Y \cos\alpha_1)\lambda_1 \dot{V}_1 + \ldots + (\lambda_X \sin\alpha_n - \lambda_Y \cos\alpha_n)\lambda_n \dot{V}_n\right] \tag{18}$$

$$\dot{\alpha}_i = \frac{a_i \sin(\delta_i - \alpha_i)}{V_i}, \quad i = 1, \ldots, n \tag{19}$$

$$\dot{V}_i = a_i \cos(\delta_i - \alpha_i), \quad i = 1, \ldots, n \tag{20}$$

Note that Eqs. 17 and 18 above are obtained by differentiating Eqs. 10 and 11, respectively, with respect to time. In these equations, $\lambda_X$ and $\lambda_Y$ are defined as:

$$\lambda_X = \lambda_1 V_1 \cos\alpha_1 + \ldots + \lambda_n V_n \cos\alpha_n \tag{21}$$

$$\lambda_Y = \lambda_1 V_1 \sin\alpha_1 + \ldots + \lambda_n V_n \sin\alpha_n \tag{22}$$

Eqs 19 and 20 represent the lateral and longitudinal acceleration components, respectively, of the ith UAV. Eqs 13-20 thus govern the kinematics of the relative velocity between any point X residing in the convex hull of the pursuing UAVs $A_1, \ldots, A_n$, and the center of the target circle B, when B is non-maneuvering, that is, B moves with constant velocity. The guidance problem is addressed in this section is to determine suitable accelerations of the pursuing UAVs so that they cooperatively steer the velocity vector of X, such that X intercepts the target circle.

Cooperative Pursuit Laws for Non-Maneuvering Target

Cooperative pursuit laws for the scenario when the target moves with constant velocity, i.e., it is non-maneuvering are determined below. From Eq 4, a collision cone function $y_X$ can be defined as follows:

$$y_X = \frac{r_X^2 V_{\theta,X}^2}{V_{\theta,X}^2 + V_{r,X}^2} - R^2 \tag{23}$$

The condition $y_X < 0$, $V_{r,X} < 0$ indicates that the current velocity vector of X, (that is, $\vec{V}_X$) is such that X is on a path to intercept with the target circle B. If the initial conditions of the engagement are such that $y_X<0$, $V_{r,X}<0$ is not satisfied (See FIG. 4 for an illustration), then the pursuing UAVs need to apply appropriate accelerations so that the velocity vector of X is driven into the $y_X<0, V_{r,X}<0$ region. Toward this end, we employ a Lyapunov function technique. Lyapunov functions can be used to design controls for systems with nonlinear dynamics, and may provide global asymptotic stability properties. A scalar positive definite Lyapunov function Z may be defined as follows:

$$Z = \tfrac{1}{2}(y_X - w)^2 \qquad (24)$$

where, w is a reference value, which is chosen to satisfy $-R^2 < w < 0$. Note that driving this Lyapunov function to zero is equivalent to driving the velocity vector of X into the collision cone to the target. Then, the derivative of the Lyapunov function (Eq. 24) is $\dot{Z} = (y_X - w)\dot{y}_X$, where $\dot{y}_X$ is as follows:

$$\frac{dy_X}{dt} = \frac{\partial y_X}{\partial r_X}\dot{r}_X + \frac{\partial y_X}{\partial V_{r,X}}\dot{V}_{r,X} + \frac{\partial y_X}{\partial V_{\theta,X}}\dot{V}_{\theta,X} \qquad (25)$$

Evaluating the above along the system trajectories given by Eqs. 13-20, and rearranging terms in the resulting equation leads to the following:

$$\dot{y}_X = \frac{\partial y_X}{\partial V_{r,X}}\left[-\dot{V}_X\cos(\alpha_X - \theta_X) + \dot{\alpha}_X V_X \sin(\alpha_X - \theta_X)\right] + \frac{\partial y_X}{\partial V_{\theta,X}}\left[-\dot{V}_X\sin(\alpha_X - \theta_X) - \dot{\alpha}_X V_X\cos(\alpha_X - \theta_X)\right] \qquad (26)$$

$$= -\dot{V}_X = \left[\frac{\partial y_X}{\partial V_{r,X}}\cos(\alpha_X - \theta_X) + \frac{\partial y_X}{\partial V_{\theta,X}}\sin(\alpha_X - \theta_X)\right] + \dot{\alpha}_X V_X\left[\frac{\partial y_X}{\partial V_{r,x}}\sin(\alpha_X - \theta_X) - \frac{\partial y_X}{\partial V_{\theta,X}}\cos(\alpha_X - \theta_X)\right]$$

The control inputs may be defined as $u_{\alpha,i}$ and $u_{V,i}$, where $u_{\alpha,i} \equiv \dot{\alpha}_i$ and $u_{V,i} \equiv \dot{V}_i$, represent the acceleration components governing the heading and speed change, respectively, of UAV $A_i$. Here, $u_{V,i}$ represents the longitudinal acceleration and the lateral acceleration is computed from $u_{\alpha,i} V_i$. These control inputs may be determined so that they will force the Lyapunov function Z to follow the dynamics $\dot{Z}=-KZ$. Choosing the constant K to satisfy $K>0$ will render $\dot{Z}$ to be negative definite, and Z to be globally exponentially stable. By substituting $\dot{V}_X$ from Eq. 17 and $\dot{\alpha}_X$ from Eq. 18 into Eq. 26, it is evident that we can enforce Z to follow the dynamics $\dot{Z}=-KZ$, if the accelerations of the pursuing UAVs satisfy the equation:

$$\lambda_1(N_{1\alpha}u_{\alpha,1} + N_{1v}u_{V,1}) + \ldots + \lambda_n(N_{n\alpha}u_{\alpha,n} + N_{nv}u_{V,n}) = -K(y_X - w) \qquad (27)$$

where, $N_{i\alpha}$ and $N_{iv}$ are as follows:

$$N_{i\alpha} = \frac{V_i}{V_X}\left[\frac{\partial y_X}{\partial V_{r,X}}\cos(\alpha_X - \theta_X) + \frac{\partial y_X}{\partial V_{\theta,X}}\sin(\alpha_X - \theta_X)\right][\lambda_X\sin\alpha_i - \lambda_Y\cos\alpha_i] + \qquad (28)$$

$$\frac{V_X V_i}{\lambda_X^2 + \lambda_Y^2}\left[\frac{\partial y_X}{\partial V_{r,X}}\sin(\alpha_X - \theta_X) - \frac{\partial y_X}{\partial V_{\theta,X}}\cos(\alpha_X - \theta_X)\right][\lambda_X\cos\alpha_i + \lambda_Y\sin\alpha_i]$$

$$N_{iv} = \frac{-1}{V_X}\left[\frac{\partial y_X}{\partial V_{r,X}}\cos(\alpha_X - \theta_X) + \frac{\partial y_X}{\partial V_{\theta,X}}\sin(\alpha_X - \theta_X)\right][\lambda_X\cos\alpha_i + \lambda_Y\sin\alpha_i] + \qquad (29)$$

$$\frac{V_X}{\lambda_X^2 + \lambda_Y^2}\left[\frac{\partial y_X}{\partial V_{r,X}}\sin(\alpha_X - \theta_X) - \frac{\partial y_X}{\partial V_{\theta,X}}\cos(\alpha_X - \theta_X)\right][\lambda_X\sin\alpha_i - \lambda_Y\cos\alpha_i]$$

It is evident that Eq. 27 represents a single equation in 2n unknowns $(u_{\alpha,1}, \ldots, u_{\alpha,n})$ and $(u_{V,1}, \ldots, u_{V,n})$, which are the heading angle rates and longitudinal accelerations, respectively, of the pursuing UAVs. There are thus multiple combinations of the lateral and longitudinal accelerations of the pursuing UAVs that can satisfy. If the pursuing UAVs are capable of only changing their heading angles (that is, they always move with constant speed), then in order for X to intercept B, the equation governing the heading angle rates of the pursuing UAVs is obtained by setting $u_{V1}, \ldots, u_{Vn}$ in Eq. 27 to be identically zero. This leads to the following equation:

$$\lambda_1 N_{1\alpha}u_{\alpha,1} + \ldots + \lambda_n N_{n\alpha}u_{\alpha,n} = K(y_X - w) \qquad (30)$$

In Eq. 27, K is a constant. If the initial conditions are such that $V_{r,X}<0$, then we choose $K>0$ to ensure that the Lyapunov function Z decays to zero. Note that since we are enforcing $\dot{Z}=-KZ$, therefore Z will follow the dynamics $Z(t)=Z(0)e^{-Kt}$, where Z(0) represents the initial value of the Lyapunov function. The decay in Z is thus exponential in nature. We now choose K such that Z decays to $\epsilon$ (where $\epsilon$ is a small number) within a time that is shorter than $t_{m,X}$, which (from Eq. 3) is:

$$t_{m,X} = \frac{-r_X V_{r,X}}{V_{\theta,X}^2 + V_{r,X}^2} \qquad (31)$$

From the expression for Z(t), it can be seen that the requisite K that will achieve this is given by:

$$K > \frac{1}{t_{m,X}}\ln\left[\frac{Z(0)}{\epsilon}\right] \qquad (32)$$

Thus, for a constant velocity target, when the initial conditions are such that $V_{r,X}<0$, then if the control inputs of the pursuing UAVs satisfy Eq. 27, and $K>0$ is chosen as above, then X will intercept B.

The required sensor data is the target velocity, range and bearing to the target from each of the individual UAVs, as well as the radius of the target UAV circle. The radius R of the target UAV circle can be extracted from image data obtained from camera(s) mounted on the pursuing UAVs. Then, knowing R, the reference point w is chosen so as to satisfy $-R^2 < w < 0$, in order to ensure interception.

To compute K from Eq. 32, $Z(0)$ is needed and $t_{m,X}$. $Z(0)$ is computed from Eq. 24, and requires the use of $y_X(0)$. $y_X(0)$ is computed from Eq. 23, while $t_{m,X}$ is computed from Eq. 31, and these require the values of $r_X(0)$, $V_{\theta,X}(0)$, $V_{r,X}(0)$. These are computed using Eqs. 7-12, in conjunction with the chosen values of $(\lambda_1, \ldots, \lambda_n)$.

When the initial conditions are such that $V_{r,X} > 0$, then the velocity vector $\vec{V}_X$ first needs to be steered into the $V_{r,X} < 0$ region (See FIG. 3). This can be achieved by using Eq. 27 with an initial value of $K<0$. This will drive $\vec{V}_X$ into the $V_{r,X} < 0$ region, after which we subsequently switch the sign of K to a value $K>0$.

Cooperative Pursuit Laws that Account for Target's Acceleration

In this section, the developed guidance law Eq. 27 is modified so that it explicitly accounts for the target's lateral acceleration $a_B$. It is assumed that the target swarm maneuvers are such that its acceleration vector acts normal to its velocity vector, that is, the target may change its direction but otherwise moves with constant speed. When B has an acceleration of magnitude $a_B$, then the time derivatives of the relative velocity components and the heading angle of B are as follows:

$$\dot{V}_{\theta,X} = \tag{33}$$
$$-\frac{V_{\theta,X} V_{r,X}}{r,X} - \dot{V}_X \sin(\alpha_X - \theta_X) - \dot{\alpha}_X V_X \cos(\alpha_X - \theta_X) + a_B \cos(\beta - \theta)$$

$$\dot{V}_{r,X} = \frac{V_{\theta,X}^2}{r_X} - \dot{V}_X \cos(\alpha_X - \theta_X) + \dot{\alpha}_X V_X \sin(\alpha_X - \theta_X) - a_B \sin(\beta - \theta) \tag{34}$$

$$\dot{\beta} = a_B / V_B \tag{35}$$

The kinematics of the engagement between then pursuing UAVs and the maneuvering target are given by Eqs. 13, 14, 17-20 and 33-35.

The quantity $y_X$ is, in general, a function that provides the predicted miss-distance. When all the pursuing UAVs $A_1, \ldots, A_n$ as well as the target B are not maneuvering, then $y_X$ is a constant in time, and is a function of the actual miss-distance. When B is maneuvering, the quantity $y_X$ represents a predicted miss-distance function and varies with time. At any time $t_1$, $y_X(t_1)$ represents a prediction of what the miss distance function would be if the target were to move with constant velocity for all future time $t > t_1$. Eventually, this predicted miss-distance converges to the actual miss distance.

If we drive the Lyapunov function Z to zero, then we are essentially forcing this predicted miss-distance to the reference value w, at each instant in time. Since this predicted miss-distance only eventually converges to the actual miss-distance, therefore, for a maneuvering target, driving Z to zero represents a sufficient condition for X to intercept B.

Differentiating the Lyapunov function Eq. 24 along the trajectories of the system defined by Eqs. 13, 14, 17-20 and 33-35, ensures that Eq. 24 follows the dynamics $\dot{Z} = -KZ$, if the control inputs of the pursuing UAVs follow the equation:

$$\lambda_1 (N_{1a} u_{\alpha,1} + N_{1v} u_{V,1}) + \ldots + \lambda_n (N_{na} u_{\alpha,n} + N_{nv} u_{V,n}) = \tag{36}$$
$$-K(y_X - w) + a_B \left[ \frac{\partial y_X}{\partial V_{\theta,X}} \cos(\beta - \theta_X) - \frac{\partial y_X}{\partial V_{r,X}} \sin(\beta - \theta_X) \right]$$

In Eq. 36, if K is large enough to ensure that Z is driven to zero in time less than $t_{m,X}$, then X is on a path to intercept B.

Assume that at t=0, all the pursuing UAVs are moving in a formation with identical velocities. Refer Eqs. 27 and 36. Each of these represent a single equation with 2n unknowns, and in each of them, one of the solutions corresponds to the case of equal lateral accelerations and equal longitudinal accelerations of the n pursuing UAVs. Employing this solution will cause the pursuing UAVs to move towards the target with no change in either their formation shape, or the formation orientation. On the other hand, when Eqs 27 and 26 are employed with unequal accelerations, then the formation shape and orientation will change as it approaches the target. In Section 4, we show how to obtain the particular solution of Eqs. 27 and 36 that will ensure that the formation approaches the target with an orientation change, while otherwise remaining rigid. In Section 5, we show how to obtain the particular solution of Eqs. 27 and 36 that will ensure that the formation performs an orientation change, as well as a change in the lengths of the formation edges.

Computation of $\lambda_1, \ldots, \lambda_n$

The computation of the quantities $(\lambda_1, \ldots, \lambda_n)$ in Eq. 7 will now be introduced. From Caratheodory's Theorem, when $n>3$, then the representation of $\vec{X}$ may not be unique in the sense that there can be more than one $(\lambda_1, \ldots, \lambda_n)$ tuple that corresponds to the same point $\vec{X}$. So in our case, we first choose the coordinates of point X at time t=0, and then take any $(\lambda_1, \ldots, \lambda_n)$ tuple that will correspond to that point X. Note that if we choose $\lambda_i = 0$ for any i, then that UAV does not participate in the guidance laws Eqs. 27 and 36, as a consequence of which the acceleration of that UAV cannot be computed from Eqs. 27 and 36. To ensure that this does not occur, we necessarily require that $\lambda_i > 0$, $\forall i$.

The chosen point X lies at the centroid of the convex hull, we then chose $$\lambda_1 = \ldots = \lambda_n = \frac{1}{n}.$$

There can be scenarios when it would be better to choose X to be a point different from the centroid of the convex hull.

The scenarios requiring unequal values of $\lambda_1$ can be understood from the notion of the Chebyshev center. Here, a definition that the Chebyshev center is the center of the largest radius circle that can be inscribed within a polygon is adopted. If the Chebyshev center is not located at the centroid of the polygon formed by the pursuing UAVs, then unequal values of $\lambda_i$ will be required.

An algorithm to compute $\lambda_1, \ldots, \lambda_n$ is as follows. For a given $\vec{X}$, find $\lambda_1, \ldots, \lambda_n$:

$$\text{minimize} \sum_{i=1}^{n} \left( \lambda_i - \frac{1}{n} \right)^2$$

subject to constraints:

$$\lambda_i > 0, \Sigma_{i=1}^n \lambda_i = 1, \Sigma_{i=1}^n \lambda_i A_i = X \tag{37}$$

Guidance Laws for Pursuing UAVs with a Ropeline (or Suspended Net)

Figure 5:
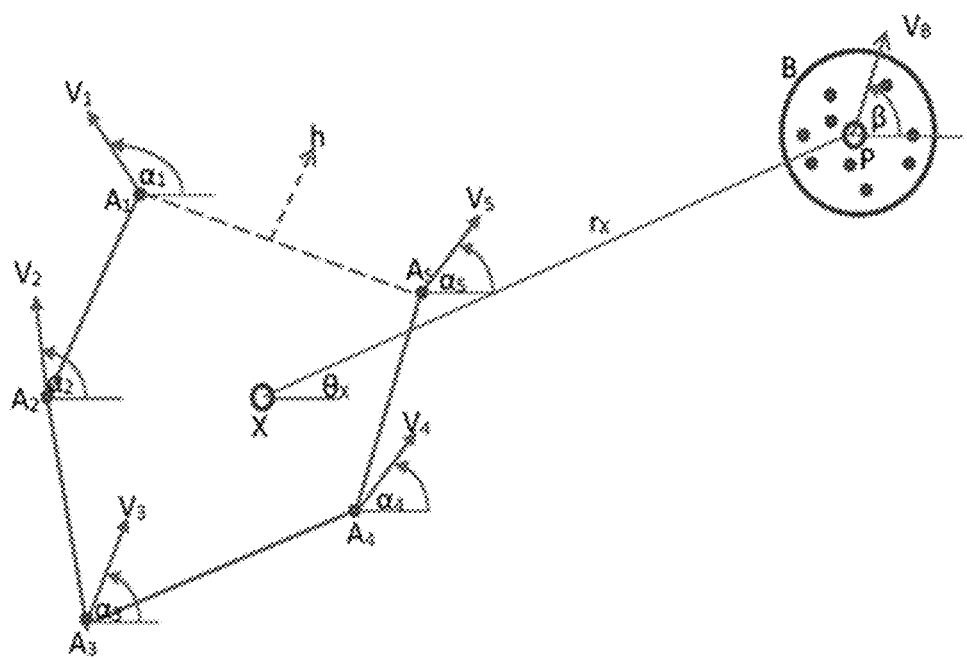
FIG. 5 illustrates a schematic of 5 UAVs pursuing a target UAV swarm, while carrying a ropeline $A_1 A_2 A_3 A_4$.

In a scenario where the pursuing UAVs are carrying a ropeline (or suspended net) with which they wish to surround the target. The rope essentially forms an open chain as depicted in FIG. 5 (where the solid edges of the polygon represent the rope). In such a scenario, the UAVs may need to reorient the formation appropriately so that the formation approaches the target from the direction of the open end of the chain. More precisely, if $\hat{n}$ represents the unit normal to the line joining the pair of UAVs that are carrying the open end of the chain, we would like the UAVs to apply the requisite accelerations that will enable them to move towards the target, while simultaneously rotating the formation so as to orient $\hat{n}$ appropriately. In FIG. 5, the ropeline is formed by UAVs $A_1 A_2 A_3 A_4 A_5$, while UAVs $A_1$ and $A_5$ carry the open ends of the rope. Therefore, the normal of interest in this figure is the normal to the line joining UAVs $A_1$ and $A_5$.

Assuming that the sizes of the target circle and the polygon $A_1 \ldots A_n$ formed by the pursuing UAVs are such that (i) the open edge of the polygon is of length greater than the diameter of the circle, and (ii) the perimeter of the polygon is greater than the circumference of the circle B.

The problem addressed in this section is to develop guidance laws governing the longitudinal and lateral accelerations of then pursuing UAVs with which, the pursuing UAVs can simultaneously achieve the following:

Objective a) Drive the velocity vector of any chosen point X in their convex hull into the collision cone to the target swarm B, Objective b) Rotate their formation appropriately so that they approach the target swarm along a direction that corresponds with the open end of the chain, and Objective c) Maintain the distances between the UAVs to be constant, that is, the formation to be rigid.

Objective a: To meet this objective, we determine the equation governing the longitudinal and lateral accelerations of the pursuing UAVs that will drive $y_X$ to a reference value w<0, since $y_X$<0 corresponds to the physical scenario of the velocity vector of X being inside the collision cone to the target. For a maneuvering target, this objective is met if the control inputs of the pursuing UAVs satisfy Eq. 36. If the target is non-maneuvering, then Eq. 36 reduces to Eq. 27.

Figure 6:
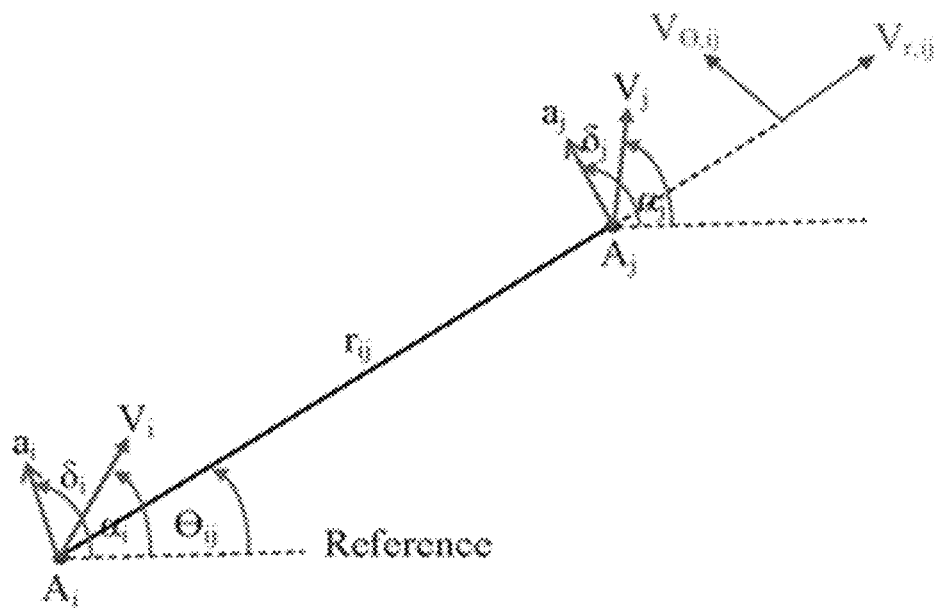
FIG. 6. illustrates a schematic of a ropeline between UAVs $A_i$ and $A_j$.

Objective b: In order to meet this objective, Eq. 36 is combined with additional conditions that will enable the formation to be oriented appropriately. Toward determining these additional conditions, we look at the kinematics of each of the lines $A_i A_j$. The states governing each line $A_i A_j$ are represented by the quantities $r_{ij}$, $\theta_{ij}$, $V_{\theta,ij}$ and $V_{r,ij}$. These quantities are schematically shown in FIG. 6. The governing kinematic equations are as follows:

$$\begin{bmatrix} \dot{r}_{ij} \\ \dot{\theta}_{ij} \\ \dot{V}_{\theta,ij} \\ \dot{V}_{r,ij} \end{bmatrix} = \begin{bmatrix} V_{r,ij} \\ V_{\theta,ij}/r_{ij} \\ (-V_{\theta,ij} V_{r,ij})/r_{ij} \\ (V_{\theta,ij}^2)/r_{ij} \end{bmatrix} - \begin{bmatrix} 0 \\ 0 \\ \sin(\delta_i - \theta_{ij}) \\ \cos(\delta_i - \theta_{ij}) \end{bmatrix} a_i + \begin{bmatrix} 0 \\ 0 \\ \sin(\delta_j - \theta_{ij}) \\ \cos(\delta_j - \theta_{ij}) \end{bmatrix} a_j \quad (38)$$

where, $\delta_i$ and $\delta_j$ represent the directions of the acceleration vectors of $a_i$ and $a_j$, respectively. From Eq. 38, it is evident that when $\vec{a}_i = \vec{a}_j$ then the relative velocity component of $A_j$ with respect to $A_i$ is zero, that is, $V_{r,ij} = 0$, $V_{\theta,ij} = 0$ and $r_{ij}$ is constant.

Now consider the two UAVs carrying the open ends of the rope. Without loss of generality, assume that these two UAVs are $A_1$ and $A_n$. Then, $\theta_{1n}$ represents the angle made by the line $A_1 A_n$. Let $\theta_{1n,d}$ represent the desired orientation of this line. We define an error quantity $e_{\theta,1n} = \theta_{1n} - \theta_{1n,d}$. Differentiating $e_{\theta,1n}$ twice, we get the following:

$$\ddot{e}_{\theta,1n} = \frac{r_{1n} \dot{V}_{\theta,1n} - V_{\theta,1n} V_{r,1n}}{r_{1n}^2} - \ddot{\theta}_{1n,d} \quad (39)$$

The quantity $e_{\theta,1n}$ follows the dynamics $\ddot{e}_{\theta,1n} = -K_1 \dot{e}_{\theta,1n} - K_2 e_{\theta,1n}$, (where, $K_1 > 0$ and $K_2 > 0$ are constants). Such a choice ensures that $e_{\theta,1n}$ follows stable dynamics and decays to zero. After substituting terms from Eq. 38, it is required that the accelerations of $A_1$ and $A_n$ satisfy the following equation:

$$-a_1 \sin(\delta_1 - \theta_{1n}) + a_n \sin(\delta_n - \theta_{1n}) = V_{\theta,1n}(2V_{r,1n}/r_{1n} - K_1) - r_{1n}K_2(\theta_{1n} - \theta_{1n,d}) + r_{1n}K_1 \dot{\theta}_{1n,d} \quad (40)$$

The above equation can then be written in terms of the control inputs $u_{\alpha,1}$, $u_{V,1}$, $u_{\alpha,n}$, $u_{V,n}$ as follows:

$$-u_{\alpha,1} V_1 \cos(\alpha_1 - \theta_{1n}) - u_{V,1} \sin(\alpha_1 - \theta_{1n}) + u_{\alpha,n} V_n \cos(\alpha_n - \theta_{1n}) + u_{V,n} \sin(\alpha_n - \theta_{1n}) = V_{\theta,1n}(2V_{r,1n}/r_{1n} - K_1) - r_{1n}K_2(\theta_{1n} - \theta_{1n,d}) + r_{1n}K_1 \dot{\theta}_{1n,d} \quad (41)$$

If the control inputs are applied such that (36) and (41) are satisfied, then the pursuing UAVs will be able to surround the target with the rope at the appropriate orientation. The reference value $\theta_{1n,d}$ would be equal (or close) to $$\alpha_X + \frac{\pi}{2}.$$

Objective c: This requirement dictates that the distances between the UAVs need to remain constant throughout the engagement. a n-sided polygon can be triangulated into n−2 distinct triangles. As an example, the pentagon $A_1 A_2 A_3 A_4 A_5$ in FIG. 6 can be triangulated into three triangles $A_5 A_1 A_2$, $A_5 A_2 A_3$ and $A_5 A_3 A_4$. It can be ensured that the pentagon will remain rigid if each of these three triangles remain rigid, or in other words, each of the seven sides $A_1 A_2$, $A_2 A_3$, $A_3 A_4$, $A_4 A_5$, $A_5 A_1$, $A_5 A_2$ and $A_5 A_3$ remain of constant length. A general n-sided polygon will remain rigid, if 2n−3 inter UAV-distances (between UAV pairs chosen based on a triangulation of the polygon) remain constant. Let E represent the set of these 2n−3 inter UAV-distances.

The distance between a UAV pair $(A_i, A_j)$ can be kept constant if the accelerations of UAVs $A_i$ and $A_j$ are such that $\dot{V}_{r,ij} = 0$ (with the assumption that the initial conditions are such that $V_{r,ij} = 0$). From Eq. 38, $\dot{V}_{r,ij} = 0$ will hold, if the following condition is satisfied:

$$-a_i \cos(\delta_i - \theta_{ij}) + a_j \cos(\delta_j - \theta_{ij}) = V_{\theta,ij}^2/r_{ij}, \forall (i,j) \in E \quad (42)$$

The above equation can then be written in terms of the control inputs $u_{\alpha,i}$, $u_{V,i}$, $u_{\alpha,j}$, $u_{V,j}$ as follows:

$$u_{V,i} \cos(\alpha_i - \theta_{ij}) - u_{\alpha,i} V_i \sin(\alpha_i - \theta_{ij}) - u_{V,j} \cos(\alpha_j - \theta_{ij}) + u_{\alpha,j} V_j \sin(\alpha_j - \theta_{ij}) = V_{\theta,ij}^2/r_{ij}, \forall (i,j) \in E \quad (43)$$

Eqs 27, 41 and 43 can now be combined and written in the following matrix form AU=Y:

$$\begin{bmatrix} \lambda_1 N_{\alpha,1} & \lambda_1 N_{V,1} & \lambda_2 N_{\alpha,2} & \lambda_2 N_{V,2} & \cdots & \cdots & \lambda_{n-1} N_{\alpha,n-1} & \lambda_{n-1} N_{V,n-1} & \lambda_n N_{\alpha,n} & \lambda_n N_{V,n} \\ -V_1 s_1 & c_1 & V_2 s_2 & -c_2 & 0 & 0 & 0 & 0 & 0 & 0 \\ \vdots & \vdots & \vdots & \vdots & \vdots & \vdots & \vdots & & \vdots & \vdots \\ 0 & 0 & 0 & 0 & 0 & 0 & -V_{n-1} s_{n-1} & c_{n-1} & V_n s_n & -c_n \\ -V_1 c_1 & -s_1 & 0 & 0 & 0 & 0 & 0 & 0 & V_n c_n & s_n \end{bmatrix} \quad (44)$$

$$\begin{bmatrix} u_{\alpha,1} \\ u_{V,1} \\ u_{\alpha,2} \\ u_{V,2} \\ \vdots \\ u_{\alpha,n-1} \\ u_{V,n-1} \\ u_{\alpha,n} \\ u_{V,n} \end{bmatrix} = \begin{bmatrix} -K(y_X - w) + a_B \left[ \dfrac{\partial y_X}{\partial V_{\theta,X}} \cos(\beta - \theta_X) - \dfrac{\partial y_X}{\partial V_{r,X}} \sin(\beta - \theta_X) \right] \\ V_{\theta,12}^2 / r_{12} \\ \vdots \\ V_{\theta,n-1,n}^2 / r_{n-1,n} \\ V_{\theta,1n}(2 V_{r,1n} / r_{1n} - K_1) - r_{1n} K_2 (\theta_{1n} - \theta_{1n,d}) + r_{1n} K_1 \dot{\theta}_{1n,d} \end{bmatrix}$$

where, we have used the shorthand notation that for every pair of adjacent UAVs i and j, $s_i \equiv \sin(\alpha_i - \theta_{ij})$, $s_j = \sin(\alpha_j - \theta_{ij})$ and $c_i = \cos(\alpha_i - \theta_{ij})$, $c_j = \cos(\alpha_j - \theta_{ij})$.

Eq 44 represents a total of 2n−1 equations with 2n unknowns. The 2n−1 equations comprise one equation that drives the collision cone function $y_X$, 2n−3 equations that ensure that the inter-UAV distances are such that the formation remains rigid, and one equation that drives the orientation of the open end $A_1 A_n$ of the chain. The 2n unknowns correspond to the control inputs (longitudinal acceleration and heading angle rate) of each of the n UAVs. This thus represents an under-determined system of equations, with there being one more unknown than the number of equations. Solution of this linear system of equations leads to control inputs of the pursuing UAVs with which objectives (a)-(c) are simultaneously satisfied.

In general, an undetermined system of equations (that are consistent), have non-unique solutions. For the current system (Eq. 44), from the given sizes of the A and Y matrices, it can be determined that the general solution will lie along a line in the $R^{2n}$ control (U) space. A particular solution $U_1$ can be found as $U_1 = A^+ Y$, where $A^+$ is the Moore-Penrose pseudoinverse of A. The general solution is then obtained as $U = U_1 + cN$, where N is the null space of A, and c is a scalar.

it can sometimes happen that the accelerations lead to a trajectory that puts one of the n pursuing UAVs on a collision course with the target. The occurrence of such a collision can be predicted by defining functions $y_1, \ldots, y_n$ representing the miss distance functions of each of n pursuing UAVs to the target circle, similar to Eq. 4, along with the corresponding miss-times $t_{m1}, \ldots, t_{mn}$, similar to Eq. 3. If it is determined that $y_1 < 0, V_{r,i} < 0, t_{mi} < t_{m,X}$ holds for some UAV $A_i$, this means that UAV $A_i$ will collide with the target before X intercepts the target. This collision can be averted by rotating the formation appropriately, and this can be achieved by modifying the reference value $\theta_{1n,d}$ used in Eq. 44. Collisions between the rope and the target circle can be detected and avoided by following a similar process.

Guidance Laws for Time-Varying Target Size

Below is described a scenario where the size of the target changes with time. This could happen, for example, when the vehicles in the intruder swarm spread apart during their flight. At the same time however, we have assumed at the outset that their mission requires them to remain as a flock (given that they are performing a coordinated attack or flying in a leader-follower configuration), and they cannot stray too far apart from one another. We incorporate the effect of such a size change by making the radius of the circle that bounds the target, to be a function of time, that is, R is now R(t). In this case, the pursuers not only need to surround the target, but they may also need to increase their inter-vehicle distances appropriately so that they can enclose the target within their convex hull.

Figure 7:
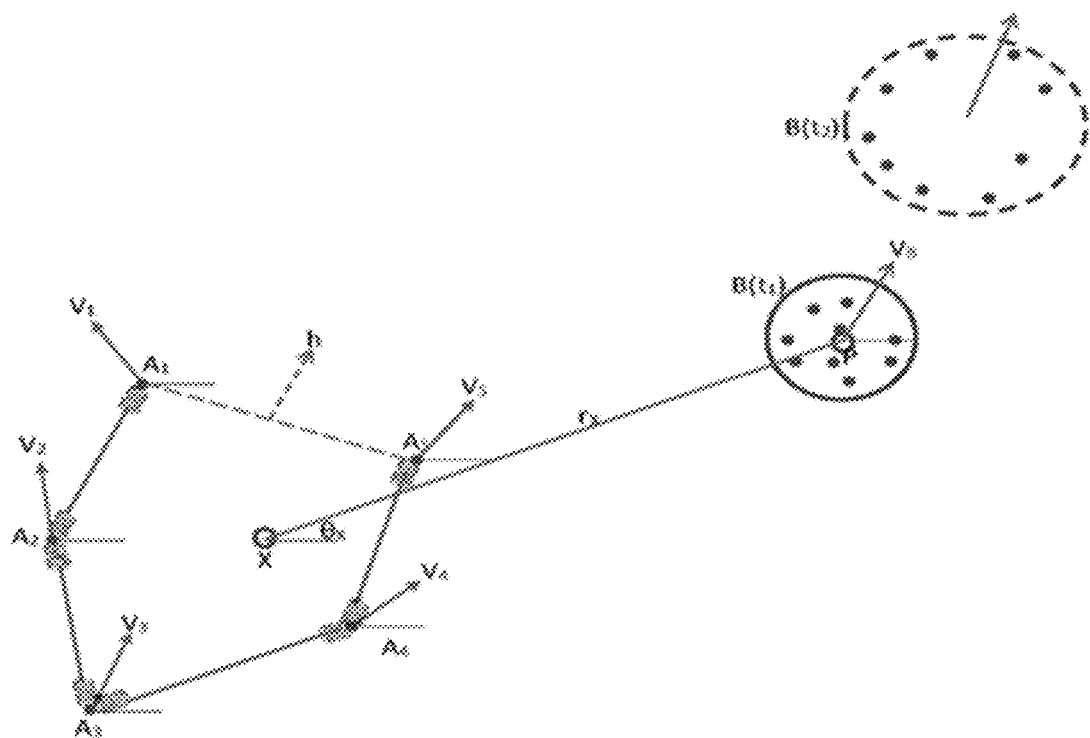
FIG. 7 illustrates a schematic of 5 UAVs $A_1, \ldots, A_5$ pursuing a target UAV swarm, while carrying a stretchable ropeline $A_1 A_2 A_3 A_4 A_5$.

It is assumed that the pursuing UAVs have the ability to vary the length of the rope to some extent. Such a length change can be achieved by means of a spinning reel deployment mechanism (similar to the mechanism used in a fishing rod) that is carried by each UAV. Then, in response to an increase in the size of the target, if the distance between a pair of UAVs needs to increase, those UAVs can extend the rope between them till it is of desired length. Similarly, if the distance between a pair of UAVs needs to decrease, those UAVs reel in the rope between them. since each UAV can carry only a finite amount of cable, the permissible change in the length of the rope is upper bounded. This is schematically depicted in FIG. 7.

The problem addressed in this section is to develop guidance laws governing the longitudinal and lateral accelerations of then pursuing UAVs with which, the pursuing UAVs can simultaneously achieve the following:

Objective a) Drive the velocity vector of any point X in their convex hull into the collision cone to the target swarm B, Objective b) Rotate their formation appropriately so that they approach the target swarm with the open end of the chain at a desired angle, and Objective c) Adjust the edges of their formation to desired values (and these desired values depend on the size of the target).

It is preferable to determine a radius R(t) of the smallest circle that bounds the intruder swarm. The desired values of the edges of the formation then need to be such that the perimeter of the polygon is larger than the circumference of this computed circle.

Objective a: This objective can be met if Eq. 27 is modified to account for the changing radius of the circle. Toward this end, Eq. 4 takes the following form:

$$y_X = \frac{r_X^2 V_{\theta,X}^2}{V_{\theta,X}^2 + V_{r,X}^2} - R(t)^2 \quad (45)$$

The time derivative of $y_X$ is:

$$\frac{dy_X}{dt} = \frac{\partial y_X}{\partial r_X} \dot{r}_X + \frac{\partial y_X}{\partial V_{r,X}} \dot{V}_{r,X} + \frac{\partial y_X}{\partial V_{\theta,X}} \dot{V}_{\theta,X} + \frac{\partial y_X}{\partial R} \dot{R} \quad (46)$$

Note that $$\frac{\partial y_X}{\partial R} = -2R(t).$$

We differentiate the Lyapunov function Eq. 24 along the trajectories of the system defined by Eq. 13-20. After doing so, it is seen that that we can ensure Eq. 24 follows the dynamics $\dot{Z}=-KZ$, if the control inputs of the pursuing UAVs satisfy the following equation, which is the counterpart of Eq. 27:

$$\lambda_1(N_{1\alpha}u_{\alpha,1}+N_{1\nu}u_{V,1})+\ldots+\lambda_n(N_{n\alpha}u_{\alpha,n}+N_{n\nu}u_{V,n})=-K(y_X-w)+2R\dot{R} \quad (47)$$

When the lateral acceleration $a_B$ of the maneuvering swarm is explicitly incorporated in the guidance law, we get the following equation that will ensure that $\dot{Z}=-KZ$ continues to be satisfied even when the target maneuvers:

$$\lambda_1(N_{1\alpha}u_{\alpha,1} + N_{1\nu}u_{V,1}) + \ldots + \lambda_n(N_{n\alpha}u_{\alpha,n} + N_{n\nu}u_{V,n}) = \\ -K(y_X - w) + 2R\dot{R} + a_B\left[\frac{\partial y_X}{\partial V_{\theta,X}}\cos(\beta - \theta_X) - \frac{\partial y_X}{\partial V_{r,X}}\sin(\beta - \theta_X)\right] \quad (48)$$

Objective b: This is met if the accelerations of $A_1$ and $A_n$ satisfy Eq. 41.

Objective c: Consider UAVs $A_i$, $A_j \in E$ that have an inter-UAV distance of $r_{ij}(t)$. Let $r_{ij,d}$ represent the desired inter-UAV distance between this pair of UAVs. We define an error quantity $e_{r,ij}=r_{ij}-r_{ij,d}$. Differentiating $e_{r,ij}$ twice, we get the following:

$$\ddot{e}_{r,ij}=\dot{V}_{r,ij}-\ddot{r}_{ij,d} \quad (49)$$

We enforce that the quantity $e_{r,ij}$ follows the dynamics $\ddot{e}_{r,ij}=-K_3\dot{e}_{r,ij}-K_4 e_{r,ij}$, (where, $K_3>0$ and $K_4>0$ are constants). This choice of dynamics will ensure that $e_{r,ij}$ decays to zero. Then, substituting terms from Eq. 38, we eventually arrive at the following equation governing the accelerations of UAVs $A_i$ and $A_j$:

$$-a_i\cos(\delta_i-\theta_{ij})+a_j\cos(\delta_j-\theta_{ij})=-V_{\theta,ij}^2/r_{ij}-K_3(V_{r,ij}-\dot{r}_{ij,d})-K_4(r_{ij}-r_{ij,d}),\forall(i,j)\in E \quad (50)$$

The above equation can then be written in terms of the control inputs $u_{\alpha,i}$, $u_{V,i}$, $u_{\alpha,j}$, $u_{V,j}$ as follows:

$$u_{\alpha,i}V_i\sin(\alpha_i-\theta_{ij})-u_{V,i}\cos(\alpha_i-\theta_{ij})-u_{\alpha,j}V_j\sin(\alpha_j-\theta_{ij})+\\u_{V,j}\cos(\alpha_j-\theta_{ij})=-V_{\theta,ij}^2/r_{ij}-K_3(V_{r,ij}-\dot{r}_{ij,d})-\\K_4(r_{ij}-r_{ij,d}),\forall(i,j)\in E \quad (51)$$

Eqs. 47, 51 and 43 can now be combined and written in the following matrix form AU=B:

By solving the above matrix equation for the 2n unknowns $u_{\alpha,i}$, $u_{V,i}$, i=1, . . . , n, we can determine the control inputs of the n pursuing UAVs that will simultaneously satisfy Objectives (a)-(c).

Guidance Laws for Arbitrarily-Shaped Intruder Swarms

The guidance laws developed in the preceding sections assumed that the shape of the intruder swarm is bounded within a circle. In cases where the intruder swarm has a somewhat elongated shape, then the circular approximation can represent an over-approximation to the shape of the swarm, and this can be therefore inadequate. In this section, we show how the guidance laws can be modified when the shape of the intruder swarm is arbitrary.

Figure 8:
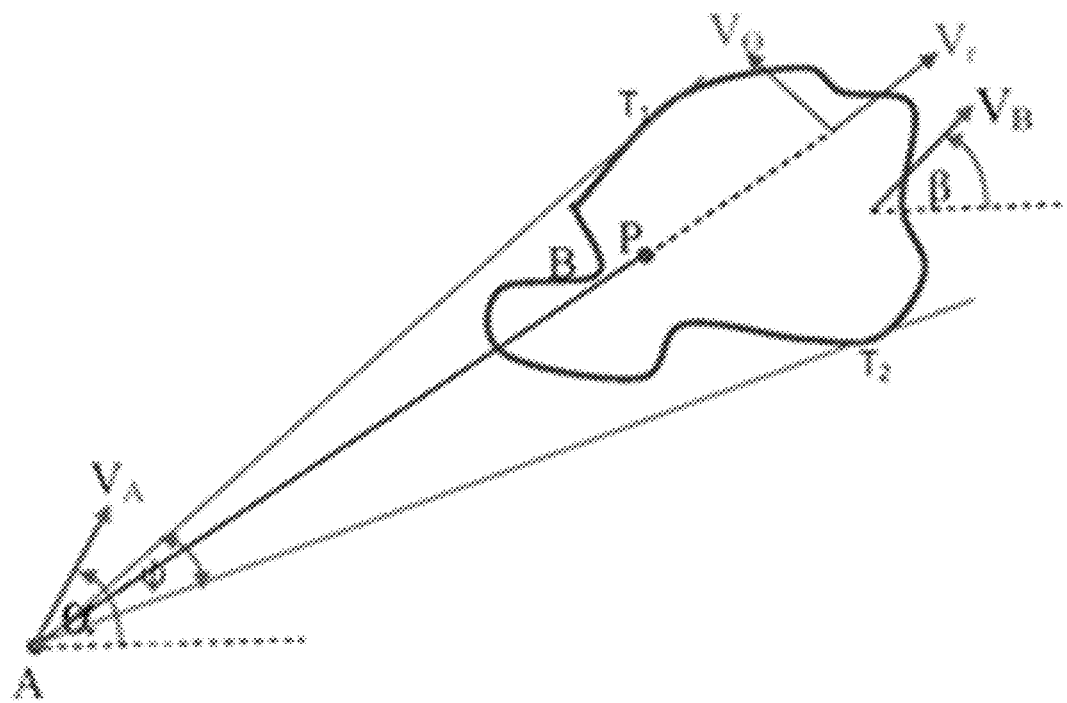
FIG. 8 illustrates an engagement geometry between a point and an arbitrarily shaped object.

By way of background, the following is a result on the collision cone between a point and an arbitrarily shaped object with reference to FIG. 8 point object A is on a collision course with an arbitrarily shaped object B if the condition y<0, $V_{r,b}$<0 is satisfied, where y and $V_{r,b}$ are defined as follows:

$$y = \frac{[V_\theta\cos(\theta_b - \theta) - V_r\sin(\theta_b - \theta)]^2}{V_\theta^2 + V_r^2} - \sin^2\left(\frac{\psi}{2}\right) \quad (53)$$

$$V_{r,b} = V_r\cos(\theta_b - \theta) + V_\theta\sin(\theta_b - \theta) \quad (54)$$

In the above equations, $\psi$ represents the angle subtended at A by the tangent lines $AT_1$ and $AT_2$ to B. $T_1AT_2$ represents the conical hull of B, relative to A, and $\psi$ thus represents the angle of this conical hull. When there exist more than two tangent lines to B, then $AT_1$ and $AT_2$ represent the pair of tangents that are such that B is completely contained within the sector $T_1AT_2$. Note that since B is moving, the conical hull is distinct from the collision cone, which is an entity computed in the relative velocity space. The quantity $\theta_b$ represents the angle made by the angular bisector of $T_1AT_2$ with the horizontal. $V_\theta$ and $V_r$ are the relative velocity components that are respectively normal to, and along, a line from A that passes through a reference point in B. Note that when the arbitrary shape is replaced by a circle, (and the reference point P is the center of this circle), then $$\theta_b = \theta, \sin\left(\frac{\psi}{2}\right) = \frac{R}{r}.$$

Substituting these in Eqs. 53 and 54. these reduce to Eq. 4, and $V_r$, respectively.

$$\begin{bmatrix} \lambda_1 N_{\alpha,1} & \lambda_1 N_{V,1} & \lambda_2 N_{\alpha,2} & \lambda_2 N_{V,2} & \cdots & \cdots & \lambda_{n-1}N_{\alpha,n-1} & \lambda_{n-1}N_{V,n-1} & \lambda_n N_{\alpha,n} & \lambda_n N_{V,n} \\ V_1 s_1 & -c_1 & -V_2 s_2 & c_2 & 0 & 0 & 0 & 0 & 0 & 0 \\ \vdots & \vdots & \vdots & \vdots & \vdots & \vdots & \vdots & \vdots & \vdots & \vdots \\ 0 & 0 & 0 & 0 & 0 & 0 & -V_{n-1}s_{n-1} & c_{n-1} & V_n s_n & -c_n \\ -V_1 c_1 & -s_1 & 0 & 0 & 0 & 0 & 0 & 0 & V_n c_n & s_n \end{bmatrix} \quad (52)$$

$$\begin{bmatrix} u_{\alpha,1} \\ u_{V,1} \\ u_{\alpha,2} \\ u_{V,2} \\ \vdots \\ u_{\alpha,n-1} \\ u_{V,n-1} \\ u_{\alpha,n} \\ u_{V,n} \end{bmatrix} = \begin{bmatrix} -K(y_X - w) + 2R\dot{R} + a_B\left[\frac{\partial y_X}{\partial V_{\theta,X}}\cos(\beta - \theta_X) - \frac{\partial y_X}{\partial V_{r,X}}\sin(\beta - \theta_X)\right] \\ -V_{\theta,12}^2/r_{12} - K_3(V_{r,12} - \dot{r}_{12,d}) - K_4(r_{12} - r_{12,d}) \\ \vdots \\ -V_{\theta,n-1,n}^2/r_{n-1,n} - K_3(V_{r,n-1,n} - \dot{r}_{n-1,n,d}) - K_4(r_{n,n-1} - r_{n,n-1,d}) \\ V_{\theta,1n}(2V_{r,1n}/r_{1n} - K_1) - r_{1n}K_2(\theta_{1n} - \theta_{1n,d}) + r_{1n}K_1\dot{\theta}_{1,nd} \end{bmatrix}$$

Figure 9:
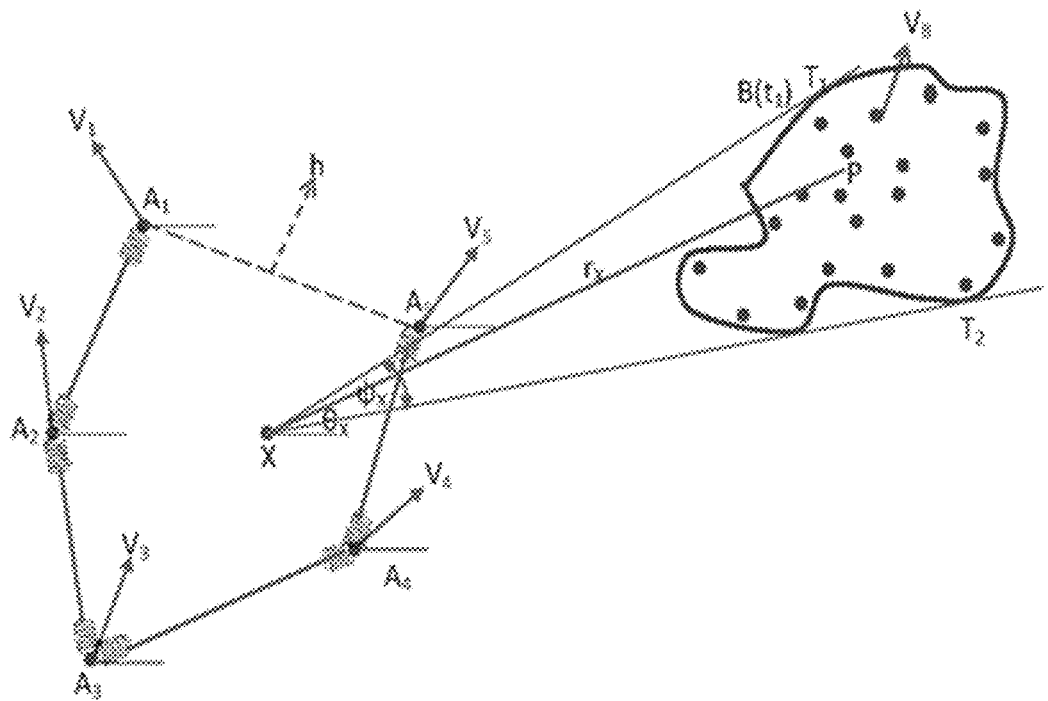
FIG. 9 illustrates a schematic of 5 UAVs carrying a ropeline $A_1 A_2 A_3 A_4 A_5$, pursuing a target UAV swarm of arbitrary shape.

Now consider the engagement geometry between n pursuing UAVs carrying a stretchable ropeline and an arbitrarily shaped swarm, as shown in FIG. 9. We use Eq. 53 to define a function $y_X$ between a point X in the convex hull of the pursuing UAVs and B. In this equation, $\psi_X$ represents the angle subtended by B at the point X. The time derivative of $y_X$ is as follows:

$$\frac{\partial y_X}{\partial dt} = \frac{\partial y_X}{\partial \theta_X}\dot{\theta}_X + \frac{\partial y_X}{\partial \theta_b}\dot{\theta}_b + \frac{\partial y_X}{\partial V_{r,X}}\dot{V}_{r,X} + \frac{\partial y_X}{\partial V_{\theta,X}}\dot{V}_{\theta,X} + \frac{\partial y_X}{\partial \psi_X}\dot{\psi}_X \quad (55)$$

$$= -\dot{V}_X\left[\frac{\partial y_X}{\partial V_{r,X}}\cos(\alpha_X - \theta_X) + \frac{\partial y_X}{\partial V_{\theta,X}}\sin(\alpha_X - \theta_X)\right] +$$

$$\dot{\alpha}_X V_X\left[\frac{\partial y_X}{\partial V_{r,X}}\sin(\alpha_X - \theta_X) - \frac{\partial y_X}{\partial V_{\theta,X}}\cos(\alpha_X - \theta_X)\right] +$$

$$\frac{\partial y_X}{\partial \theta_b}\dot{\theta}_b + \frac{\partial y_X}{\partial \psi_X}\dot{\psi}_X$$

Substituting $\dot{V}_X$ from Eq. 17 and $\dot{\alpha}_X$ from Eq. 18 in the above equation, it is evident that we can enforce the Lyapunov function Z to follow the dynamics $\dot{Z}=-KZ$, if the quantities $u_{\alpha,1}, u_{V,1}, \ldots, u_{\alpha,n}, u_{V,n}$ of the pursuing UAVs satisfy the equation:

$$\lambda_1(N_{1\alpha}u_{\alpha,1} + N_{1v}u_{V,1}) + \ldots + \lambda_n(N_{n\alpha}u_{\alpha,n} + N_{nv}u_{V,n}) = \quad (56)$$

$$-K(y_X - w) - \frac{\partial y_X}{\partial \theta_b}\dot{\theta}_b - \frac{\partial y_X}{\partial \psi_X}\dot{\psi}_X$$

where, $N_{i\alpha}$, i=1, . . . , n is as in Eq. 28, and $N_{iv}$, i=1, . . . , n is as in Eq. 29.

Eq 56 thus represents a generalization of Eq. 27 to the general case of arbitrarily shaped swarms. This equation can be combined with Eq. 41 and Eq. 43 to reorient the formation and lead to a matrix equation along the lines of Eq. 44. Similarly, Eq. 56 can be combined with Eqs. 41 and 51 to reorient the formation as well as change the inter-UAV distances and lead to a matrix equation along the lines of Eq. 44. In the latter case, the reference lengths $r_{ij,d}$ of the formation edges need to be such that the perimeter of the polygon formed by the pursuing UAVs is greater than the perimeter of the swarm.

Thus, as described herein, the present disclosure teaches solutions to the problem of n UAVs needing to pursue, and subsequently surround, a swarm of hostile UAVs (flying as a flock) that has intruded into a protected airspace. The development of analytical cooperative pursuit guidance laws that will meet the objective of the pursuing UAVs, is addressed. These cooperative pursuit guidance laws are developed based on a collision cone framework. Using this framework, analytical cooperative pursuit guidance laws that enable the n UAVs to enclose the intruder swarm within their convex hull are developed, for scenarios where the intruder swarm is enclosed in a bounding circle, and the circle may change size with time. In subsequent variants of this problem, the pursuing UAVs are assumed to be carrying a dragnet in an open-chain configuration, and the collision cone-based guidance laws are further developed to enable the UAVs to re-orient their formation appropriately (so that they approach the target from the open end of this chain), and also adjust their inter-vehicle distances appropriately (so that they are able to surround the target even as the target increases in size). These guidance laws are then generalized to the case when the intruder swarm is arbitrarily shaped. Simulations demonstrate the efficacy of the cooperative guidance laws.

Collision Cone-Based Net Capture of a Swarm of UAVs

Below addresses the problem of capturing a swarm of intruder UAVs, using a net manipulated by a team of defense UAVs. The intruder UAV swarm may be stationary, in motion, and even maneuver. The concept of collision cones in 3-dimensional space is used to determine the strategy used by the net carrying UAVs to maneuver or manipulate the net in space in order to capture the intruders. The manipulation of the net involves guiding the net to pursue the intruders and orienting it in space appropriately so as to maximize the effectiveness of capture. The net manipulation strategy is derived from the concept of collision cones defined in a relative velocity framework, and analytical expressions of nonlinear guidance laws are obtained. Simulations are presented to demonstrate the efficacy of these guidance laws.

Nomenclature

The following nomenclature is used hereinbelow.

| | |
|---|---|
| $\phi$ | Azimuth angle of position vector |
| $\theta$ | Elevation angle of position vector |
| $\psi$ | Azimuth angle of velocity vector |
| $\gamma$ | Elevation angle of velocity vector |
| $\beta$ | Azimuth angle of acceleration vector |
| $\alpha$ | Elevation angle of acceleration vector |
| a | Acceleration magnitude |
| $V_r, V_\theta, V_\phi$ | Relative velocity components |
| V | speed |
| R | Radius of sphere |

Introduction

The problem of a team of UAVs capturing a swarm of intruder UAVs with a net is disclosed hereinbelow. This class of net capture applications, in which a net carried by one or more UAVs, is used to capture a UAV intruding into a guarded airspace, has received considerable recent attention from researchers working on drone technologies due to the obvious need to protect the airspace from a proliferation of unauthorized drones. A related (but distinct) problem is that of net recovery, in which a UAV approaching a landing site (which could be an unprepared runway or a ship deck), is made to land on a net. Most net recovery problems involve a guidance algorithm that guides the UAV to a particular point on the net, with the net being fixed on the ground or on a stationary or moving platform. These methods may be termed as passive when the net carrying platform is either stationary or mobile, but does not maneuver to aid the landing operation, and it is the landing UAV that uses a guidance algorithm to modulate its trajectory in order to land on the recovery net. On the other hand, the net capture algorithms are active methods in which the net-carrying platform maneuvers itself to capture the intruder UAVs, which may themselves be maneuvering. Some of the net recovery methods can also be termed as active in the sense that the net is maneuvered in such a way as to bring it in the path of the landing UAV, thereby aiding the landing operation.

Given the rapid pace of advance in UAV technologies, it appears that UAV swarms will soon become common in many applications and may sometimes pose a threat for other vehicles in their airspace. In the present disclosure, we consider an interception problem in which three UAVs carrying a net actively attempt to trap a swarm of intruder UAVs. The capturing UAVs are assumed to be capable of flying at speeds higher than the intruder UAVs which, in turn, may maneuver in space. The problem is to decide how the UAVs need to manipulate, as well as orient the net in order to ensure that the net intercepts the intruder UAVs. In the guidance literature, interception problems have been addressed in the context of a missile intercepting an intruder aircraft. However, the problem there is formulated as an interceptor (modeled as a point), trying to intercept a target (which is also a point). In fact much of the guidance laws in the literature (PN being one of them) are based on the idea of guiding a point to intercept a target which may or may not maneuver. In the present disclosure, we do not consider the problem as that of guiding a point but rather that of guiding multiple points (UAVs) together. Such a coordinated guidance is required in order to ensure that the net-carrying UAVs achieve the simultaneous objectives of target interception as well as appropriate net orientation.

To solve this problem, we use the notion of collision cones which are primarily used for collision detection and avoidance. The collision cone is a cone of velocity vectors of an arbitrarily shaped object in motion which lead to collision with another arbitrarily shaped object moving in space. Initially, the collision cones were defined for objects moving on a plane and then extended to 3-D space. The concept was later extended to define what is known as a safe passage cone which was used to maneuver vehicles through narrow orifices.

Apart from the novelty of using the collision cone approach for the net capture problem, there are several other differences that the present disclosure has with similar problems addressed in the literature. We consider a swarm of intruder UAVs flying as a flock. We do not consider any restriction on their trajectory, which may be a straight line or a curved trajectory. We model the intruder UAV flock as being enclosed inside a sphere, and formulate the problem as one of interception between the net and the sphere, with the net at a desired orientation. The kinematics-based guidance laws are developed in a relative velocity framework, and thus the kinematic effect of the wind acting on the vehicles are implicitly accounted for in the analysis. As far as dynamic effects are concerned, we assume that the drones are robust enough to take care of the disturbances caused by the wind and the net.

Problem Formulation and Solution Approach

Figure 10:
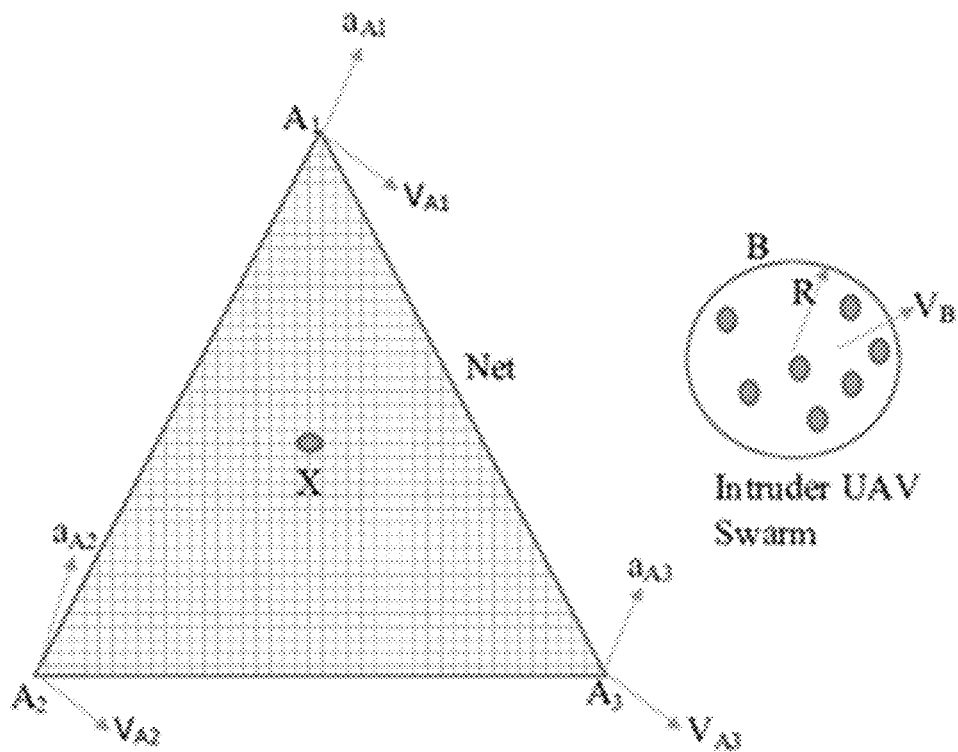
FIG. 10 illustrates a schematic of three UAVs $A_1, A_2, A_3$ carrying a net to intercept a swarm of UAVs.
Figure 11:
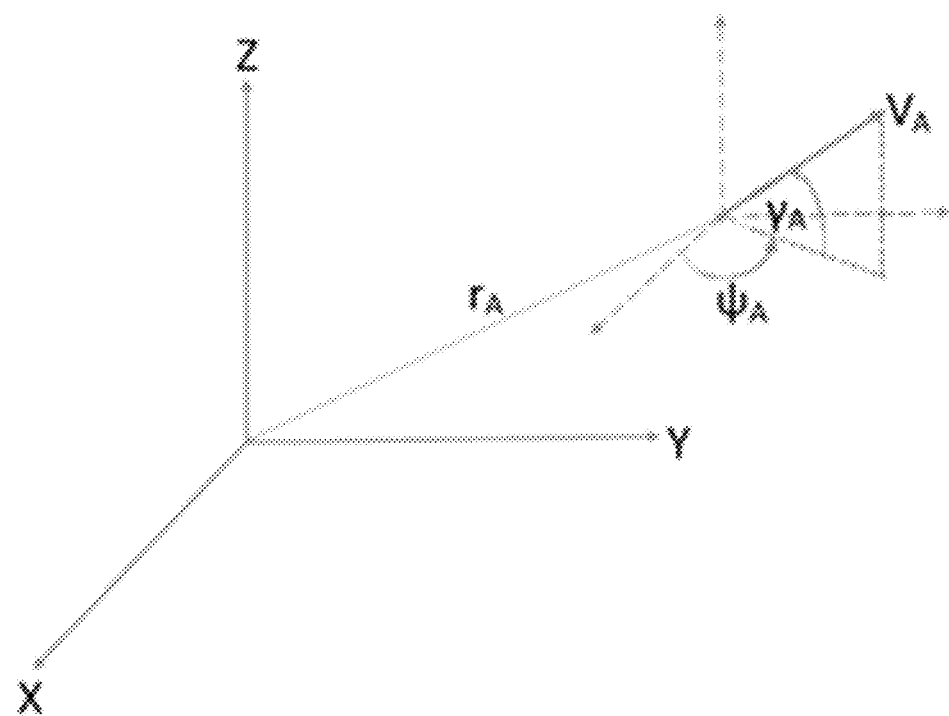
FIG. 11 illustrates a schematic representing various angles used herein.

With reference to FIGS. 10 and 11, consider three UAVs carrying a net, with the objective of capturing a swarm of intruder UAVs. The three net carrying UAVs are denoted as $A_1, A_2,$ and $A_3$, and these UAVs form a triangle in 3-D space. B represents a virtual sphere of radius R that notionally encloses the swarm of intruder UAVs. Let the speed of each of the three net-carrying UAVs be denoted by $V_A$, and the directions of their velocity vectors by $(\psi_{A1}, \gamma_{A1}), (\psi_{A2}, \gamma_{A2}), (\psi_{A3}, \gamma_{A3})$. Here, $(\psi, \gamma)$ represents an azimuth-elevation angle pair, as schematically depicted in FIG. 11. Let the speed of the sphere be $V_B$ and the direction of its velocity vector be $(\psi_B, \gamma_B)$.

Net carrying UAVs: In the present disclosure, we assume that the net-carrying UAVs are of a fixed-wing type. There are several scenarios where fixed-wing UAVs have advantages over quadcopters for this application: Fixed-wing UAVs generally have speeds that are higher than quadrotors [fwing], have longer flight times and longer ranges, as well as the ability to carry heavier payloads. Also, it is often desirable that the intruder is intercepted by the net-carrying UAVs some safe distance away from the protected area, and for such operations the longer flight range of fixed-wing UAVs offers benefits.

Since fixed wing UAVs always need to fly at speeds above a certain threshold in order to generate lift, therefore the permissible speed variation for such UAVs is somewhat small. When the net carrying UAVs move with equal velocities, the formation is rigid. However, with equal velocities, these UAVs cannot rotate or orient the net in space. In the present disclosure, we assume that while the speeds of the net carrying UAVs are all equal (and constant in time), the velocity headings of these UAVs can be different from one another. This difference in velocity headings can be used to rotate the net whenever required.

If the UAVs are very light and/or the net is very heavy, then the UAVs may not be robust to disturbances caused by the net. We assume that the UAVs and the net are so chosen that the drone controller is robust to these disturbances.

Intruder Swarm: We assume that the vehicles in the intruder swarm need to stay reasonably close to each other. This could be either because the swarm is in a leader-follower configuration and the followers need to stay close to the leader, or because the swarm has an objective to carry out a coordinated attack on a specific point in a protected area, and in order to increase the effectiveness of this attack, they need to stay close together.

We also assume that while the adversaries are trying to perform such a focused attack on a target, they do not have the intelligence to simultaneously detect that they themselves are being attacked. This thus belongs to a class of scenarios wherein the adversaries have been given a pre-defined trajectory (possibly computed off-line) to their target, and as they fly towards their target, they do not have the sensors to detect a threat. Therefore, the adversaries do not have the ability to take reactive, evasive action to avoid being intercepted by the net, or the ability to re-compute their trajectory to the target, based on sensor data. This is close to the technology level of present day drones. Smart drones working in swarms and capable of detecting an attacker and taking evasive maneuvers is still a futuristic concept. We also assume that the target of the adversaries, as well as their intended trajectory to the target, is unknown to the net-carrying UAVs.

The intruder swarm need not remain confined to a sphere of constant radius, and the geometry of the swarm can indeed be arbitrary. Our approach then can be used to intercept as many vehicles as possible. Algorithms like the circumcenter algorithm [circumcenter] can be employed to determine the center and radius of the smallest sphere that will bound a chosen subset of vehicles in the intruder swarm, and the net-carrying UAVs will then attempt to intercept this sphere.

Figure 12A:
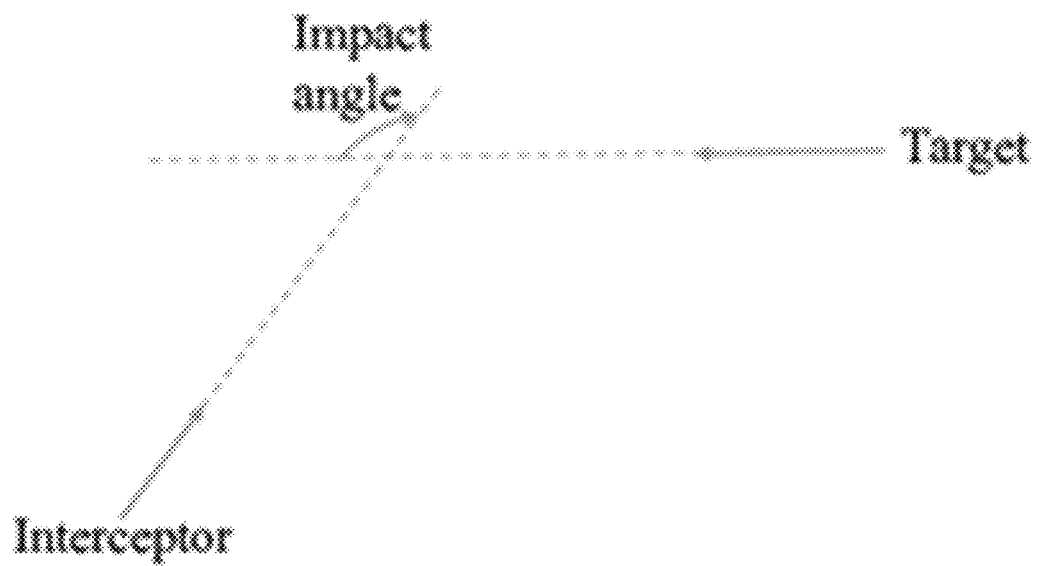
FIG. 12A illustrates an interceptor-target engagement in 2-D.
Figure 12B:
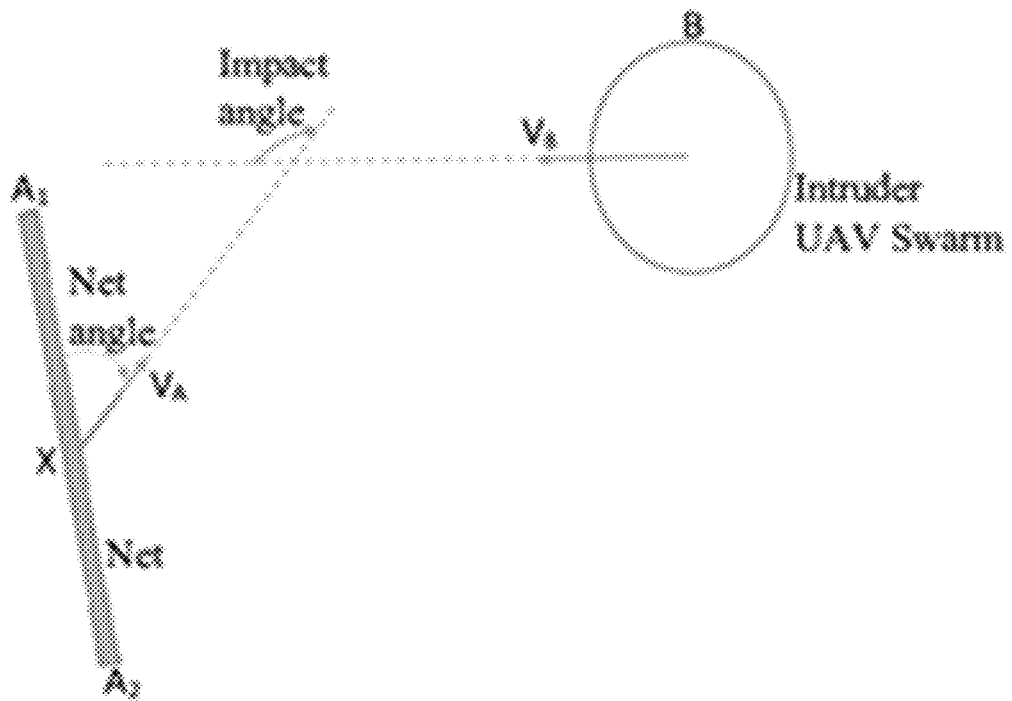
FIG. 12B illustrates net-intruder swarm engagement.

Guidance Objectives: We define a point X on the net as a weighted centroid of the three UAVs. The guidance objective is to maneuver the net so as to close the distance between X and B with the additional requirement that the net approaches B at a certain angle, where the angle may be defined with respect to the current direction of motion of B. This is similar to the impact angle requirement in the interceptor guidance literature, but with the important difference that the net itself needs to maintain a pre-specified angle with respect to the motion of the point X. The impact angle and the net angle are illustrated in FIGS. 12A-12B.

Phases of engagement: The engagement comprises two phases. During the initial phase of the engagement, the objective is primarily to get the net sufficiently close to the intruder swarm. Subsequently, when the time-to-go becomes smaller than a threshold, we begin to rotate the net, in order to achieve a desired net angle. The reasons for which we rotate the net only during the latter phase of the engagement are the following: (i) The purpose of net rotation is to orient the net such that it's normal is roughly parallel to the velocity vector of the intruder swarm. If the intruder swarm performs continual maneuvers, then doing net orientations early (in response to these maneuvers) can lead to unnecessary wastage of control effort by the net-carrying UAVs. (ii) The interceptor seeker range is also relevant here, since the UAV sensors tracking the intruder swarm may be less effective at larger distances and more effective at closer distances. So it makes sense to first guide the UAVs to get close to the intruder UAV and then do the orientation maneuver when its sensors are able to track the intruder trajectory better.

The threshold value of the time-to-go at which to start rotating the net, will be a function of the resolution of the cameras mounted on the UAVs. This threshold value can be set based on the appropriate distance to the target, at which the camera's resolution is adequate for switching to the net rotation phase.

When we desire a point object moving with constant speed to intercept another point object moving with constant velocity, there is typically a single (at most, two) heading angle(s) of the former that will lead to collision with the latter. On the other hand, when we desire a finite-sized object (such as a net) to intercept with another finite-sized object (such as a sphere), there is a range (or more precisely, a cone) of heading angles of the net, with which such an interception can be achieved. We refer to this cone as the collision cone. By maneuvering the heading angle of the net into the collision cone, and ensuring that the heading angle stays inside this cone, it can be ensured that the net intercepts the intruder UAV swarm. The UAVs use the accelerations $a_{Ai}$, i=1, 2, 3, to orient the net and carry it along a trajectory that leads to interception of the intruder UAV swarm.

Let $\vec{r}_{A1}$, $\vec{r}_{A2}$, $\vec{r}_{A3}$ represent the position vectors of $A_1$, $A_2$, and $A_3$, respectively (with respect to some inertial reference frame). Then, any point X on the plane $A_1A_2A_3$ can be represented as a convex combination of these three vectors as follows:

$$\vec{r}_X = \lambda_1 \vec{r}_{A1} + \lambda_2 \vec{r}_{A2} + \lambda_3 \vec{r}_{A3}, \lambda_1 + \lambda_2 + \lambda_3 = 1, \lambda_1, \lambda_2, \lambda_3 \geq 0 \quad (1-1)$$

The weighted centroid X of the triangle $A_1A_2A_3$, has a velocity $\vec{V}_X$:

i. $\vec{V}_X = \lambda_1 \vec{V}_{A1} + \lambda_2 \vec{V}_{A2} + \lambda_3 \vec{V}_{A3}$ \quad (1-2)

where, the components of $\vec{V}_X$ are as follows:

ii.
$$\vec{V}_X = V_A \begin{bmatrix} \sum_{i=1}^{3} \lambda_i \cos\gamma_{Ai} \cos\psi_{Ai} \\ \sum_{i=1}^{3} \lambda_i \cos\gamma_{Ai} \sin\psi_{Ai} \\ \sum_{i=1}^{3} \lambda_i \sin\gamma_{Ai} \end{bmatrix} \quad (1-3)$$

From (1-3), the magnitude of $\vec{V}_X$ is as follows:

$$VX = V_A \Big[ \sum_{i=1}^{3} \lambda_i^2 + 2\lambda_1\lambda_2 \sin\gamma_{A1}\sin\gamma_{A2} + 2\lambda_1\lambda_3 \sin\gamma_{A1}\sin\gamma_{A3} + \quad (1-4)$$
$$2\lambda_2\lambda_3 \sin\gamma_{A2}\sin\gamma_{A3} + 2\lambda_1\lambda_3 \cos\gamma_{A1}\cos\gamma_{A3}\cos(\psi_{A3} - \psi_{A1}) +$$
$$2\lambda_2\lambda_3 \cos\gamma_{A2}\cos\gamma_{A3}\cos(\psi_{A2} - \psi_{A3}) +$$

-continued
$$2\lambda_1\lambda_2 \cos\gamma_{A1}\cos\gamma_{A2}\cos(\psi_{A1} - \psi_{A2}) \Big]^{\frac{1}{2}}$$

The azimuth and elevation angles of $\vec{V}_X$ are denoted by $\psi_X$ and $\gamma_X$, respectively, and are given by:

$$\psi_X = \tan^{-1}\left[\frac{\sum_{i=1}^{3} \lambda_i \cos\gamma_{Ai}\sin\psi_{Ai}}{\sum_{i=1}^{3} \lambda_i \cos\gamma_{Ai}\cos\psi_{Ai}}\right] \quad (1-5)$$

$$\gamma_X = \sin^{-1}\left[\frac{V_A \sum_{i=1}^{3} \lambda_i \sin\gamma_{Ai}}{V_X}\right]$$

In the remainder of the paper, for ease of notation, we will drop the subscript X in the terms $\vec{V}_X$, $V_X$, $\psi_X$ and $\gamma_X$, except when necessary. Therefore, in the sequel, the terms $\vec{V}$, $V$, $\psi$ and $\gamma$ are all to be interpreted as quantities associated with the interception point X.

The orientation of the net is defined by the normal to the plane $A_1A_2A_3$, denoted by $\hat{n}$. Then, defining $\vec{r}_{21} = \vec{r}_{A2} - \vec{r}_{A1}$ and $\vec{r}_{31} = \vec{r}_{A3} - \vec{r}_{A1}$, we can write $\hat{n}$ as the normal to the plane that contains these vectors, as follows:

$$\hat{n} = \frac{\vec{r}_{21} \times \vec{r}_{31}}{r_{21} r_{31}} \quad (1-6)$$

Let F represent the center of the sphere enclosing the swarm of intruder UAVs moving with speed $V_B$, at an azimuth-elevation angle pair $(\psi_B, \gamma_B)$. Consider the line XF. Defining r=XF, and $(\phi, \theta)$ as the azimuth-bearing angle pair of XF, the relative velocity components of F with respect to X are:

$$V_\phi = V_B \cos\gamma_B \sin(\psi_B - \phi) - V \sin\gamma \sin(\psi - \phi) \quad (1-7)$$

$$V_\theta = V_B\{-\cos\gamma_B \sin\theta \cos(\psi_B - \phi) + \sin\gamma_B \cos\theta\} - V\{- \cos\gamma \sin\theta \cos(\psi - \phi) + \sin\gamma \cos\theta\} \quad (1-8)$$

$$V_r = V_B\{\cos\gamma_B \cos\theta \cos(\psi_B - \phi) + \sin\gamma_B \sin\theta\} - V\{\cos\gamma \cos\theta(\psi - \phi) + \sin\gamma \sin\theta\} \quad (1-9)$$

where, $V_r$ is the relative velocity component along XF, and $V_\phi$ and $V_\theta$ represent relative velocity components orthogonal to XF. These quantities are defined as follows:

$$\dot{r} = V_r, \dot{\phi} = V_\phi/(r\cos\theta), \dot{\theta} = V_\theta/r \quad (1-10)$$

The derivatives of these relative velocity components are:

$$\dot{V}_\phi = -\dot{\phi}(V_r \cos\theta - V_\theta \sin\theta) - \dot{V}\cos\gamma \sin(\psi - \phi) + V\sin\gamma\dot{\gamma}\sin(\psi - \phi) - V\cos\gamma\dot{\psi}\cos(\psi - \phi) \quad (1-11)$$

$$\dot{V}_\theta = -\dot{\theta}V_r - \dot{\phi}V_\phi \sin\theta - \dot{V}[\cos\gamma \sin\theta \cos(\psi - \phi) + \sin\gamma \cos\theta] - V[-\dot{\gamma}\sin\gamma \sin\theta \cos(\psi - \phi) - \cos\gamma \sin\theta\dot{\psi}\sin(\psi - \phi) + \dot{\gamma}\cos\gamma \cos\theta] \quad (1-12)$$

$$\dot{V}_r = \dot{\theta}V_\theta + \dot{\phi}V_\phi \cos\theta - \dot{V}[\cos\gamma \cos\theta \cos(\psi - \phi) + \sin\gamma \sin\theta] - V[-\dot{\gamma}\sin\gamma \cos\theta \cos(\psi - \phi) - \cos\gamma \cos\theta\dot{\psi}\sin(\psi - \phi) + \dot{\gamma}\cos\gamma \sin\theta] \quad (1-13)$$

Eqs (1-11)-(1-13) are valid with the assumption that B moves with a constant velocity, that is, $\dot{V}_B = 0$, $\dot{\psi}_B = 0$, $\dot{\gamma}_B = 0$. The guidance laws for capture are initially designed in Section 3.C with this constant velocity assumption. We subsequently relax this assumption in Section 3.F. From (1-11)-(1-13), it is evident that the derivatives of the relative velocity components vary with the quantities $\dot{V}$, $\dot{\gamma}$, $\dot{\psi}$, which govern the acceleration of the weighted centroid X of the net. These derivatives are as follows.

$$\dot{\gamma} = \frac{V_A(\Sigma_{i=1}^3 \lambda_i \dot{\gamma}_i \cos\gamma_i)}{V\cos\gamma} - \frac{\dot{V}V_A(\Sigma_{i=1}^3 \lambda_i \sin\gamma_i)}{V^2\cos\gamma} \quad (1\text{-}14)$$

$$\dot{\psi} = \frac{\cos^2\psi}{\left(\sum_{k=1}^3 \lambda_i \cos\gamma_i \cos\psi_i\right)^2}\left[\left(\sum_{i=1}^3 \lambda_i \cos\gamma_i \cos\psi_i\right)\right. \quad (1\text{-}15)$$

$$\left(-\sum_{i=1}^3 \lambda_i \dot{\gamma}_i \sin\gamma_i \sin\psi_i + \sum_{i=1}^3 \lambda_i \dot{\psi}_i \cos\gamma_i \cos\psi_i\right) +$$

$$\left(\sum_{k=1}^3 \lambda_i \cos\gamma_i \sin\psi_i\right)\left(\sum_{k=1}^3 \lambda_i \dot{\gamma}_i \sin\gamma_i \cos\psi_i + \sum_{k=1}^3 \lambda_i \dot{\psi}_i \cos\gamma_i \sin\psi_i\right)\right]$$

$$\dot{V} = \frac{V_A^2}{V}\left[\sum_{i=1}^3 \lambda_i \sin\gamma_i \left(\sum_{\substack{j=1 \\ j\neq i}}^3 \lambda_j \dot{\gamma}_j \cos\gamma_j\right) - \right. \quad (1\text{-}16)$$

$$\sum_{i=1}^3 \lambda_i \dot{\gamma}_i \sin\gamma_i \left\{\sum_{\substack{j=1 \\ j\neq i}}^3 \lambda_j \cos\gamma_j \cos(\psi_j - \psi_i)\right\} +$$

$$\left.\sum_{k=1}^3 \lambda_i \dot{\psi}_i \cos\gamma_i \left\{\sum_{\substack{j=1 \\ j\neq 1}}^3 \lambda_j \cos\gamma_j \sin(\psi_j - \psi_i)\right\}\right]$$

In (1-14)-(1-16), for the sake of brevity, we have used $\psi_i$ and $\gamma_i$ for $\psi_{Ai}$ and $\gamma_{Ai}$, respectively. It is seen from the above that $\dot{V}$, $\dot{\gamma}$, and $\dot{\psi}$ depend linearly on $\dot{\gamma}Ai$ and $\dot{\psi}_{Ai}$, which are the velocity heading angle rates for $A_1$, $A_2$ and $A_3$. They evolve as follows:

$$\dot{\gamma}_{Ai} = a_{Ai}[\cos\alpha_{Ai}\sin\gamma_{Ai}\cos(\beta_{Ai}-\psi_{Ai})-\cos\gamma_{Ai}\sin\alpha_{Ai}]/V_A, \quad (1\text{-}17)$$

$$\dot{\psi}_{Ai} = -a_{Ai}\cos\alpha_{Ai}\sin(\beta_{Ai}-\psi_{Ai})/(V_A\cos\gamma_{Ai}) \quad (1\text{-}18)$$

where, $(\beta_{Ai}, \alpha_{Ai})$ are the azimuth-elevation angle pair of the acceleration vector $\vec{a}_{Ai}$. Eqs (1-10)-(1-18) thus represent the kinematic state equations for the engagement between the net and the threat UAV sphere B. Additionally, after substitution of (1-18) in (1-14)-(1-16), the equations corresponding to (1-14), (1-15) and (1-16) are seen to be linear functions of $a_{A1}$, $a_{A2}$, $a_{A3}$ and can be written in the following form:

$$\dot{\gamma} = [G_1 \quad G_2 \quad G_3]\begin{bmatrix} a_{A1} \\ a_{A2} \\ a_{A3} \end{bmatrix}, \quad (1\text{-}19)$$

$$\dot{\psi} = [H_1 \quad H_2 \quad H_3]\begin{bmatrix} a_{A1} \\ a_{A2} \\ a_{A3} \end{bmatrix},$$

$$\dot{V} = [J_1 \quad J_2 \quad J_3]\begin{bmatrix} a_{A1} \\ a_{A2} \\ a_{A3} \end{bmatrix}$$

where, the expressions for $G_i, H_i, J_i, i=1, 2, 3$ are lengthy (and therefore not presented here), but can be readily inferred from (1-14)-(1-16).

Guidance Laws for Net Capture

In the following we will show how the concepts from collision cones can be used to design the net capture guidance law.

Point Object and a Sphere Moving in 3-D

When a point object and a sphere of radius R are moving with constant velocities, the miss-distance $r_m$ (which is the predicted distance between the point and the center of the sphere at the instant of closest approach), is given by the following equation:

$$r_m^2 = r^2(V_\phi^2 + V_\theta^2)/(V_\phi^2 + V_r^2 + V_\theta^2) \quad (1\text{-}20)$$

and the time of closest approach is given by:

$$t_m = (-rV_r)/(V_\phi^2 + V_r^2 + V_\theta^2) \quad (1\text{-}21)$$

When $V_r<0$, the above expression leads to a positive value of $t_m$. When $V_r>0$, it leads to a negative value of $t_m$, which can be interpreted as the time of closest approach if the trajectories of both the objects are projected backwards in time.

If the miss distance $r_m$ is less than R, then the point object is on a collision course with the sphere. Based on this, one may define a miss-distance function y as follows [ref2]:

$$y = \frac{r^2(V_\phi^2 + V_\theta^2)}{V_\phi^2 + V_r^2 + V_\theta^2} - R^2 \quad (1\text{-}22)$$

If the two objects move with constant velocities, then the predicted miss distance is equal to the actual miss distance, and therefore, the condition $y<0$ and $V_r<0$ are both necessary and sufficient conditions for one object to intercept the other object. When the two objects move with varying velocities, then the condition $y<0, V_r<0$ for all future time is a sufficient condition for interception.

Figure 13:
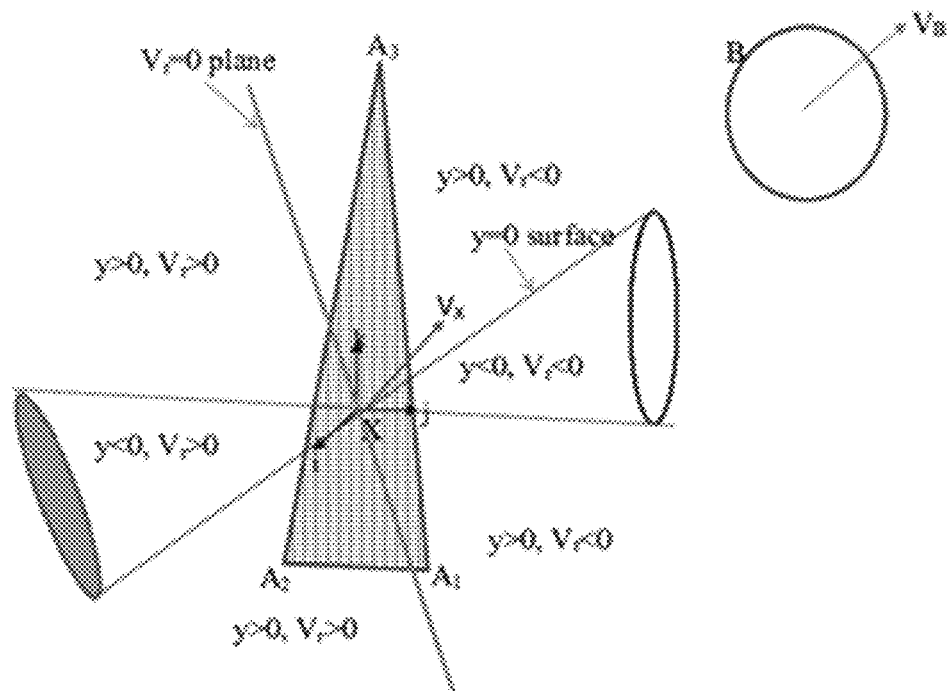
FIG. 13 illustrates partitioning of the 3-D Space based on the signs of y and $V_r$.

In the 3-D physical space, we can construct a surface defined by the set of heading angles of $\vec{V}$ that satisfy $y=0$, that is, $(\psi,\gamma):y=0$. This surface is shown in FIG. 13, and is a double cone, with vertex at X. Also, the set of heading angles of $\vec{V}$ that satisfy $V_r=0$, that is, $(\psi,\gamma):V_r=0$ forms a plane, which partitions the above double cone into two single cones as shown in FIG. 13. We can accordingly partition the physical 3-D space into four sectors as follows: (i) $y<0, V_r<0$, (ii) $y\geq0, V_r\leq0$, (iii) $y>0, V_r>0$, (iv) $y\leq0, V_r>0$. The collision cone between X and B is the sector defined by (i) and represents the set of heading angles of V for which the point X is on a collision course with B.

Collision Conditions Between the Net $A_1A_2A_3$ and the Sphere B

Eq (1-22) can now be used to represent the miss distance from any point on the net $A_1A_2A_3$ to the sphere, as follows. As stated in (1-1), any point X on the net can be written as a convex combination of $\vec{r}_{A1}$, $\vec{r}_{A2}$ and $\vec{r}_{A3}$. Therefore, the vector r from any point X on the net to the center of the sphere B is:

$$\vec{r} = \vec{r}_B - (\lambda_1\vec{r}_{A1} + \lambda_2\vec{r}_{A2} + \lambda_3\vec{r}_{A3}) \quad (1\text{-}23)$$

where, $\vec{r}_B$ is the position vector of the center of B. Similarly, the relative velocity vector of the center of the sphere with respect to X on the net is given by:

$$\vec{V}_{REL} = \vec{V}_B - (\lambda_1\vec{r}_{A1} + \lambda_2\vec{r}_{A2} + \lambda_3\vec{r}_{A3}) \quad (1\text{-}24)$$

Then, $\vec{V}_{REL}$ can be resolved into components $V_r$, $V_\phi$, and $V_\theta$, where $V_r = \langle\vec{V}_{REL}, \hat{r}\rangle$ is the relative velocity component along the unit vector $\hat{r}$ that corresponds to (1-23), while $V_\phi$, and $V_\theta$ are the two mutually orthogonal components of $V_{REL}$ that are also orthogonal to $\hat{r}$.

We can then state the following. The net is on a collision course with B if there exists a $(\lambda_1,\lambda_2,\lambda_3)$ with $\Sigma_{i=1}^{3}\lambda_i=1$, $\lambda_i \geq 0$, such that:

$$y \equiv \frac{r^2(V_\phi^2 + V_\theta^2)}{V_\phi^2 + V_r^2 + V_\theta^2} - R^2 < 0, V_r < 0 \qquad (1\text{-}25)$$

is satisfied. Since each point on the net is parametrized by $(\lambda_1,\lambda_2,\lambda_3)$, we can use (1-25) to write the miss distance function from each point on the net to the sphere as $y(\lambda_1,\lambda_2,\lambda_3)$. Along similar lines, we can also write $V_r$ associated with each point on the net as a function $V_r(\lambda_1,\lambda_2,\lambda_3)$. The collision cone between the net $A_1A_2A_3$ and the sphere B can be defined in the $(\psi,\gamma)$ space as:

$$CC_{NB}=\{(\psi,\gamma):y(\lambda_1,\lambda_2,\lambda_3)<0 \text{ and } V_r(\lambda_1,\lambda_2,\lambda_3)<0,\\ \forall \lambda_i \geq 0, \Sigma_{i=1}^{3}\lambda_i=1\} \qquad (1\text{-}26)$$

Figure 14:
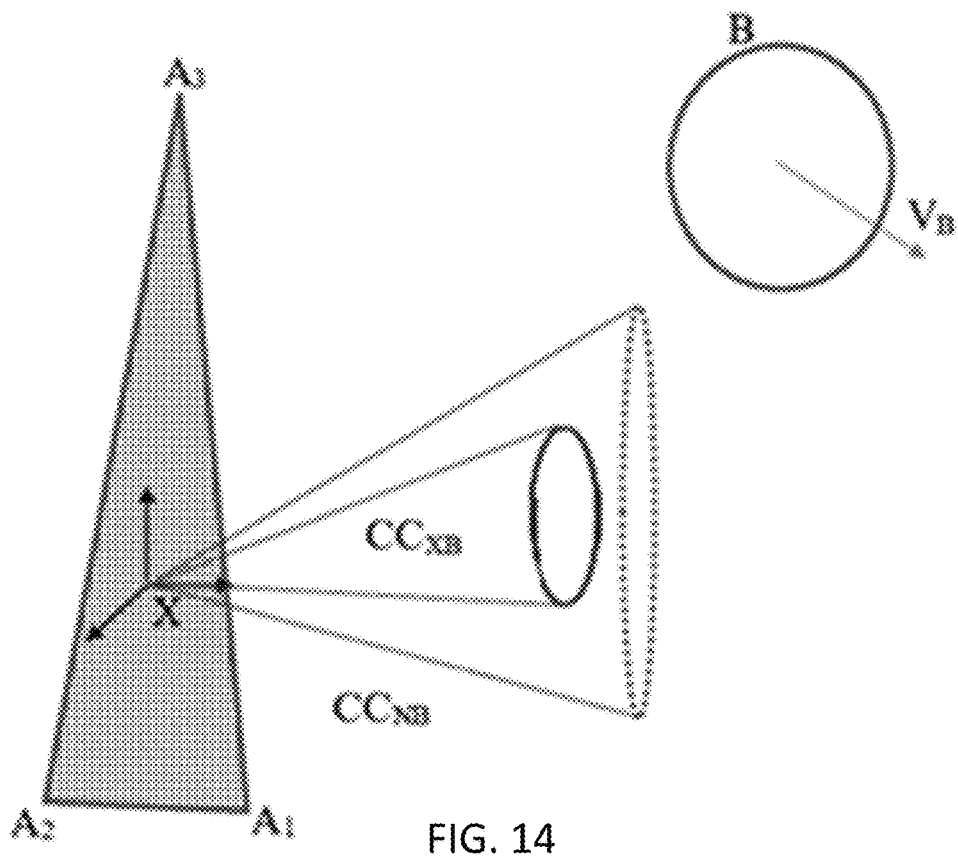
FIG. 14 illustrates a schematic of $CC_{XB}$ and $CC_{NB}$.

FIG. 14 demonstrates the distinction between the collision cone of the point X to B (referred to as $CC_{XB}$ in the figure) and the collision cone of the net to B. while the vertex of the cone $CC_{XB}$ is necessarily to be placed at X, the vertex of the cone $CC_{NB}$ can be placed anywhere on the net. If the actual velocity vector lies along the boundary of $CC_{XB}$, it corresponds to the physical scenario of X grazing the surface of B. If the actual velocity vector lies along the boundary of $CC_{NB}$, it corresponds to the physical scenario of a point on the perimeter of the net grazing the surface of B.

Figure 15A:
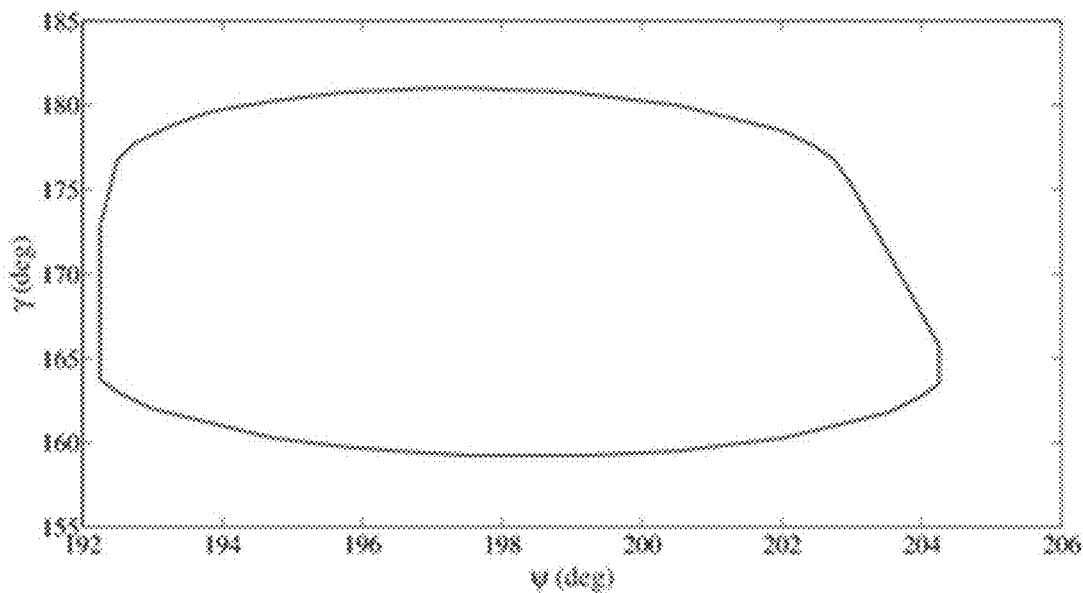
FIG. 15A illustrates a collision cone in the azimuth, elevation angle space between the net and the sphere.
Figure 15B:
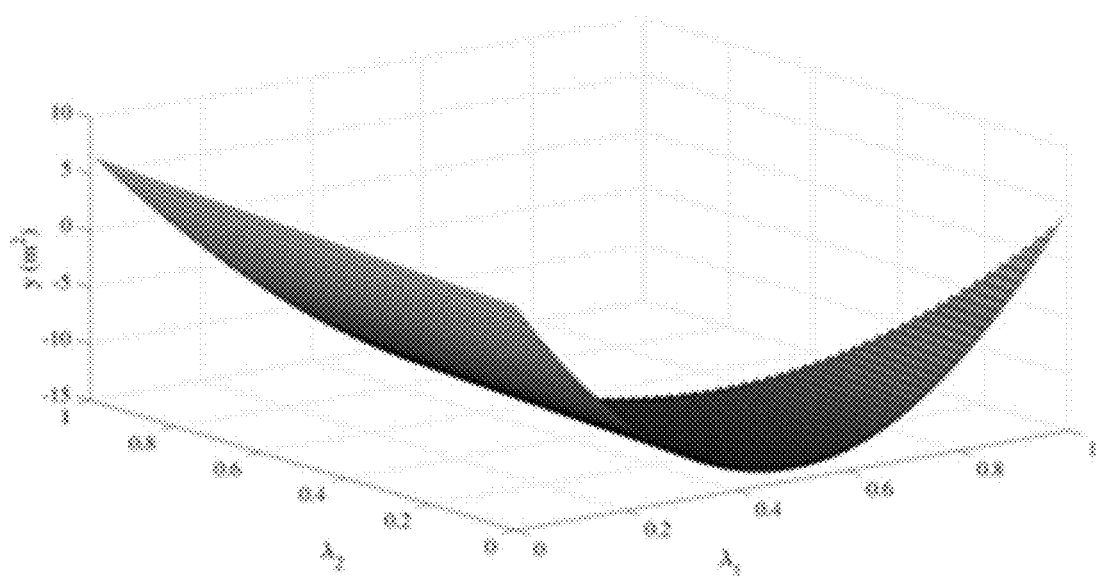
FIG. 15B illustrates a surface plot of $y(\lambda_1, \lambda_2)$.

As an illustrative example, assume that the three UAVs $A_1$, $A_2$, $A_3$ are at a distance 10 m apart from each other and they are moving with a speed of 5 m/sec. The intruder swarm is moving with a speed of 2.3 m/sec and a heading angle given by $\psi=45$ deg, $\gamma=20$ deg. The initial positions of the net-carrying UAVs are (0,0,8.7), (−5,0,0) and (5,0,0), respectively, while that of the center of the intruder sphere is (30,0,4.3). Assuming identical heading angles of the UAVs $A_1$, $A_2$, $A_3$, the collision cone $CC_{NB}$ from the net to the intruder sphere (computed from (1-26)), is depicted on a $(\psi,\gamma)$ plane as shown in FIG. 15A. Consider a heading angle inside this collision cone, say, $\psi_{A1}=\psi_{A2}=\psi_{A3}=200$ deg, $\gamma_{A1}=\gamma_{A2}=\gamma_{A3}=171$ deg. For this particular heading angle, FIG. 15B shows the surface plot of $y(\lambda_1,\lambda_2)$ (with $\lambda_3$ determined from $\lambda_3=1-(\lambda_1+\lambda_2)$). The surface of $V_r$ is nearly flat, and negative for all $(\lambda_1,\lambda_2)$, while the surface of $y$ is positive for some $(\lambda_1,\lambda_2)$ and negative for other $(\lambda_1,\lambda_2)$. The portion of the net for which $y(\lambda_1,\lambda_2)<0$ is currently on a collision course with the intruder swarm.

Figure 16A:
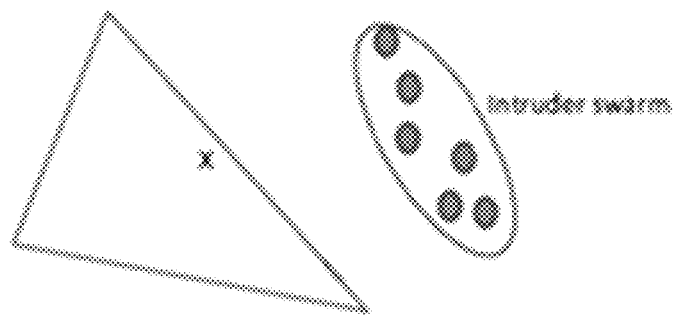
FIG. 16A illustrates a choice of interception point X on the net.

FIG. 15A gives the range of $(\psi,\gamma)$ that represents the collision cone between the entire net (not just the center of the net) and the intruder sphere. From this $(\psi,\gamma)$ range, some considerations that govern the choice of the intercept point on the net and the intercept point on the sphere, are given below:

Intercept point on the net: The interception point on the net needs to be chosen such that the net hits the entire intruder swarm (or at least most of it). While there will be many engagement scenarios where the ideal interception point on the net is located close to its center, there can also be other scenarios where this is not necessarily the case. For example, consider the scenario when the net triangle is isosceles (with its two equal sides being significantly longer than the third side), and the intruder swarm is arranged in a somewhat linear configuration, with the length of this configuration being greater than the longest side of the net. If we now choose the center of the net as the intercept point, then the entire swarm cannot be intercepted by the net. It would be better to choose the intercept point closer to the longer side of the net, so as to intercept as many intruder UAVs as possible. This is shown in FIG. 16A.

Figure 16B:
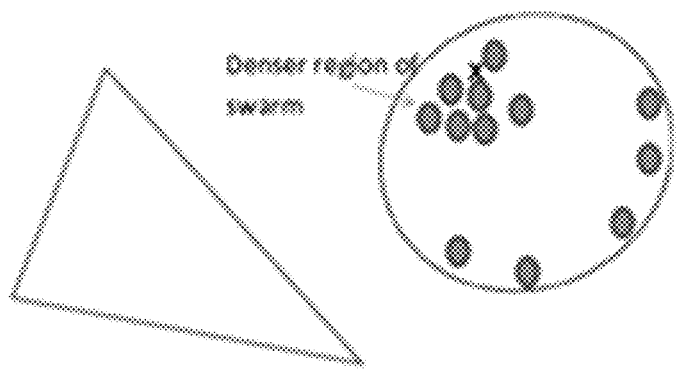
FIG. 16B illustrates a choice of interception point X on the sphere.

Intercept point on the sphere: In many engagements, the ideal interception point on the sphere is located close to the center of the sphere. However, there can also be scenarios where the radius of the bounding sphere on the intruder swarm is larger than the size of the net, and moreover, the intruders are not uniformly distributed inside this bounding sphere. In such cases, we choose an intercept point on the intruder sphere that lies in the denser part of the swarm (where the denser part basically contains more vehicles). This will enable the interception of more vehicles in the swarm. This is shown in FIG. 16B.

Figure 17A:
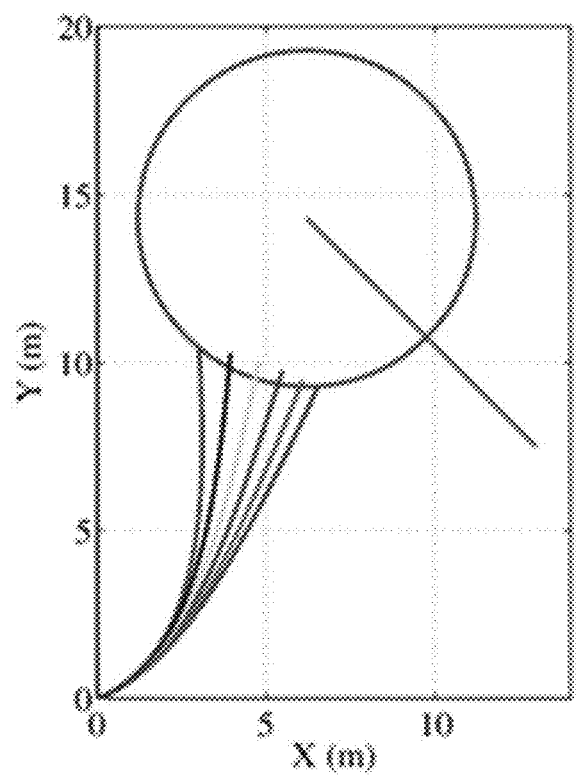
FIG. 17A shows the trajectory of the point object for several intercept points on the circle.
Figure 17B:
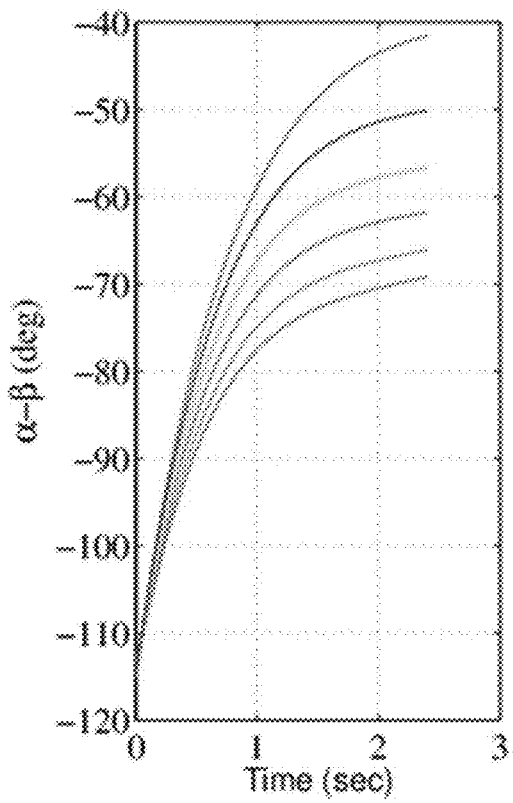
FIG. 17B shows the difference between the heading angles of the point object and the circle.
Figure 17C:
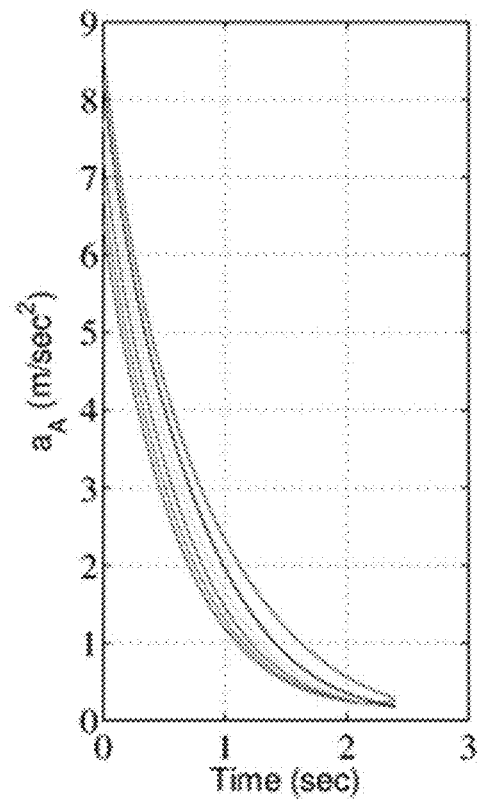
FIG. 17C shows that the acceleration profiles also vary for these different interception points.

Different intercept points on the sphere also lead to different impact angles. This is illustrated in FIGS. 17A-17C for a 2-D scenario involving an engagement between a point object and a moving circle. FIG. 17A shows the trajectory of the point object for several intercept points on the circle. FIG. 17B shows the difference between the heading angles of the point object and the circle, from which it is clearly evident that the impact angle varies with the intercept point. FIG. 17C shows that the acceleration profiles also vary for these different interception points. Choosing the best combination of interception point on the net and interception point on the sphere is an interesting problem in its own right, however it is beyond the scope of the present disclosure. The guidance schemes are developed in the present disclosure to work for any arbitrary choice of intercept point on the net and intercept point on the sphere.

Figure 16C:
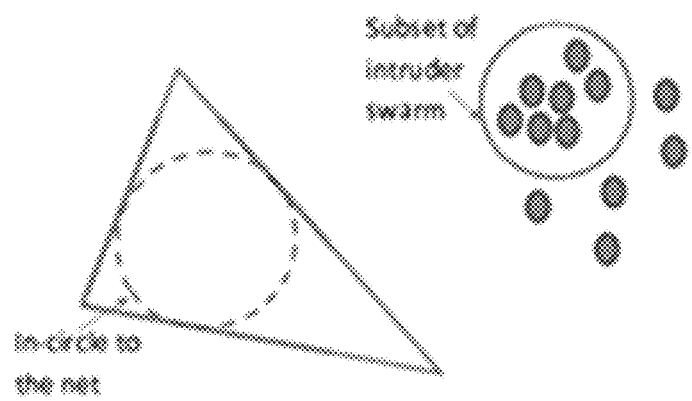
FIG. 16C illustrates an Intercepting a subset of intruder swarm.

Intercepting a subset of the intruder swarm: As mentioned earlier, if the size of the swarm is larger than the net, we then attempt to intercept a subset of the swarm. If we choose an interception point on the net that lies close to the centroid of the net, then the net will be able to intercept those vehicles in the swarm that lie within a sphere whose radius is less than (or equal to) the radius of the in-circle of the net. If there are members of the intruder swarm outside this sphere, then those intruders can potentially escape — however our approach ensures that we have intercepted at least some of the intruding vehicles. For a given geometry of the intruder swarm, the larger the size of the net, the larger the radius of the sphere of intruders that can be intercepted. Refer to FIG. 16C for an illustration.

Acceleration Magnitude for Capture

In this section, we determine guidance laws for the three net carrying UAVs so as to enable them to intercept the swarm of threat UAVs enclosed in a sphere. The guidance laws are initially designed with an assumption that B moves with a constant velocity, that is, $\dot{V}_B=0$, $\dot{\psi}B=0$, $\dot{\gamma}B=0$. In a subsequent section, we will relax this assumption. Define a function Z as follows:

$$Z=(\tfrac{1}{2})(y-w)^2 \qquad (1\text{-}27)$$

where, $w \leq 0$ is a specified reference value, which may be time-varying. having an arbitrary $w<0$ provides us the flexibility to choose different interception points on the sphere. By determining $a_{Ai}$, $i=1, 2, 3$ which will make $\dot{Z}$ negative definite, interception of the swarm of threat UAVs B can be guaranteed.

Theorem 1: Let UAV $A_1$ have an acceleration $a_{Ai}$ whose magnitude is given by:

$$N_1 a_{A1}+N_2 a_{A2}+N_3 a_{A3}=-K(y-w) \qquad (1\text{-}28)$$

where, $N_i$, $i=1, 2, 3$, is given in (1-34). Then, the error function Z in (1-27) is globally asymptotically stable almost everywhere.

Proof: $\dot{Z}=(y-w)(\dot{y}-\dot{w})$, where the time derivative of $y(t)$ is as follows:

$$\frac{dy}{dt} = \frac{\partial y}{\partial r}\dot{r} + \frac{\partial y}{\partial V_\phi}\dot{V}_\phi + \frac{\partial y}{\partial V_\theta}\dot{V}_\theta + \frac{\partial y}{\partial V_r}\dot{V}_r \quad (1\text{-}29)$$

Evaluating (1-29) along the system trajectories defined by (1-10)-(1-18), we get:

$$\frac{dy}{dt} = \quad (1\text{-}30)$$

$$\dot{V}\left[-\frac{\partial y}{\partial V_\phi}\cos\gamma\sin(\psi-\phi) - \frac{\partial y}{\partial V_\theta}\{\cos\gamma\sin\theta\cos(\psi-\phi) + \sin\gamma\cos\theta\} - \right.$$

$$\left.\frac{\partial y}{\partial V_r}\{\cos\gamma\cos\theta\cos(\psi-\phi) + \sin\gamma\sin\theta\}\right] +$$

$$\dot{\gamma}V\left[\frac{\partial y}{\partial V_\phi}\sin\gamma\sin(\psi-\phi) - \frac{\partial y}{\partial V_\theta}(-\sin\gamma\sin\theta\cos(\psi-\phi) + \cos\gamma\cos\theta) - \right.$$

$$\left.\frac{\partial y}{\partial V_r}(-\sin\gamma\cos\theta\cos(\psi-\phi) + \cos\gamma\sin\theta)\right] +$$

$$\dot{\psi}V\cos\gamma\left[-\frac{\partial y}{\partial V_\phi}\cos(\psi-\phi) + \frac{\partial y}{\partial V_\theta}\sin\theta\sin(\psi-\phi) + \right.$$

$$\left.\frac{\partial y}{\partial V_r}\cos\theta\sin(\psi-\phi)\right]$$

which can be written in a compact form as follows:

$$\frac{dy}{dt} = \dot{V}Y_1 + \dot{\gamma}VY_2 + \dot{\psi}V\cos\gamma Y_3 \quad (1\text{-}31)$$

where, $Y_1$, $Y_2$ and $Y_3$ are the expressions within the square brackets in (1-30), and the partial derivatives of $y$ are as follows:

$$\frac{\partial y}{\partial V_\phi} = \frac{2r^2 V_\phi V_r^2}{\left(V_\phi^2 + V_\theta^2 + V_r^2\right)^2}, \quad (1\text{-}32)$$

$$\frac{\partial y}{\partial V_\theta} = \frac{2r^2 V_\theta V_r^2}{\left(V_\phi^2 + V_\theta^2 + V_r^2\right)^2},$$

$$\frac{\partial y}{\partial V_r} = \frac{2r^2(V_\phi^2 + V_\theta^2)V_r}{\left(V_\phi^2 + V_\theta^2 + V_r^2\right)^2}$$

Substituting for $\dot{\gamma}$, $\dot{\psi}$ and $\dot{V}$ from (1-19), we can rewrite (1-31) in the form:

$$\frac{dy}{dt} = [Y_1G_1 + Y_2H_1V + Y_3J_1V\cos\gamma \quad Y_1G_2 + Y_2H_2V + Y_3J_2V\cos\gamma \quad Y_1G_3 + Y_2H_3V + Y_3J_3V\cos\gamma]\begin{bmatrix}a_{A1}\\a_{A2}\\a_{A3}\end{bmatrix} \quad (1\text{-}33)$$

The elements in the row matrix of (1-33) have a specific structure, and this is used to define $N_i, i=1, 2, 3$ as follows:

$$N_i = Y_1G_i + Y_2H_iV + Y_3J_iV\cos\gamma \quad (1\text{-}34)$$

Then, by substituting (1-28) in the time derivative of the error function $Z$ in (1-27), we get the equation $\dot{Z}=-KZ$, which is the dynamics of the error function, and $Z$ is globally asymptotically negative definite "almost everywhere" in the state space.

for the choice of control given in (1-28) when $N_i=0$ occurs at some time $t=t_1$, there is a singularity in the sense that $a_{Ai}$ becomes undefined, and this means that at that instant in time, application of any finite acceleration $a_{Ai}$ does not influence $\dot{Z}$, and does not drive $y$ toward $w$. This can happen under the following scenarios: (a) At $t=t_1$, the $a_{Ai}$ vector becomes parallel to the $V_{Ri}$ vector (where, $\dot{V}_{Ri}=\dot{V}_B-\dot{V}_{Ai}$ is the velocity of B with respect to $A_1$), (b) At $t=t_1$, the aiming point of $V_{Ai}$ passes through the center of B. When either (a) or (b) occur, we simply allow $a_{Ai}$ to hit its saturation limit at $t=t_1$. Since we have chosen the direction of $a_{Ai}$ such that it always acts normal to $V_{Ai}$, this causes the velocity vector $V_{Ai}$ to continue to rotate at $t=t_1$. This drives $N_i$ away from zero, which in turn causes $a_{Ai}$ to revert to generating a finite acceleration. At the isolated instant $t=t_1$, the error function $Z$ does not follow the equation $\dot{Z}=-KZ$, and for this reason, we have the caveat that $Z$ is globally asymptotically stable "almost everywhere". [ ]

Remark 1: We observe that there can be multiple $(a_{A1}, a_{A2}, a_{A3})$ combinations that satisfy (1-28). During the phase of the engagement when we do not want the net to rotate, we require that the acceleration vectors of $A_1$, $A_2$ and $A_3$ all be identical. In the non-rotating phase, the UAVs $A_1$, $A_2$, $A_3$ have $N_1=N_2=N_3$ and therefore, it can be ensured that they all have equal accelerations, if we use:

$$a_{Ai}=-K(y-w)/(3N_i), i=1,2,3 \quad (1\text{-}35)$$

During the phases of the engagement when we do want the net to rotate, we employ unequal accelerations. During those phases, we do not use the individual acceleration magnitudes given in (1-35), but continue to use the cumulative acceleration magnitude given in (1-28). This is elaborated in more detail in Section 4, where we discuss aspects of net rotation.

Remark 2: If $K$ in (1-28) satisfies the condition $$K>(1/t_m)ln(Z(0)/\epsilon) \quad (1\text{-}36)$$

then $Z$ will decay to a quantity $\epsilon$ in time $t<t_m$, where $t_m$ is given in (1-21).

Remark 3: With $K>0$, the guidance acceleration (1-28) will drive the error function $Z$ to zero. If the initial velocity heading angles $(\psi,\gamma)$ lie in the $V_r<0$ region, $K$ satisfies (1-36), and the intruder swarm moves with constant velocity, then it is guaranteed that the net will intercept the intruder swarm. However, when the initial velocity heading angles lie in the $V_r>0$ region (See FIG. 13), we first need to drive the heading angle into the $V_r<0$ region. This can be achieved by switching the sign of $K$ as follows: (i) When $y<0$, $V_r>0$, use the guidance law (1-35), with $w=0$ and $K>0$. This will drive the velocity vector into the $y>0, V_r>0$ region. (ii) When $y>0, V_r>0$, use (1-28), with $w=0$ and $K<0$. This will drive the velocity vector into the $V_r<0$ region, upon which we use (1-28) with $w<0$ and $K>0$. The scenario when $y=0$ is taken care.

Direction of Acceleration Vector $N_i$ in (1-34) depends on $G_i$, $H_i$ and $J_i$, which in turn are functions of $(\beta_{Ai}, \alpha_{Ai})$ which represent the direction of the acceleration vector of $A_i$. We next choose the appropriate direction of the acceleration vector $a_{Ai}$, $i=1, 2, 3$, to enable capture. Towards this end, we impose the following conditions on the direction of the acceleration vector for each vehicle: (a) The unit acceleration vector $\hat{a}_{Ai}$ always acts normal to the unit velocity vector $\hat{V}_{Ai}$, and (b) The acceleration vector $\hat{a}_{Ai}$ lies on the plane containing the line XF and $\hat{V}_{Ai}$.

To satisfy (a), we require $\langle \hat{a}_{Ai}, \hat{V}_{Ai} \rangle \geq 0$, which simplifies to:

$$\cos \gamma_{Ai} \cos \alpha_{Ai} \cos(\psi_{Ai}-\beta_{Ai}) + \sin \gamma_{Ai} \sin \alpha_{Ai} = 0 \quad (1\text{-}37)$$

When $\cos \gamma_{Ai} \neq 0$ and $\cos \alpha \neq 0$, (1-37) can be written as:

$$\cos(\psi_{Ai}-\beta_{Ai}) + \tan \gamma_{Ai} \tan \alpha_{Ai} = 0 \quad (1\text{-}38)$$

For (b), we first define a plane that contains XF and $\hat{V}_{Ai}$. The unit normal to this plane is computed as:

$$\hat{n}_i = (\hat{V}_{Ai} \times \vec{X}F)/|XF| \quad (1\text{-}39)$$

To satisfy (b), we need that $\langle \hat{n}_i, \hat{a}_{Ai} \rangle \geq 0$ which, after some algebraic manipulations, simplifies to:

$$S_{Ai} \cos \alpha_{Ai} \cos \beta_{Ai} + \overline{S}_{Ai} \cos \alpha_{Ai} \sin \beta_{Ai} + \hat{S}_{Ai} \sin \alpha_{Ai} = 0 \quad (1\text{-}40)$$

where, $S_{Ai}$, $\overline{S}_{Ai}$ and $\hat{S}_{Ai}$ are as follows:

$$S_{Ai} = \cos \gamma_{Ai} \sin \psi_{Ai} \sin \theta - \sin \gamma_{Ai} \cos \theta \sin \phi$$

$$\overline{S}_{Ai} = \sin \gamma_{Ai} \cos \theta \cos \phi - \cos \gamma_{Ai} \cos \psi \sin \theta$$

$$\hat{S}_{Ai} = \cos \gamma_{Ai} \cos \theta \sin(\phi - \psi_{Ai}) \quad (1\text{-}41)$$

When $\cos \alpha_{Ai} \neq 0$, (1-40) can be written as:

$$S_{Ai} \cos \beta_{Ai} + \overline{S}_{Ai} \sin \beta_{Ai} + \hat{S}_{Ai} \tan \alpha_{Ai} = 0 \quad (1\text{-}42)$$

Solving Eqs. (1-38) and (1-42) for $\alpha_{Ai}$ and $\beta_{Ai}$, we get $$\cot^2 \alpha_{Ai} = \tan^2 \gamma_{Ai} + D_{Ai}^2 \quad (1\text{-}43)$$

$$\beta_{Ai} = \psi_{Ai} - \pi + \cos^{-1}[\tan \gamma_{Ai} \tan \alpha_{Ai}] \quad (1\text{-}44)$$

where, $$D_{Ai}^2 = \frac{[S_{Ai}\cos\psi_{Ai}\tan\gamma_{Ai} + \overline{S}_{Ai}\sin\psi_{Ai}\tan\gamma_{Ai} - \hat{S}_{Ai}]^2}{[S_{Ai}\sin\psi_{Ai} - \overline{S}_{Ai}\cos\psi_{Ai}]^2} \quad (1\text{-}45)$$

In the special case when $D_{Ai}=0$, (1-43) and (1-44) reduce to $$\alpha_{Ai} = \frac{\pi}{2} + \gamma_{Ai}, \beta_{Ai} = \psi_{Ai}.$$

Robustness of the Guidance Law to Acceleration of Intruder Swarm

The guidance law (1-28) was derived with an assumption that the intruder swarm moves with constant velocity in a straight line. In this section we quantify the robustness of (1-28) when the sphere B moves with a curvilinear trajectory, that is, B is maneuvering. Note that although B is maneuvering, this maneuver is not for the purpose of evading the net, but rather to reach its intended goal by following a pre-specified curvilinear trajectory.

When B has an acceleration of magnitude $a_B$, which acts at an azimuth-elevation angle pair $(\beta_B, \alpha_B)$, then the time derivatives of the relative velocity components and the heading angles of B are:

$$\dot{V}_\phi = f_\phi + a_B \cos \alpha_B \sin(\beta_B - \phi) \quad (1\text{-}46)$$

$$\dot{V}_\theta = f_\theta - a_B[\cos \alpha_B \sin \theta \cos(\beta_B - \phi) - \sin \alpha_B \cos \theta] \quad (1\text{-}47)$$

$$\dot{V}_r = f_r + a_B[\cos \alpha_B \cos \theta \cos(\beta_B - \phi) + \sin \alpha_B \sin \theta] \quad (1\text{-}48)$$

$$\dot{\gamma}_B = -a_B[\cos \alpha_B \sin \gamma_B \cos(\beta_B - \psi_B) - \cos \psi_B \sin \alpha_B]/V_B \quad (1\text{-}49)$$

$$\dot{\psi}_B = a_B \cos \alpha_B \sin(\beta_B - \psi_B)/V_B \cos \gamma_B \quad (1\text{-}50)$$

where, $f_\phi$, $f_\theta$, and $f_r$ are the expressions on the right hand sides of (1-11)-(1-13), respectively. We assume that the intruder swarm maneuvers such that its acceleration vector acts normal to its velocity vector, that is, the intruder swarm may change its direction but moves with constant speed. We point out that the quantity y in (1-25) is, in general, a function that provides the predicted miss-distance. When all the UAVs $A_1$, $A_2$, $A_3$, and B are not maneuvering, then y is a constant in time, and is a function of the actual miss-distance. When B moves with constant velocity, the designed guidance law (1-28), with K greater than the threshold in (1-36), ensures that the actual miss-distance also goes to zero.

When B is maneuvering, the quantity y represents a predicted miss-distance function and varies with time. At any time $t_1$, $y(t_1)$ represents a prediction of what the miss distance function would be if the intruder swarm were to move with constant velocity for all future time $t > t_1$.

Theorem 2: Let UAV $A_i$ have an acceleration $a_{Ai}$ given by (1-28), (1-43), (1-44) and B be a maneuvering swarm. Then, if K is large enough to ensure that the following inequality is satisfied:

$$-KZ + \sqrt{2Z} a_B \left[ \frac{\partial y}{\partial V_r} (\cos\alpha_B \cos\theta \cos(\beta_B - \phi) + \sin\alpha_B\sin\theta) + \frac{\partial y}{\partial V_\phi} \cos\alpha_B \sin(\beta_B - \phi) + \frac{\partial y}{\partial V_\theta} (-\cos\alpha_B\sin\theta\cos(\beta_B - \phi) + \sin\alpha_B\cos\theta) \right] \leq 0 \quad (1\text{-}51)$$

then, the error function (1-27) is globally stable almost everywhere, and is upper bounded by $Z_{SS}$, where $$Z_{SS} = a_B^2 c_{max}^2 / K^2 \quad (1\text{-}52)$$

Proof: Substitute the acceleration equation (1-28) in the time derivative of the error function (1-27) evaluated along the trajectories of the system defined by (1-10), (1-46)-(1-50), (1-14)-(1-18). The error function then evolves according to the following equation:

$$\dot{Z} = -KZ + \sqrt{2Z} a_B \left[ \frac{\partial y}{\partial V_r} (\cos\alpha_B \cos\theta \cos(\beta_B - \phi) + \sin\alpha_B\sin\theta) + \frac{\partial y}{\partial V_\phi} \cos\alpha_B \sin(\beta_B - \phi) + \frac{\partial y}{\partial V_\theta} (-\cos\alpha_B\sin\theta\cos(\beta_B - \phi) + \sin\alpha_B\cos\theta) \right] \quad (1\text{-}53)$$

It is evident that in (1-53), the influence of $a_B$ is that of a vanishing perturbation, that is, when $Z=0$, $a_B$ does not influence the dynamics of $Z(t)$. When $Z \neq 0$, (1-53) provides a condition on the relative values of the gain K and $a_B$ with which $\dot{Z}$ can remain negative definite. If the engagement geometry is such that the second term in the right hand side of (1-53) is always negative, then Z will asymptotically decay to zero at a rate which would be faster than if the target was not maneuvering.

If this term is not negative, then Z attains a steady state value. An upper-bound to this steady state value is obtained by setting $\dot{Z}=0$ in (1-53) and solving for Z, which will yield (1-52), where $c_{max}$ corresponds to the maximum value of the quantity inside the square brackets in (1-53). The reasons for the caveat "almost everywhere" are similar to those outlined in the proof of Theorem 1.

A characterization of the value of $c_{max}$ is obtained as follows. From (1-53), the quantity c is defined as:

$$c = \frac{\partial y}{\partial V_\gamma}(\cos\alpha_B\cos\theta\cos(\beta_B - \phi) + \sin\alpha_B\sin\theta) + \qquad (1\text{-}54)$$

$$\frac{\partial y}{\partial V_{(t)}}\cos\alpha_B\sin(\beta_B - \phi) +$$

$$\frac{\partial y}{\partial V_\theta}(-\cos\alpha_B\sin\theta\cos(\beta_B - \phi) + \sin\alpha_B\cos\theta)$$

the following identities are true:

$$\max_{\alpha_B,\theta,\beta_B,\phi} |\cos\alpha_B\cos\theta\cos(\beta_B - \phi) + \sin\alpha_B\sin\theta| = 1 \qquad (1\text{-}55)$$

$$\max_{\alpha_B,\theta,\beta_B,\phi} |\cos\alpha_B\sin(\beta_B - \phi)| = 1 \qquad (1\text{-}56)$$

$$\max_{\alpha_B,\theta,\beta_B,\phi} |-\cos\alpha_B\sin\theta\cos(\beta_B - \phi) + \sin\alpha_B\cos\theta| = 1 \qquad (1\text{-}57)$$

This can be shown as follows. Consider (1-55). Let $\bar{\alpha}_B$, $\bar{\theta}$, $\bar{\beta}_B$ and $\bar{\phi}$ represent the values of $\alpha_B$, $\theta$, $\beta_B$ and $\phi$ at which the extrema of (1-55) occur. To find these extrema, we take the derivatives of (1-55) with respect to $\alpha_B$, $\theta$ and $\beta_B$–$\phi$, respectively, and then equate these derivatives to zero, to obtain the following:

$$-\sin\bar{\alpha}_B\cos\bar{\theta}\cos(\bar{\beta}_B-\bar{\phi})+\cos\bar{\alpha}_B\sin\bar{\theta}=0 \qquad (1\text{-}58)$$

$$-\cos\bar{\alpha}_B\sin\bar{\theta}\cos(\bar{\beta}_B-\bar{\phi})+\sin\bar{\alpha}_B\cos\bar{\theta}=0 \qquad (1\text{-}59)$$

$$-\cos\bar{\alpha}_B\cos\bar{\theta}\sin(\bar{\beta}_B-\bar{\phi})+\sin\bar{\alpha}_B\sin\bar{\theta}=0 \qquad (1\text{-}60)$$

Substituting the expression for $\cos\bar{\alpha}_B\sin\bar{\theta}$ from (1-58) in (1-59) and then simplifying, we get:

$$\sin\bar{\alpha}_B\cos\bar{\theta}\sin^2(\bar{\beta}_B-\bar{\phi})=0 \qquad (1\text{-}61)$$

Similarly, substituting the expression for $\sin\bar{\alpha}_B\cos\bar{\theta}$ from (1-59) in (1-58) and then simplifying, we get:

$$\cos\bar{\alpha}_B\sin\bar{\theta}\cos^2(\bar{\beta}_B-\bar{\phi})=0 \qquad (1\text{-}62)$$

It is then evident that (1-60)-(1-62) are satisfied simultaneously only for the cases: (i) $\sin(\bar{\beta}_B-\bar{\phi})=0$, $\sin\bar{\alpha}_B=0$, (ii) $\sin(\bar{\beta}_B-\bar{\phi})=0$, $\sin\bar{\theta}=0$. Substituting these in the left hand side of (1-55), it is seen that the identity (1-55) holds. A similar series of steps can be used to demonstrate that (1-57) also holds. Validity of (1-56) is obvious.

By virtue of the above, (1-54) leads to the following inequality:

$$c \le \left|\frac{\partial y}{\partial V_r}\right| + \left|\frac{\partial y}{\partial V_\phi}\right| + \left|\frac{\partial y}{\partial V_\theta}\right| \qquad (1\text{-}63)$$

Substituting the partial derivatives of y from (1-32) in the above, we get:

$$c \le \left|\frac{2r^2(V_\phi^2+V_\theta^2)V_r}{(V_\phi^2+V_\theta^2+V_r^2)^2}\right| + \left|\frac{2r^2V_\phi V_r^2}{(V_\phi^2+V_\theta^2+V_r^2)^2}\right| + \left|\frac{2r^2V_\theta V_r^2}{(V_\phi^2+V_\theta^2+V_r^2)^2}\right| \qquad (1\text{-}64)$$

Figure 18:
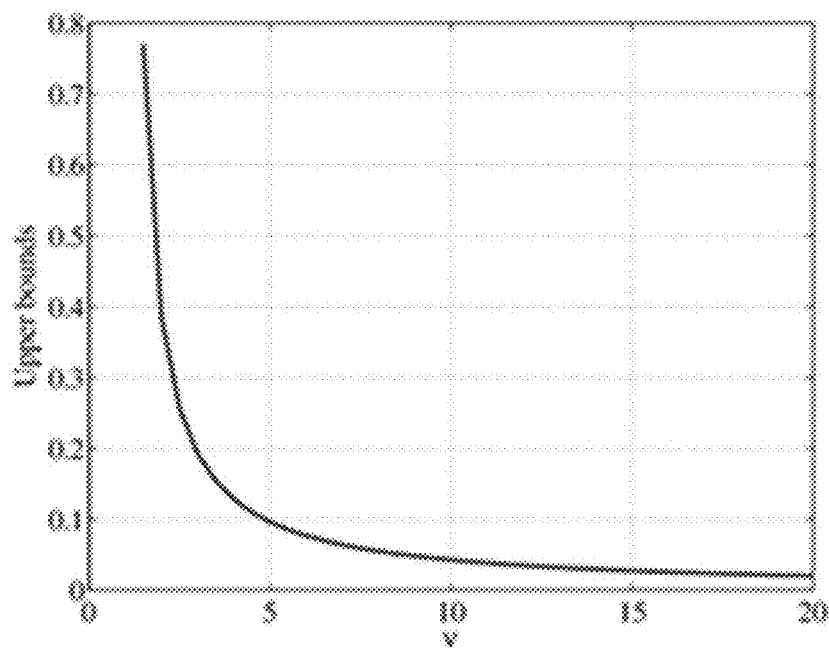
FIG. 18 illustrates the upper bounds on $|U_1|, |U_2|, |U_3|$.

Multiplying and dividing the right hand side of the above equation by $V_B^4$, we get:

$$c \le \frac{2r^2}{V_B}\left[\left|\frac{(\tilde{V}_\phi^2+\tilde{V}_\theta^2)\tilde{V}_r}{(\tilde{V}_\phi^2+\tilde{V}_\theta^2+\tilde{V}_r^2)^2}\right| + \left|\frac{\tilde{V}_\phi\tilde{V}_r^2}{(\tilde{V}_\phi^2+\tilde{V}_\theta^2+\tilde{V}_r^2)^2}\right| + \left|\frac{\tilde{V}_\theta\tilde{V}_r^2}{(\tilde{V}_\phi^2+\tilde{V}_\theta^2+\tilde{V}_r^2)^2}\right|\right] \qquad (1\text{-}65)$$

where, $\tilde{V}_\phi \equiv V_\phi/V_B$, $\tilde{V}_\theta \equiv V_\theta/V_B$ and $\tilde{V}_r \equiv V_r/V_B$ represent non-dimensional quantities. The above equation is then written in a compact form as:

$$c \le \frac{2r^2}{V_B}[|U_1(v)| + |U_2(v)| + |U_3(v)|] \qquad (1\text{-}66)$$

where, $v=V/V_B$ represents the ratio of the speed of the weighted centroid X of the net to the target speed. FIG. 18 then demonstrates the upper bounds for each of the quantities $|U_1(v)|$, $|U_2(v)|$, $|U_3(v)|$. The upper bounds for the three terms are identical. FIG. 18 in conjunction with (1-66) can be used to determine $c_{max}$. From (1-66), it can also be noted that the value of $c_{max}$ reduces as the net comes closer to the sphere.

From (1-52), we can obtain an upper bound to the predicted miss distance function as:

$$Y_b = \sqrt{2}a_Bc_{max}/K + W \qquad (1\text{-}67)$$

From the above, we can determine an upper bound on the predicted miss-distance between the center of the sphere B and the point X on the net as follows:

$$r_{m,b} = [\sqrt{2}a_Bc_{max}/K + R^2 + w]^{1/2} \qquad (1\text{-}68)$$

Incorporating Intruder UAV Acceleration

In this section, we modify the proposed guidance law (1-28) so that it explicitly accounts for the intruder swarm's acceleration. We state the following theorem:

Theorem 3: Let the intruder swarm maneuver with an acceleration vector $a_B$ that is normal to its velocity vector $\vec{V}_B$. Let UAVs $A_i$, i=1, 2, 3 have acceleration magnitudes $a_{Ai}$, i=1, 2, 3, that satisfy the equation:

$$N_1a_{A1} + N_2a_{A2} + N_3a_{A3} = -K(y-w) + \qquad (1\text{-}69)$$
$$a_B\left[\frac{\partial y}{\partial V_\phi}\cos\alpha_B\sin(\beta_B-\phi) + \frac{\partial y}{\partial V_\theta}(-\cos\alpha_B\sin\theta\cos(\beta_B-\phi) + \sin\alpha_B\cos\theta) + \frac{\partial y}{\partial V_r}(\cos\alpha_B\cos\theta\cos(\beta_B-\phi) + \sin\alpha_B\sin\theta)\right]$$

with K>0, and whose direction is given by (1-43) and (1-44). Then, the error function (1-27) is globally asymptotically stable almost everywhere.

Proof: Substitute the acceleration equation (1-69) in the time derivative of the error function (1-27) evaluated along the trajectories of the system defined by (1-10), (1-46)-(1-50), (1-14)-(1-18). This will make the error function Z follow the dynamics $\dot{Z}=-KZ$. The rest of the proof then follows. The reasons for the caveat "almost everywhere" are similar to those outlined in the proof of Theorem 1.

Remark 4: From (1-69), the counterpart of (1-35) can be determined to be the following:

$$a_{Ai} = \left[-K(y-w) + a_B\left\{\frac{\partial y}{\partial V_\phi}\cos\alpha_B\sin(\beta_B-\phi) + \frac{\partial y}{\partial V_\theta}(-\cos\alpha_B\sin\theta\cos(\beta_B-\phi) + \sin\alpha_B\cos\theta) + \frac{\partial y}{\partial V_r}(\cos\alpha_B\cos\theta\cos(\beta_B-\phi) + \sin\alpha_B\sin\theta)\right\}\right]\Big/(3N_i), \; i=1,2,3 \quad (1-70)$$

We now make the following statement similar to that made for (1-35). Eq (1-70) will ensure that the acceleration magnitudes of $A_1$, $A_2$ and $A_3$ are all equal and these magnitudes can be used during the non-rotating phase of the engagement. During the phase of the engagement when the net needs to be rotated, we will employ unequal acceleration magnitudes for $A_1$, $A_2$ and $A_3$, but still ensure that the sum of these acceleration magnitudes satisfies (1-69). This is discussed in Section 4.

Remark 5: Consider scenarios where the acceleration magnitude of B is not precisely known to the net-carrying UAVs, but the maximum possible acceleration of B is known. Let $a_{B,max}$ represent the maximum acceleration of B. Then, we can replace $a_B$ in (1-70) with $\text{sgn}(a_B)|a_{B,max}|$. Using arguments similar to those given in [anderson], it can be proved that such a modified guidance law will still ensure that the net intercepts the intruder swarm.

Remark 6: the assumption on constant speed of the intruder swarm is used only for the derivation of the guidance law. In practice, the intruder UAVs within the sphere may have relative motion with respect to one another. In scenarios when the speed $V_B$ of the center of the sphere changes with time, we can employ a piecewise-constant (in time) approximation to $V_B$, and use this in the guidance law.

Net Capture on a Two-Dimensional Plane

It is instructive to look at the two-dimensional version of the capture equations developed thus far. This will make it easier to follow the subsequent discussion in Section 4 about net rotation. Refer FIG. 19, which depicts a 2-D scenario where there are two UAVs $A_1$ and $A_2$ holding the ends of a net, with the objective to intercept an intruder UAV swarm enclosed in a circle B. Define the relative velocity components between the point X on $A_1A_2$ and the center of the circle as $V_r$ and $V_\theta$. Then, from (1-25), we can infer that the net $A_1A_2$ is on a collision course with B if there exists a $(\lambda_1,\lambda_2)$, with $\Sigma^{i=1}\lambda_i=1, \lambda_i \geq 0$, such that:

$$y(\lambda_1,\lambda_2) = \frac{r^2 V_\theta^2}{V_\theta^2 + V_r^2} - R^2 < 0, \; V_r(\lambda_1,\lambda_2) < 0 \quad (1-71)$$

and, from (1-26), the collision cone between the net and B can be defined as:

$$CC_{NB}=\gamma:y(\lambda_1,\lambda_2)<0 \text{ and } V_r(\lambda_1,\lambda_2)<0,\forall\lambda_i\geq 0, \Sigma_{i=1}{}^2\lambda_i=1 \quad (1-72)$$

The equation governing the accelerations of the two UAVs with which interception (of the point X on the net), with the intruder UAV circle is achieved (when B does not maneuver) is as follows:

$$N_1 a_{A1} + N_2 a_{A2} = -K(y-w) \quad (1-73)$$

where, $N_1$ and $N_2$ are obtained from the 2-D version of (1-34). When B is maneuvering with an acceleration magnitude $a_B$, capture can be ensured if the acceleration magnitudes satisfy the following equation (which is the 2-D counterpart of (1-69)):

$$N_1 a_{A1} + N_2 a_{A2} = -K(y-w) + a_B\left[\frac{\partial y}{\partial V_\theta}\sin(\alpha_B-\theta) + \frac{\partial y}{\partial V_r}\cos(\alpha_B-\theta)\right] \quad (1-74)$$

where, $\alpha_B$ is the angle at which the acceleration of B is applied, and $$\alpha_B = \gamma_B + \frac{\pi}{2}.$$

In the scenario when the magnitude of $a_B$ is not known, but only the sign of $a_B$ and $|a_{B,max}|$ is known, interception is achieved if we replace $a_B$ in (1-74) with $\text{sgn}(a_B)|a_{B,max}|$.

Orienting the Net

The discussion thus far pertains to the phase of the engagement when the net does not need to rotate. In order to meet requirements on the net angle (See FIGS. 12A-12B), it is necessary to also rotate the net during some phase of the engagement. It may also be necessary to account for the effects of drag while rotating the net, although we do not consider this aspect here. We now look at strategies for the UAVs to orient the net appropriately while intercepting the intruder swarm. In order to change the net orientation, the UAVs need to apply differential accelerations, that is $\vec{a}_{A1}$, $\vec{a}_{A2}$, $\vec{a}_{A3}$ should not all be equal.

At this point, we recall that a standing assumption in the present disclosure is that the UAVs $A_1$, $A_2$ and $A_3$ are of fixed-wing type and move with constant speeds throughout the engagement. For each UAV, the acceleration vector acts normal to the velocity vector. Therefore, a side-effect of applying differential accelerations to rotate the net is that these will cause an ensuing change in the distance between the net-carrying UAVs, and this in turn can lead to stretching (or compression) of one or more sides of the net. In Section IV.D, we discuss strategies by which such a stretching/compression of the net can be averted. Our objective now is to characterize the interplay between the application of these differential accelerations and the subsequent change in orientation as well as the distance between the net-carrying UAVs. For ease of description, we will first consider the 2-D case depicted in FIG. 19, and subsequently revert to the 3-D case depicted in FIGS. 20A-20B.

Orienting the Net in 2-D

Figure 19:
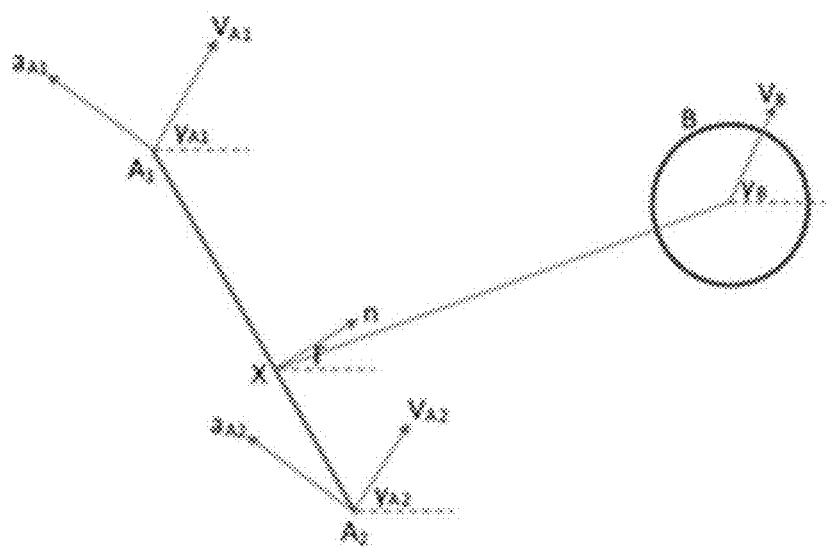
FIG. 19 illustrates a schematic of two UAVs $A_1$ and $A_2$ carrying a ropeline.

Refer FIG. 19. The kinematics of the line $A_1A_2$ are given by the following equations:

$$\begin{bmatrix} \dot{r}_{21} \\ \dot{\theta}_{21} \\ \dot{V}_{\theta,21} \\ \dot{V}_{r,21} \end{bmatrix} = \begin{bmatrix} V_{r,21} \\ V_{\theta,21}/r_{21} \\ (-V_{\theta,21}V_{r,21})/r_{21} \\ (V_{\theta,21}^2)/r_{21} \end{bmatrix} - \begin{bmatrix} 0 \\ 0 \\ \sin(\alpha_{A1}-\theta_{21}) \\ \cos(\alpha_{A1}-\theta_{21}) \end{bmatrix} a_{A1} + \begin{bmatrix} 0 \\ 0 \\ \sin(\alpha_{A2}-\theta_{21}) \\ \cos(\alpha_{A2}-\theta_{21}) \end{bmatrix} a_{A2} \quad (1\text{-}75)$$

where, $\alpha_{A1}$ and $\alpha_{A2}$ are the directions of the acceleration vectors of $a_{A1}$ and $a_{A2}$, respectively, and are taken as $$\alpha_{A1} = \gamma_{A1} + \frac{\pi}{2}, \quad \alpha_{A2} = \gamma_{A2} + \frac{\pi}{2}.$$

Let $\Gamma$ represent the angle made by the normal $\hat{n}$ to the line $A_1A_2$, with the horizontal. From FIG. 19, it is evident that $$\Gamma = \theta_{21} - \frac{\pi}{2}.$$

By differentiating $\Gamma$ twice, we get:

$$\ddot{\Gamma} + \frac{V_{r,21}}{r_{21}}\dot{\Gamma} = -\frac{V_{\theta,21}V_{r,21}}{r_{21}^2} + \frac{1}{r_{21}} - a_{A1}\cos(\gamma_{A1} - \theta_{21}) + a_{A2}\cos(\gamma_{A2} - \theta_{21}) \quad (1\text{-}76)$$

From the first and last equations in (1-75), we obtain the equation for the length of the net as:

$$\ddot{r}_{21} = (V_{\theta,21}^2)/r_{21} + \sin(\gamma_{A1}-\theta_{21})a_{A1} - \sin(\gamma_{A2}-\theta_{21})a_{A2} \quad (1\text{-}77)$$

Eqs (1-76) and (1-77) demonstrate the influence of $\vec{a}_{A1}$ and $\vec{a}_{A2}$ on the net orientation angle $\Gamma$ and the distance $r_{21}$. In these equations, if a $\vec{a}_{A1} = \vec{a}_{A2} = 0$, then the two ends $A_1$ and $A_2$ both move along straight lines and the net orientation and length remains unchanged. If $\vec{a}_{A1} = \vec{a}_{A2} \neq 0$, then $A_1$ and $A_2$ both move along identical arcs and again, $\Gamma$ and $r_{21}$ remain unchanged. When $\vec{a}_{A1} \neq \vec{a}_{A2}$, the ensuing differential acceleration will cause the net to rotate as illustrated subsequently.

We provide below an analytical solution for $\Gamma(t)$ and $r_{21}(t)$, when the input accelerations $a_{A1}$ and $a_{A2}$ are piecewise-constant in time. Refer FIG. 20A. Assume that $a_{A1}$, $a_{A2}$ are both piecewise constant (but unequal) for a time interval $t \in [t_1, t_2]$, and let $\Delta T \equiv t_2 - t_1$.

Here, $A_1A_2$ (represented by $\vec{L}$) is the net at time $t=t_1$ while $A_{1'}A_{2'}$ (represented by $\vec{L}'$) is the net at time $t=t_2$. Thus, $|\vec{L}|=r_{21}(t_1)$ and $|\vec{L}'|=r_{21}(t_2)$. Similarly, $\angle \vec{L} = \theta_{21}(t_1)$ and $\angle \vec{L}' = \theta_{21}(t_2)$. During the time interval $t \in [t_1, t_2]$, $A_1$ moves along the arc of a circle of radius $$\frac{V_A^2}{|a_{A1}|},$$

while $A_2$ moves along the arc of another circle of radius $$\frac{V_A^2}{|a_{A2}|}.$$

Since both $A_1$ and $A_2$ move with identical speed $V_A$, therefore the arc lengths $A_1A_{1'}$, and $A_2A_{2'}$ are equal. From FIG. 20A, it is evident that:

$$\vec{L}' = \vec{O_2A_{2'}} - \vec{O_2A_{1'}} = \vec{O_2A_{2'}} - (\vec{O_2A_2} - \vec{L} - \vec{O_1A_1} + \vec{O_1A_{1'}}) = \vec{L} - \frac{V_A^2}{a_{A2}^2}(\vec{a}_{A2}(t_2) - \vec{a}_{A2}(t_1)) + \frac{V_A^2}{a_{A1}^2}(\vec{a}_{A1}(t_2) - \vec{a}_{A1}(t_1)) \quad (1\text{-}78)$$

$$\vec{a}_{A1}(t_2) = R_{\delta_1}\vec{a}_{A1}(t_1) \text{ and } \vec{a}_{A2}(t_2) = R_{\delta_2}\vec{a}_{A2}(t_1), \text{ where } R_{\delta_1} = \begin{bmatrix} \cos\delta_1 & -\sin\delta_1 \\ \sin\delta_1 & \cos\delta_1 \end{bmatrix}$$

and $$R_{\delta_2} = \begin{bmatrix} \cos\delta_2 & -\sin\delta_2 \\ \sin\delta_2 & \cos\delta_2 \end{bmatrix}$$

are rotation matrices representing rotations by angles $\delta_1$ and $\delta_2$, respectively, about axes normal to the plane of the paper. We can see that $$\delta_1 = \frac{V_A \Delta T}{R_1} \text{ and } \delta_2 = \frac{V_A \Delta T}{R_2}.$$

Substituting $$a_{A1} = \frac{V_A^2}{R_1} \text{ and } a_{A2} = \frac{V_A^2}{R_2},$$

we obtain $$\delta_1 = \frac{a_{A1}\Delta T}{V_A} \text{ and } \delta_2 = \frac{a_{A2}\Delta T}{V_A}. \qquad \text{Eq } (1\text{-}78)$$

then becomes:

$$\vec{L}' = \vec{L} - \frac{V_A^2}{a_{A2}^2}\left(R_{\delta_2}\vec{a}_{A2}(t_1) - \vec{a}_{A2}(t_1)\right) + \frac{V_A^2}{a_{A1}^2}\left(R_{\delta_1}\vec{a}_{A1}(t_1) - \vec{a}_{A1}(t_1)\right) = \vec{L} + \frac{V_A^2}{a_{A2}^2}(I - R_{\delta_2})\vec{a}_{A2}(t_1) - \frac{V_A^2}{a_{A1}^2}(I - R_{\delta_1})\vec{a}_{A1}(t_1) \qquad (1\text{-}79)$$

After substituting $R_{\delta_1}$ and $R_{\delta_2}$ in (1-79), we obtain $|\vec{L}'|$ and $\angle \vec{L}'$. Eq (1-79) thus represents an analytical solution to (1-76) and (1-77) for piecewise constant values of $a_{A1}$ and $a_{A2}$. From (1-79), we obtain the change in the distance between $A_1$ and $A_2$, defined by $\Delta L = |\vec{L}'| - |\vec{L}|$ as:

$$\Delta L = \left[2V_A^2\left\{\frac{(1-\cos\delta_2)}{a_{A2}^2} + \frac{(1-\cos\delta_1)}{a_{A1}^2} + \frac{[\cos(\mu+\delta_1) + \cos(\mu-\delta_2) - \cos(\mu+\delta_1-\delta_2) - \cos\mu]}{a_{A1}a_{A2}}\right\} + 2LV_A^2\left\{\frac{[\sin\mu_1 - \sin(\mu_1+\delta_1)]}{a_{A1}} - \frac{[\sin\mu_2 - \sin(\mu_2+\delta_2)]}{a_{A2}}\right\} + L^2\right]^{1/2} - L \qquad (1\text{-}80)$$

where, $\mu_1 \equiv \gamma_{A1} - \theta_{21}(t_1)$, $\mu_2 \equiv \gamma_{A2} - \theta_{21}(t_1)$, and $\mu \equiv \mu_1 - \mu_2$. From (1-79), the change in the net orientation $\Delta\theta_L = \angle\vec{L}' - \angle\vec{L}$ is found to be:

$$\Delta\theta_L = -\tan^{-1}\left[\frac{L\sin\theta_L + (V_A^2/a_{A1})[\cos(\gamma_{A1}+\delta_1) - \cos\gamma_{A1}] - (V_A^2/a_{A2})[\cos(\gamma_{A2}+\delta_2) - \cos\gamma_{A2}]}{L\cos\theta_L - (V_A^2/a_{A1})[\sin(\gamma_{A1}+\delta_1) - \sin\gamma_{A1}] + (V_A^2/a_{A2})[\sin(\gamma_{A2}+\delta_2) - \sin\gamma_{A2}]}\right] - \theta_L \qquad (1\text{-}81)$$

Figure 21A:
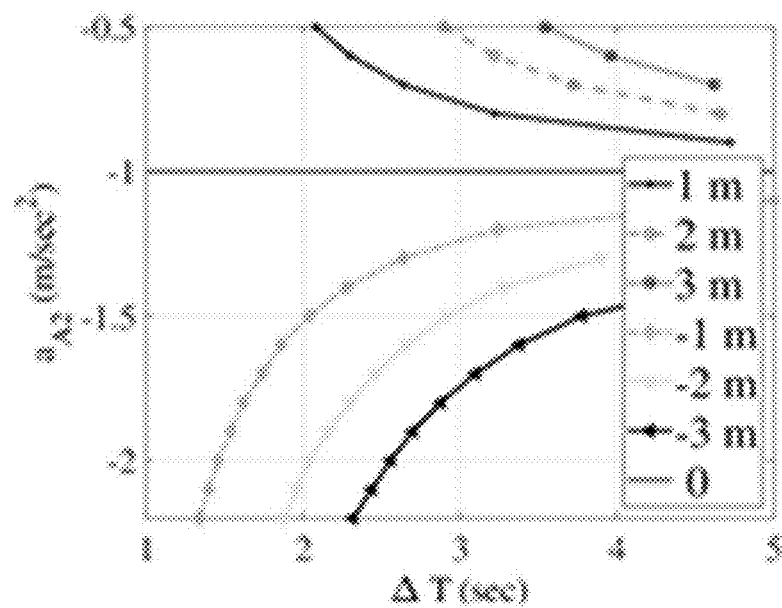
FIGS. 21A-21B illustrates contour plots of $\Delta L$, (b) $\Delta \theta_L$, on the $(\alpha_{A2}, \Delta T)$ plane, for a given value of $\alpha_{A1}$.
Figure 21B:
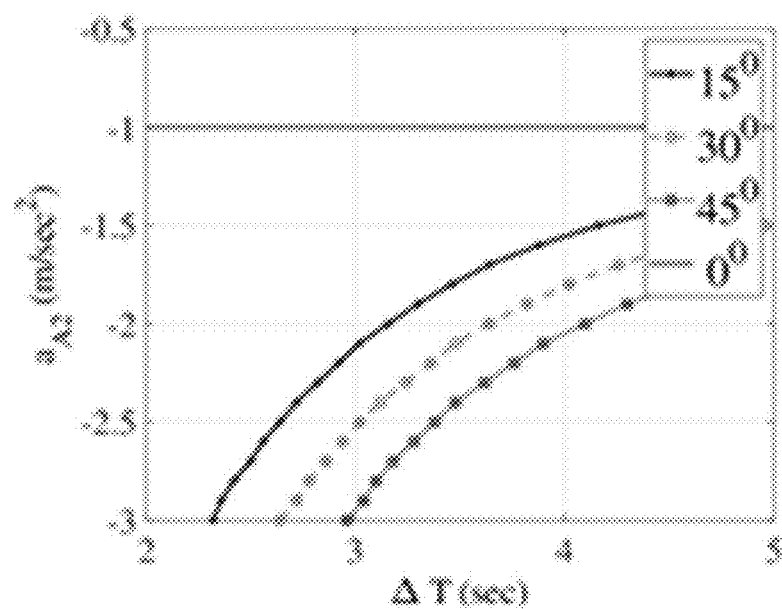

Consider that we have a constraint on the change in the distance between $A_1$ and $A_2$, and the maximum permissible change is $r_{max}$, that is, $||\vec{L}'| - |\vec{L}|| \leq r_{max}$. Applying this to (1-80), we can infer that for a given $\mu_i$, $\mu_2$, $V_A$ and L, there will be a range of ($a_{A1}$, $a_{A2}$, $\Delta T$) combinations that will ensure that $\Delta L$ remains less than $r_{max}$. Using (1-80) and (1-81), we can construct contour plots of $\Delta L$ and $\Delta\theta_L$ for different ($a_{A1}$, $a_{A2}$, $\Delta T$) combinations. FIGS. 21A-21B show one such contour plot, for a particular value of $a_{A1}$ on the ($a_{A2}$, $\Delta T$) plane. These plots can be used to determine the appropriate ($a_{A1}$, $a_{A2}$, $\Delta T$) combination that will ensure that the desired change in net angle is achieved while satisfying the constraint on change in distance between $A_1$ and $A_2$.

The plots shown in FIGS. 21A-21B are for the case $a_{A1} = -1$ m/sec$^2$. As seen in FIG. 21A, if $a_{A2}$ is kept constant at $a_{A2} = a_{A1} = -1$ m/sec$^2$, there is no change in the distance $A_1A_2$. Application of $a_{A2} < -1$ m/sec$^2$ will correspond to a decrease in $A_1A_2$, while application of $a_{A2} > 1$ m/sec$^2$ will correspond to an increase in $A_1A_2$. For example, by moving along the contour corresponding to 1 m, we get the ($a_{A2}$, $\Delta T$) combinations that will lead to an increase in $A_1A_2$ by 1 m. As a specific example, the point (−0.65,2.5) lies on this contour, which means that application of $a_{A2} = -0.65$ m/sec$^2$ for a time interval $\Delta T = 2.5$ sec, will result in an increase in $A_1A_2$ by 1 m. Furthermore, if we desire that the increase in $A_1A_2$ be less than 1 m, we need to use an ($a_{A2}$, $\Delta T$) combination that lies between the two contours corresponding to 0 m and 1 m.

The plots in FIG. 21B are interpreted along similar lines. If $a_{A2}$ is kept constant at $a_{A2} = a_{A1} = -1$ m/sec$^2$, there is no change in the orientation of $A_1A_2$. By moving along the contour corresponding to 15 deg, we get the ($a_{A2}$, $\Delta T$) combinations that will cause the orientation of $A_1A_2$ to change by 15 deg counterclockwise. If we desire that the counterclockwise change in orientation of $A_1A_2$ be less than 15 deg, we need to use an ($a_{A2}$, $\Delta T$) combination that lies between the two contours corresponding to 0 deg and 15 deg.

Figure 20A:
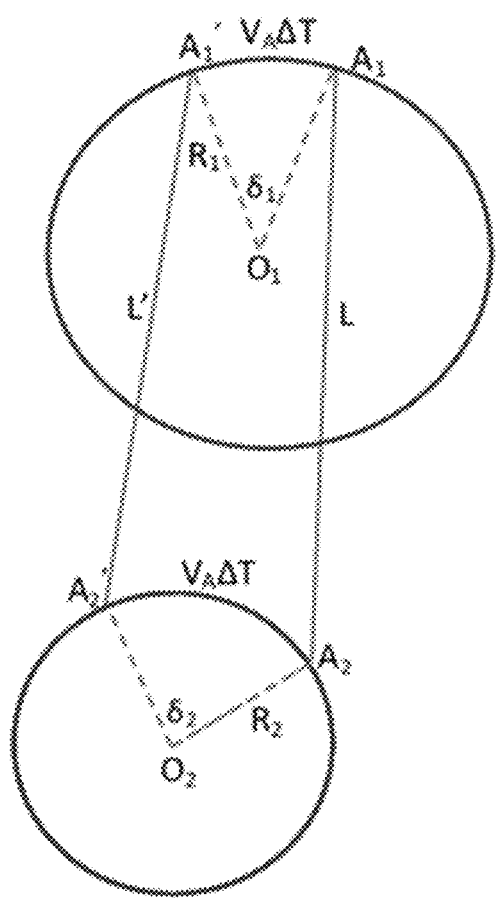
FIGS. 20A-20B illustrate a change in orientation of the net and distance between $A_1$ and $A_2$ in the case of $\alpha_{A1} \neq \alpha_{A2} \neq 0$ and $\alpha_{A1}=0, \alpha_{A2} \neq 0$, respectively.
Figure 20B:
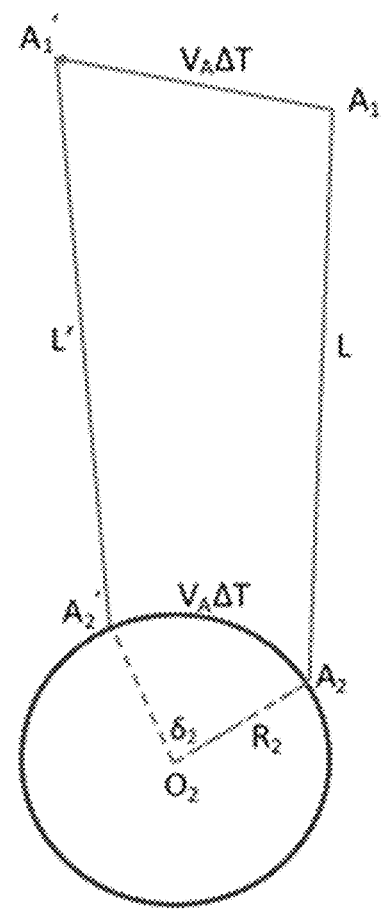

We point out that (1-78)-(1-81) assumed the scenario in FIG. 20A, that is, $a_{A1} \neq a_{A2} \neq 0$. From a physical standpoint, this means that the net is rotating about some point on the line passing through $A_1A_2$, but excluding the points $A_1$ and $A_2$. In the scenario when $a_{A1} = 0$, $a_{A2} \neq 0$, the net is rotating about $A_1$, and this is schematically depicted in FIG. 20B. If we directly substitute $a_{A1} = 0$ in (1-80)-(1-81), several terms in these equations become indeterminate. These indeterminate terms can be properly evaluated by using the following relations:

$$\text{Lim}_{a_{A1}\to 0} \frac{(1-\cos\delta_1)}{a_{A1}^2} = \frac{1}{2}\left(\frac{\Delta T}{V_A}\right)^2 \qquad (1-82)$$

$$\text{Lim}_{a_{A1}\to 0} \frac{[\cos(\mu+\delta_1)+\cos(\mu-\delta_2)-\cos(\mu+\delta_1-\delta_2)-\cos\mu]}{a_{A1}a_{A2}} = \frac{\Delta T[\sin(\mu-\delta_2)-\sin\mu]}{V_A a_{A2}}$$

$$\text{Lim}_{a_{A1}\to 0} \frac{[\sin\mu_1 - \sin(\mu_1+\delta_1)]}{a_{A1}} = -\frac{\Delta T \cos\mu_1}{V_A}$$

Applying (1-82) to (1-80), we get the expression for $\Delta L$ (when $a_{A1}=0$), as follows:

$$\Delta L = \left[2V_A^4\left\{\frac{(1-\cos\delta_2)}{a_{A2}^2} + \frac{1}{2}\left(\frac{\Delta T}{V_A}\right)^2 + \frac{\Delta T[\sin(\mu-\delta_2)-\sin\mu]}{V_A a_{A2}}\right\} + 2LV_A^2\left\{\frac{[\sin(\mu_2+\delta_2)-\sin\mu_2]}{a_{A2}} - \frac{\Delta T\cos\mu_1}{V_A}\right\} + L^2\right]^{1/2} - L \qquad (1-83)$$

Similarly, the change in the orientation of the net can be obtained from (1-81) as follows:

$$\Delta\theta_L = \tan^{-1}\left[\frac{L\sin\theta_L - (V_A^2/a_{A2})[\cos(\gamma_{A2}+\delta_2)-\cos\gamma_{A2}] - V_A\Delta T\sin\gamma_{A1}}{L\cos\theta_L + (V_A^2/a_{A2})[\sin(\gamma_{A2}+\delta_2)-\sin\gamma_{A2}] - V_A\Delta T\cos\gamma_{A1}}\right] - \theta_L \qquad (1-84)$$

Eqs (1-83) and (1-84) are thus special cases of (1-80) and (1-81), respectively.

To achieve interception with simultaneous net orientation, we employ (1-74), (1-80) and (1-81) as follows. During the initial phase of the engagement, the objective is to get the net sufficiently close to the intruder swarm, and toward this end, we use $a_{A1}=a_{A2}$ and employ (1-74) to determine $a_{A1}$ and $a_{A2}$. When the time-to-go becomes smaller than a threshold, we then begin to rotate the net. During this terminal phase, we simultaneously solve (1-74), (1-80) and (1-81), to determine the right combination of $a_{A1}$, $a_{A2}$ and $\Delta T$ by which interception with a desired net orientation can be achieved, while at the same time, keeping the change in the distance between $A_1$ and $A_2$ less than $r_{max}$. In determining a suitable solution, there is also the added flexibility, if required, of choosing a different interception point $w$ on the sphere, and/or a different interception point $\lambda_i$, i=1, 2, 3 on the net.

Orienting the Net in 3-D

We now examine orienting the net in 3-D (schematically represented in FIG. 10) by the use of differential accelerations by the net-carrying UAVs. The kinematics of each edge $A_iA_j$ of the triangle formed by the three UAVs $A_1$, $A_2$ and $A_3$ are given by the following equations:

$$\begin{bmatrix} \dot{r}_{ij} \\ \dot{\phi}_{ij} \\ \dot{\theta}_{ij} \\ \dot{V}_{\phi,ij} \\ \dot{V}_{\theta,ij} \\ \dot{V}_{r,ij} \end{bmatrix} = \begin{bmatrix} V_{r,ij} \\ V_{\phi,ij}/(r_{ij}\cos\theta_{ij}) \\ V_{\theta,ij}/r_{ij} \\ (-V_{\phi,ij}V_{r,ij} + V_{\phi,ij}V_{\theta,ij}\tan\theta_{ij})/r_{ij} \\ (-V_{\theta,ij}V_{r,ij} - V_{\phi,ij}^2\tan\theta_{ij})/r_{ij} \\ (V_{\theta,ij}^2 + V_{\phi,ij}^2)/r_{ij} \end{bmatrix} + \qquad (1-85)$$

$$\begin{bmatrix} 0 \\ 0 \\ 0 \\ -\cos\alpha_i\sin(\beta_i - \phi_{ij}) \\ \cos\alpha_i\sin\theta_{ij}\cos(\beta_i - \phi_{ij}) - \sin\alpha_i\cos\theta_{ij} \\ -\cos\alpha_i\cos\theta_{ij}\cos(\beta_i - \phi_{ij}) - \sin\alpha_i\sin\theta_{ij} \end{bmatrix} a_{Ai} -$$

$$\begin{bmatrix} 0 \\ 0 \\ 0 \\ -\cos\alpha_j\sin(\beta_j - \phi_{ij}) \\ \cos\alpha_j\sin\theta_{ij}\cos(\beta_j - \phi_{ij}) - \sin\alpha_j\cos\theta_{ij} \\ -\cos\alpha_j\cos\theta_{ij}\cos(\beta_j - \phi_{ij}) - \sin\alpha_j\sin\theta_{ij} \end{bmatrix} a_{Aj}$$

where, ij=21 or 31. When $\vec{a}_{Ai} = \vec{a}_{Aj}$, the relative velocity components between UAVs $A_i$ and $A_j$ will be zero, that is, $V_{r,ij}=0$, $V_{\phi,ij}=0$, $V_{\theta,ij}=0$, and $r_{ij}$ is a constant. When $\vec{a}_{Ai} \neq \vec{a}_{Aj}$ (for any j≠i) for some time interval, the ensuing change in the orientation of the net, as well as the change in the length of the sides of the triangle $A_1A_2A_3$ can be determined by an analysis of (1-85).

The orientation of the net is given by the normal $\hat{n}$ defined in (1-6). Differentiating (1-6) with respect to time, we obtain:

$$\frac{d\hat{n}}{dt} = \frac{r_{21}r_{31}[\dot{\vec{r}}_{21}\times\vec{r}_{31} + \vec{r}_{21}\times\dot{\vec{r}}_{31}] - (\vec{r}_{21}\times\vec{r}_{31})[r_{31}V_{r,21} + r_{21}V_{r,31}]}{r_{21}^2 r_{31}^2} \qquad (1-86)$$

from which, it is evident that the first derivative of the unit normal does not contain any acceleration related terms. We therefore compute the second derivative of the unit normal which, after some rearranging of terms, has the following form:

$$\frac{d^2\hat{n}}{dt^2} + 3\frac{d\hat{n}}{dt}\left[\frac{V_{r,21}}{r_{21}} + \frac{V_{r,31}}{r_{31}}\right] + \qquad (1-87)$$

$$\hat{n}\left\{\left[\frac{V_{r,21}}{r_{21}} + \frac{V_{r,31}}{r_{31}}\right]^2 + \left[\frac{\dot{V}_{r,21}}{r_{21}} + 2\frac{V_{r,21}}{r_{21}}\frac{V_{r,31}}{r_{31}} + \frac{\dot{V}_{r,31}}{r_{31}}\right]\right\} =$$

$$\left[\frac{V_{r,31}}{r_{31}} + \frac{V_{r,21}}{r_{21}}\right]\frac{[\dot{\vec{r}}_{21}\times\vec{r}_{31} + \vec{r}_{21}\times\dot{\vec{r}}_{31}]}{r_{21}r_{31}} +$$

-continued $$\frac{[\ddot{\vec{r}}_{21} \times \dot{\vec{r}}_{31} + 2\dot{\vec{r}}_{21} \times \dot{\vec{r}}_{31} + \dot{\vec{r}}_{21} \times \ddot{\vec{r}}_{31}]}{r_{21}r_{31}}$$

The application of acceleration(s) influences the terms $\dot{V}_{r,21}$, $\dot{V}_{r,31}$, $\ddot{\vec{r}}_{21}$ and $\ddot{\vec{r}}_{31}$ in (1-87). Substituting these acceleration-related terms from (1-85) in the above equation, we obtain the following:

$$\frac{d^2\hat{n}}{dt^2} + 3\frac{d\hat{n}}{dt}\left[\frac{V_{r,21}}{r_{21}} + \frac{V_{r,31}}{r_{31}}\right] + \hat{n}\left[\frac{V_{r,21}^2 + V_{\phi,21}^2 + V_{\theta,21}^2}{r_{21}^2} + \frac{V_{r,31}^2 + V_{\phi,31}^2 + V_{\theta,31}^2}{r_{31}^2} + 4\frac{V_{r,21}V_{r,31}}{r_{21}r_{31}}\right] = \quad (1\text{-}88)$$

$$\left[\frac{V_{r,31}}{r_{31}} + \frac{V_{r,21}}{r_{21}}\right]\frac{[\dot{\vec{r}}_{21}\times\vec{r}_{31} + \vec{r}_{21}\times\dot{\vec{r}}_{31}]}{r_{21}r_{31}} + \frac{[2\dot{\vec{r}}_{21}\times\dot{\vec{r}}_{31}]}{r_{21}r_{31}} +$$

$$\hat{n}\Bigg\{\frac{[\cos\alpha_1\cos\theta_{21}\cos(\beta_1-\phi_{21}) + \sin\alpha_1\sin\theta_{21}]a_1 - [\cos\alpha_2\cos\theta_{21}\cos(\beta_2-\phi_{21}) + \sin\alpha_2\sin\theta_{21}]a_2}{r_{21}} +$$

$$\frac{[\cos\alpha_1\cos\theta_{31}\cos(\beta_1-\phi_{31}) + \sin\alpha_1\sin\theta_{31}]a_1 - [\cos\alpha_3\cos\theta_{31}\cos(\beta_3-\phi_{31}) + \sin\alpha_3\sin\theta_{31}]a_3}{r_{31}}\Bigg\} +$$

$$\frac{1}{r_{21}}\begin{bmatrix}-\cos\theta_{31}\sin\phi_{31}(a_2\sin\alpha_2-a_1\sin\alpha_1) + \sin\theta_{31}(a_2\cos\alpha_2\sin\beta_2 - a_1\cos\alpha_1\sin\beta_1)\\ -\sin\theta_{31}(a_2\cos\beta_2\cos\alpha_2 - a_1\cos\beta_1\cos\alpha_1) + \cos\theta_{31}\cos\phi_{31}(a_2\sin\alpha_2 - a_1\sin\alpha_1)\\ -\cos\theta_{31}\cos\phi_{31}(a_2\cos\alpha_2\sin\beta_2 - a_1\cos\alpha_1\sin\beta_1) + \cos\theta_{31}\sin\phi_{31}(a_2\cos\beta_2\cos\alpha_2 - a_1\cos\beta_1\cos\alpha_1)\end{bmatrix} -$$

$$\frac{1}{r_{31}}\begin{bmatrix}-\cos\theta_{21}\sin\phi_{21}(a_3\sin\alpha_3-a_1\sin\alpha_1) + \sin\theta_{21}(a_3\cos\alpha_3\sin\beta_3 - a_1\cos\alpha_1\sin\beta_1)\\ -\sin\theta_{21}(a_3\cos\beta_3\cos\alpha_3 - a_1\cos\beta_1\cos\alpha_1) + \cos\theta_{21}\cos\phi_{21}(a_3\sin\alpha_3 - a_1\sin\alpha_1)\\ -\cos\theta_{21}\cos\phi_{21}(a_3\cos\alpha_3\sin\beta_3 - a_1\cos\alpha_1\sin\beta_1) + \cos\theta_{21}\sin\phi_{21}(a_3\cos\beta_3\cos\alpha_3 - a_1\cos\beta_1\cos\alpha_1)\end{bmatrix}$$

In (1-88), for the sake of brevity, we have used $a_1$, $\beta_i$ and $\alpha_1$ to represent $a_{Ai}$, $\beta_{Ai}$ and $\alpha_{Ai}$, respectively. Eq (1-88) demonstrates the influence of differential accelerations on the dynamics of the normal vector $\hat{n}$. When $\vec{a}_{A1}=\vec{a}_{A2}=\vec{a}_{A3}=0$, the ends $A_1$, $A_2$, $A_3$ of the net all move along straight lines and the net orientation remains unchanged. When $\vec{a}_{A1}=\vec{a}_{A2}=\vec{a}_{A3}\neq 0$, the ends $A_1$, $A_2$, $A_3$ of the net move along arcs of identical radius of curvature, and again, the net orientation remains unchanged. When the acceleration vectors are not all equal, this will cause the net to rotate. For example, if $a_{A1}=a_{A3}\neq a_{A2}$, then the net will rotate about the line $A_1A_3$. The side $A_1A_3$ will remain unchanged in length and orientation, while the sides $A_1A_2$ and $A_2A_3$ will experience changes.

Consider that differential acceleration is applied for a time interval $[t_1, t_2]$ during the engagement. Then, the vector corresponding to $\vec{r}_{21}(t_2)$ can be obtained from (1-79) as follows:

$$\vec{r}_{21}(t_2) = \vec{r}_{21}(t_1) + \frac{V_A^2}{a_{A2}^2}(I - R_{\delta_2,\hat{u}_2})\vec{a}_{A2}(t_1) - \frac{V_A^2}{a_{A1}^2}(I - R_{\delta_1,\hat{u}_1})\vec{a}_{A1}(t_1) \quad (1\text{-}89)$$

Here, $R_{\delta_1,\hat{u}_1}$ represents a rotation by an angle $$\delta_1 = \frac{a_{A1}\Delta T}{V_A}$$

about an axis $\hat{u}_1$, and $R_{\delta_2,\hat{u}_2}$ is correspondingly defined. Using the quantities $u_x$, $u_y$ and $u_z$ to represent the elements of $\hat{u}$, the rotation matrix $R_{\delta,\hat{u}}$ is:

Substituting (1-90) in (1-89), we can write $\vec{r}_{21}(t_2)$ in terms of $a_{A1}$, $a_{A2}$ and $\Delta T$. In a similar fashion, we can write $\vec{r}_{31}(t_2)$ in terms of $a_{A1}$, $a_{A3}$ and $\Delta T$, as well as $\vec{r}_{32}(t_2)$ in terms of $a_{A2}$, $a_{A3}$ and $\Delta T$. The new length of $A_1A_2$, that is, $|\vec{r}_{21}(t_2)|-|\vec{r}_{21}(t_i)|$ is obtained from (1-89). The new lengths $A_1A_3$ and $A_2A_3$ are similarly obtained. Then, similar to (1-6), we can write the orientation $\hat{n}_2$ of the normal to the plane $A_1A_2A_3$, at time $t_2$ as:

$$\hat{n}_2(t_2) = \frac{\vec{r}_{21}(t_2)\times\vec{r}_{31}(t_2)}{r_{21}(t_2)r_{31}(t_2)} \quad (1\text{-}91)$$

Guidance for interception along with simultaneous net orientation in 3-D is achieved as follows. By a simultaneous solution of (1-91) with (1-69), and the length constraint equations, $|\vec{r}_{21}(t_2)|-|\vec{r}_{21}(t_1)|\leq r_{max}$ and $|\vec{r}_{32}(t_2)|-|\vec{r}_{32}(t_1)|\leq r_{max}$, we can determine the appropriate values of $a_{A1}$, $a_{A2}$, $a_{A3}$ and $\Delta T$ that will ensure interception with net rotation is achieved, with the constraint on the change in length of each of the sides of the triangle $A_1A_2A_3$ being satisfied. The discussions given in Section IV.B for the 2-D case carry over here as well.

Implementation

In the preceding subsection, we addressed the scenarios where the net needs to rotate, and a by-product of this rotation is that the distance between the UAVs may change, and this can cause the net to stretch (or compress). The actual stretching and compression of the net can pose challenges in a real system of a triangular net being carried by three UAVs. The challenge arises mainly from the need to design a mechanism for fixing the net to the UAVs such that (a) the net does not hinder the operation of the UAVs (b) the material of the net should be able to withstand the stretching and (c) the compression of the net should not make the net sag substantially such that it hinders the motion of the UAV and capture of the intruder swarm.

While a mechanism to attach the net to the UAV and selection of the material of the net are substantial challenges $$R_{\delta,\hat{u}} = \begin{bmatrix} \cos\delta + u_x^2(1-\cos\delta) & u_xu_y(1-\cos\delta) + u_z\sin\delta & u_xu_z(1-\cos\delta) + u_y\sin\delta \\ u_yu_x(1-\cos\delta) + u_z\sin\delta & \cos\delta + u_y^2(1-\cos\delta) & u_yu_z(1-\cos\delta) - u_x\sin\delta \\ u_zu_x(1-\cos\delta) - u_y\sin\delta & u_zu_y(1-\cos\delta) + u_x\sin\delta & \cos\delta + u_z^2(1-\cos\delta) \end{bmatrix} \quad (1\text{-}90)$$

in their own right, these are beyond the scope of the present disclosure. We discuss below a few ideas on how net stretching/compression can be avoided during a net rotation maneuver.

Figure 22:
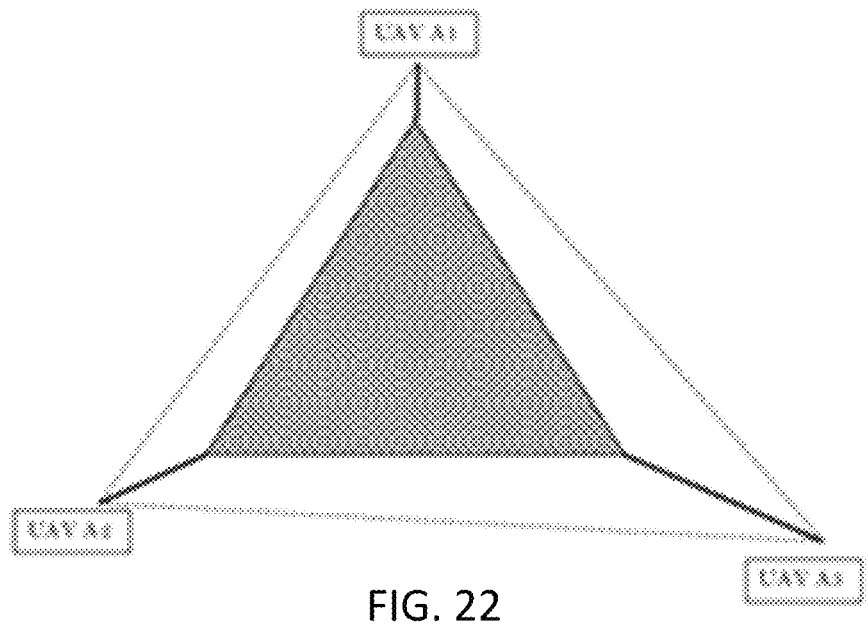
FIG. 22 illustrates a schematic of net connected to UAVs with cables.

We assume that the net is attached to each UAV using cables that can be wound up or extended, using a spinning reel deployment mechanism (much like that in a fishing rod) carried by the UAV, as schematically shown in FIG. 22. Then during a net orientation maneuver, if the distance between a pair of UAVs increases (as per the analysis in the preceding subsection), those UAVs extend their cables. Similarly, if the distance between a pair of UAVs decreases, those UAVs wind up their cables. Therefore the net does not actually stretch or compress—instead, this is relegated to the extension or winding up of the cables, and the actual dimension of the net does not change. there is active research in the area of multiple UAVs carrying flexibly attached, cable-suspended payloads.

Since each UAV can carry only a finite length of cable, there needs to be a bound imposed on the change in the distance between each pair of UAVs and this bound is imposed by the term $r_{max}$ in the preceding subsections. It also becomes important to choose the value of $\lambda_i$ in (1-1) appropriately so that the interception point lies on the net. We recall that in (1-1), we chose the interception point as a convex combination of the UAV positions, with $\lambda_i \in [0,1]$, i=1, 2, 3. With the scheme of FIG. 22, it can be ensured that the interception point lies on the net, by selecting $\lambda_1 \in [a_1, a_2]$, where the values of $\alpha_1$, $a_2$ are determined from a knowledge of the length of the cables, and $0<a_1<a_2<1$.

An implementation of the guidance laws will also need to include addressing the state estimation problem, in order to determine the target motion on the basis of sensor measurements, as well as the relative motion of the net-carrying UAVs.

Generalization to Spheroidal Bounding Surfaces

Figure 23:
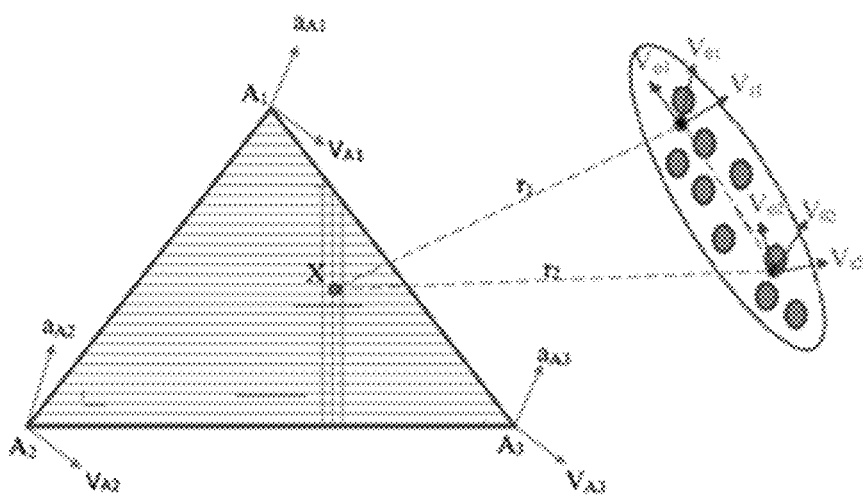
FIG. 23 illustrates a schematic of three UAVs carrying a net to intercept a swarm of UAVs enclosed in a virtual spheroid.

The development in the preceding sections assumed that the vehicles in the intruder swarm have been enclosed in a virtual sphere. In scenarios where the intruder vehicles are moving as a flock with a somewhat elongated shape, then bounding them with a sphere and choosing an intercept point inside this sphere might not always lead to the best results. In such cases, it would be advantageous to bound the swarm with a shape that is less conservative than a sphere. One possibility is to construct a virtual spheroid enclosing the swarm—and then use the net to intercept this spheroid. Such an engagement is schematically depicted in FIG. 23.

The collision cone associated with a spheroid has been determined. In particular, it was demonstrated that the expressions for miss-distance and the time of closest approach between a point and a spheroid both moving with constant velocities, can be used to compute quantities $\bar{y}$ and $\bar{V}_{r,sp}$ as follows:

$$\bar{y} = \frac{(r_1 V_{r1} - r_2 V_{r2})^2 + \left[r_1\sqrt{V_{\phi1}^2 + V_{\theta1}^2} + r_2\sqrt{V_{\phi2}^2 + V_{\theta2}^2}\right]^2}{V_\phi^2 + V_\theta^2 + V_r^2} - 4a^2 \quad (1\text{-}92)$$

$$\bar{V}_{r,sp} = V_{r2}\sqrt{V_{\phi1}^2 + V_{\theta1}^2} + V_{r1}\sqrt{V_{\phi1}^2 + V_{\theta1}^2} \quad (1\text{-}93)$$

where, a is the semi-major axis of the spheroid and $V_{rk}, V_{\phi k}, V_{\theta k}$, k=1,2 represent the relative velocity components of the foci k of the spheroid with respect to the point. Based on this, we state the following: If the point and the spheroid move with constant velocities, then the conditions $\bar{y}<0$, $\bar{V}_{r,sp}<0$ are both necessary and sufficient conditions for interception. If they move with varying velocities, then the conditions $\bar{y}<0, \bar{V}_{r,sp}\le 0$ for all future time are sufficient conditions for interception. (1-92) represents the counterpart to (1-22). The collision cone between the net $A_1 A_2 A_3$ and the spheroid is then obtained from (1-26) after replacing y and $V_r$ in (1-26) with $\bar{y}$ and $\bar{V}_{r,sp}$, respectively.

For this engagement, we can determine the counterpart to Theorem 1 as follows. Define an error function similar to (1-27) with y replaced by $\bar{y}$. Then, determine the time derivative of $\bar{y}$ as follows:

$$\frac{d\bar{y}}{dt} = \sum_{k=1}^{2}\left[\frac{\partial \bar{y}}{\partial r_k}\dot{r}_k + \frac{\partial \bar{y}}{\partial V_{\phi k}}\dot{V}_{\phi k} + \frac{\partial \bar{y}}{\partial V_{\theta k}}\dot{V}_{\theta k} + \frac{\partial \bar{y}}{\partial V_{rk}}\dot{V}_{rk}\right] \quad (1\text{-}94)$$

Evaluating (1-29) along the system trajectories, we get:

$$\frac{d\bar{y}}{dt} = \quad (1\text{-}95)$$

$$\dot{V}\left[\sum_{k=1}^{2}\left\{-\frac{\partial \bar{y}}{\partial V_{\phi k}}\cos\gamma\sin(\psi - \phi_k) - \right.\right.$$

$$\frac{\partial \bar{y}}{\partial V_{\theta k}}\{\cos\gamma\sin\theta_k\cos(\psi - \phi_k) + \sin\gamma\cos\theta_k\} -$$

$$\left.\left.\frac{\partial \bar{y}}{\partial V_{rk}}\{\cos\gamma\cos\theta_k\cos(\psi - \phi_k) + \sin\gamma\sin\theta_k\}\right\}\right] +$$

$$\dot{\gamma}V\left[\sum_{k=1}^{2}\left\{\frac{\partial \bar{y}}{\partial V_{\phi k}}\sin\gamma\sin(\psi - \phi_k) - \right.\right.$$

$$\frac{\partial \bar{y}}{\partial V_{\theta k}}(-\sin\gamma\sin\theta_k\cos(\psi - \phi_k) + \cos\gamma\cos\theta_k) -$$

$$\left.\left.\frac{\partial \bar{y}}{\partial V_{rk}}(-\sin\gamma\cos\theta_k\cos(\psi - \phi_k) + \cos\gamma\sin\theta_k)\right\}\right] +$$

$$\dot{\psi}V\cos\gamma\left[\sum_{k=1}^{2} -\frac{\partial \bar{y}}{\partial V_{\phi k}}\cos(\psi - \phi_k) + \frac{\partial \bar{y}}{\partial V_{\theta k}}\sin\theta_k\sin(\psi - \phi_k) + \right.$$

$$\left.\frac{\partial \bar{y}}{\partial V_{rk}}\cos\theta_k\sin(\psi - \phi_k)\right]$$

which can be written in a compact form identical to the right hand side of (1-31), with $Y_1, Y_2$ and $Y_3$ now representing the expressions within the square brackets in (1-95). With these new definitions of $Y_1$, $Y_2$ and $Y_3$, $N_i$ has the same form as given in (1-34). After replacing y with $\bar{y}$, Eq (1-28) in Theorem 1 holds for this engagement. Theorem 2 is also valid for this new engagement with (1-51) replaced by the following equation:

$$-KZ + \sqrt{2Z}\,a_B\left[\sum_{k=1}^{2}\left\{\frac{\partial \bar{y}}{\partial V_{rk}}(\cos\alpha_B\cos\theta_k\cos(\beta_B - \phi_k) + \right.\right. \quad (1\text{-}96)$$

$$\sin\alpha_B\sin\theta_k) + \frac{\partial \bar{y}}{\partial V_{\phi k}}\cos\alpha_B\sin(\beta_B - \phi_k) +$$

$$\left.\left.\frac{\partial \bar{y}}{\partial V_{\theta k}}(-\cos\alpha_B\sin\theta_k\cos(\beta_B - \phi_k) + \sin\alpha_B\cos\theta_k)\right\}\right] \le 0$$

and a corresponding value of $c_{max}$ can be determined by following a series of steps similar to (1-54)-(1-66). Finally, Theorem 3 is also valid for this new engagement with (1-69) replaced by the following equation:

$$N_1 a_{A1} + N_2 a_{A2} + N_3 a_{A3} = -K(\bar{y} - w) + \quad (1\text{-}97)$$

$$a_B \left[ \sum_{k=1}^{2} \left\{ \frac{\partial \bar{y}}{\partial V_{\phi k}} \cos\alpha_B \sin(\beta_B - \phi_k) + \right. \right.$$

$$\frac{\partial \bar{y}}{\partial V_{\theta k}} (-\cos\alpha_B \sin\theta_k \cos(\beta_B - \phi_k) + \sin\alpha_B \cos\theta_k) +$$

$$\left. \left. \frac{\partial \bar{y}}{\partial V_{rk}} (\cos\alpha_B \cos\theta_k \cos(\beta_B - \phi_k) + \sin\alpha_B \sin\theta_k) \right\} \right]$$

The above results represent a generalization of that presented in Section 3 as follows. When the two foci of the spheroid coincide, the spheroid becomes a sphere, and we have $r_1=r_2$, $V_{\theta 1}=V_{\theta 2}$, $V_{\phi 1}=V_{\phi 2}$, $V_{r1}=V_{r2}$, a=R. Then, the conditions $\bar{y}<0$ and $\bar{\nabla}_{r,sp}$ reduce to y<0 and $V_r<0$, respectively (where y is in (1-22)), and as a consequence, the subsequent equations in this section reduce to their counterparts in Section 3.

Thus, the problem of three UAVs carrying a net with the objective of capturing an intruder UAV swarm is addressed, using a collision cone approach. Depending on its geometry, the intruder UAV swarm is enclosed in either a virtual sphere, or a virtual spheroid. The collision cone approach is used to determine analytical guidance laws for the net-carrying UAVs, for both maneuvering and non-maneuvering intruder UAV swarms. Simulation results are presented to validate the theory. The method can also be extended to the scenario of n UAVs carrying an arbitrarily-shaped net, after making appropriate modifications in the equations.

It should be understood that the various techniques described herein may be implemented in connection with hardware or software or, where appropriate, with a combination of both. Thus, the methods and apparatus of the presently disclosed subject matter, or certain aspects or portions thereof, may take the form of program code (i.e., instructions) embodied in tangible media, such as floppy diskettes, CD-ROMs, hard drives, or any other machine-readable storage medium wherein, when the program code is loaded into and executed by a machine, such as a computer, the machine becomes an apparatus for practicing the presently disclosed subject matter. In the case of program code execution on programmable computers, the computing device generally includes a processor, a storage medium readable by the processor (including volatile and non-volatile memory and/or storage elements), at least one input device, and at least one output device. One or more programs may implement or utilize the processes described in connection with the presently disclosed subject matter, e.g., through the use of an application programming interface (API), reusable controls, or the like. Such programs may be implemented in a high level procedural or object-oriented programming language to communicate with a computer system. However, the program(s) can be implemented in assembly or machine language, if desired. In any case, the language may be a compiled or interpreted language and it may be combined with hardware implementations.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed:

1. A method of surrounding target unmanned aerial vehicles (UAVs), comprising:
   modeling a swarm of target UAVs as an arbitrary shape;
   carrying, by pursuing UAVs, a ropeline in an open-chain configuration, wherein the ropeline comprises a plurality of ropes and each pursuing UAV of the pursuing UAVs is connected to at least one connected adjacent pursuing UAV of the pursuing UA Vs by a rope of the plurality of ropes, and each rope of the plurality of ropes connects at most one pursuing UAV of the pursing UAV with the at least one connected adjacent pursuing UAV of the pursuing UAVs;
   determining accelerations of the pursuing UAVs based on a collision cone framework;
   for each pursuing UAV of the pursuing UAVs, adjusting an inter-vehicle distance between the pursuing UAV and the at least one connected adjacent pursuing UAV in correspondence with a size and a shape of the swarm of target UAVs and a maximum length of the rope connecting the pursuing UAV and the at least one connected adjacent pursuing UAV;
   for each pursuing UAV of the pursuing UAVs, in response to adjusting the inter-vehicle distance between the pursuing UAV and the at least one connected adjacent pursuing UAV, adjusting a length of the rope connecting the pursuing UAV and the at least one connected adjacent pursuing UAV based on the adjusted inter-vehicle distance;
   surrounding the target UAVs within a convex hull of the pursuing UAVs; and
   surrounding, by the pursuing UAVs, the target UAVs using the accelerations determined by the collision cone framework to cooperatively steer the pursuing UA Vs to intercept the arbitrary shape.

2. The method of claim 1, further comprising capturing the target UAVs further comprising enclosing the target UAVs at a chosen location inside the convex hull of the pursuing UAVs, where the location inside the convex hull is chosen depending on a size and a shape of the target swarm as well as an instantaneous functioning capability of the pursuing UAVs and the ropeline.

3. The method of claim 1, further comprising:
   orienting an open end of the ropeline toward the target UAVs,
   wherein surrounding the target UAVs further includes the pursuing UAVs approaching the target UAVs at an appropriate orientation that corresponds with the open end of the ropeline.

4. The method of claim 3, wherein the ropeline is an open chain, the method further comprising:
   surrounding the target UA Vs by rotating a formation of the pursuing UA Vs to approach the target UAVs from a direction of an open end of the open chain.

5. The method of claim 1, wherein each pursing UAV comprises spinning wheel deployment mechanism, and further wherein adjusting the length of the rope connecting the pursuing UAV and the at least one connected adjacent pursuing UAV based on the adjusted inter-vehicle distance comprises adjusting the length of the rope using the spinning reel deployment mechanism of the pursuing UAV.

6. The method of claim 1, further comprising cooperatively driving a velocity vector of any point that lies within a convex hull of the pursuing UAVs into the collision cone of the target UAVs to intercept the target UAVs.

7. The method of claim 1, wherein the target UAVs are moving in a two-dimensional plane or in a three-dimensional space.

8. The method of claim 1, further comprising observing the target UAVs to determine risk associated with the target UAVs.

9. The method of claim 1, wherein the collision cone framework uses collision cones to represent a collection of velocity vectors of the pursuing UAVs which leads to a collision with the target UAVs; and
   using the collision cones to specify accelerations for the pursuing UAVs to enable them to cooperatively drive a velocity vector of any chosen point that lies in a convex hull of the pursuing UAVs into the collision cone to the target to facilitate surrounding the target UAVs.

10. The method of claim 1, wherein the arbitrary shape is a circle having a radius R.

11. The method of claim 10, further comprising:
    receiving image data from a camera mounted on one or more of the pursuing UAVs; and
    extracting the radius R from the image data.

12. The method of claim 10, wherein the radius R is a function of time.

13. The method of claim 10, wherein modeling the target UAVs as the circle having the radius R comprises determining the radius R of a smallest circle that bounds the target UAVs.

14. The method of claim 1, wherein the arbitrary shape changes size.

15. The method of claim 1, the arbitrary shape changes in both shape and size as a function of time.

16. The method of claim 1, wherein the collision cone framework considers maneuvers of the target UAVs and the maximum lengths of each rope of the ropeline.

* * * * *

UNITED STATES PATENT AND TRADEMARK OFFICE
CERTIFICATE OF CORRECTION

PATENT NO. : 12,293,675 B2
APPLICATION NO. : 17/313410
DATED : May 6, 2025
INVENTOR(S) : Animesh Chakravarthy It is certified that error appears in the above-identified patent and that said Letters Patent is hereby corrected as shown below:

In the Claims

In Claim 1, Column 46, Line 9, delete "UA Vs" and insert -- UAVs --;

In Claim 1, Column 46, Lines 33-34, delete "UA Vs" and insert -- UAVs --;

In Claim 4, Column 46, Line 51, delete "UA Vs" and insert -- UAVs --;

In Claim 4, Column 46, Line 52, delete "UA Vs" and insert -- UAVs --;

In Claim 9, Column 47, Line 9, delete "UA Vs" and insert -- UAVs --;

In Claim 9, Column 47, Lines 12-13, delete "UA Vs." and insert -- UAVs. --.

Signed and Sealed this
Third Day of February, 2026

John A. Squires
*Director of the United States Patent and Trademark Office*